United States Patent
Marin et al.

(10) Patent No.: US 8,110,518 B2
(45) Date of Patent: Feb. 7, 2012

(54) FLUORINATED TRANSITION METAL CATALYSTS AND FORMATION THEREOF

(75) Inventors: Vladimir Marin, Houston, TX (US); Margarito Lopez, Pasadena, TX (US); Abbas Razavi, Mons (BE); Tim Coffy, Houston, TX (US); Michel Daumerie, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 466 days.

(21) Appl. No.: 11/978,002

(22) Filed: Oct. 26, 2007

(65) Prior Publication Data

US 2009/0156761 A1 Jun. 18, 2009

Related U.S. Application Data

(63) Continuation-in-part of application No. 11/413,791, filed on Apr. 28, 2006, now abandoned, and a continuation-in-part of application No. 11/529,903, filed on Sep. 29, 2006, now abandoned, and a continuation-in-part of application No. 11/493,090, filed on Jul. 26, 2006, now abandoned, and a continuation-in-part of application No. 11/471,821, filed on Jun. 21, 2006, now abandoned, and a continuation-in-part of application No. 11/540,181, filed on Sep. 29, 2006, now abandoned, and a continuation-in-part of application No. 11/715,017, filed on Mar. 7, 2007, now abandoned, which is a continuation-in-part of application No. 11/414,653, filed on Apr. 28, 2006, now abandoned, and a continuation-in-part of application No. 11/740,478, filed on Apr. 28, 2006, now abandoned, said application No. 11/414,653 is a continuation-in-part of application No. 11/414,424, filed on Apr. 28, 2006, now abandoned.

(60) Provisional application No. 60/848,214, filed on Sep. 29, 2006.

(51) Int. Cl.
*C08F 4/02* (2006.01)
*C08F 4/60* (2006.01)
*C08F 4/6592* (2006.01)
*B01J 31/22* (2006.01)

(52) U.S. Cl. ........ 502/119; 502/103; 502/104; 502/120; 502/152; 526/154; 526/158; 526/170; 526/943

(58) Field of Classification Search .................. 502/103, 502/119, 104, 120, 152; 526/154, 158, 160, 526/170

See application file for complete search history.

(56) References Cited

U.S. PATENT DOCUMENTS

| | | | |
|---|---|---|---|
| 4,607,019 A | 8/1986 | Best | |
| 4,895,822 A | 1/1990 | Okazaki | |
| 5,219,817 A | 6/1993 | McDaniel | |
| 5,221,654 A | 6/1993 | McDaniel | |
| 5,221,655 A | 6/1993 | McDaniel | |
| 5,438,027 A | 8/1995 | Reagen | |
| 5,840,644 A | 11/1998 | Kuber | |
| 6,107,230 A | 8/2000 | McDaniel | |
| 6,144,897 A | 11/2000 | De Selliers | |
| 6,235,918 B1 | 5/2001 | Marks | |
| 6,300,271 B1 | 10/2001 | McDaniel | |
| 6,316,553 B1 | 11/2001 | McDaniel | |
| 6,355,594 B1 | 3/2002 | McDaniel | |
| 6,368,999 B1 | 4/2002 | Speca | |
| 6,395,666 B1 | 5/2002 | McDaniel | |
| 6,524,987 B1 | 2/2003 | Collins | |
| 6,573,344 B1 | 6/2003 | Hawley | |
| 6,613,712 B1 | 9/2003 | McDaniel | |
| 6,613,852 B2 | 9/2003 | McDaniel | |
| 6,689,846 B1 | 2/2004 | Leskinen et al. | |
| 6,723,804 B1 | 4/2004 | Battiste | |
| 6,750,307 B2 | 6/2004 | Weng | |
| 6,780,946 B2 | 8/2004 | Saudemont | |
| 6,831,141 B2 | 12/2004 | McDaniel | |
| 6,884,748 B2 | 4/2005 | McCullough | |
| 6,890,876 B2 | 5/2005 | McCullough | |
| 6,984,603 B2 | 1/2006 | McDaniel | |
| 7,001,968 B2 | 2/2006 | McDaniel | |
| 7,109,277 B2 | 9/2006 | Hawley | |
| 7,148,298 B2 | 12/2006 | Jensen | |
| 2002/0161141 A1 | 10/2002 | Mawson et al. | |
| 2003/0054952 A1 | 3/2003 | Takahashi | |
| 2005/0054790 A1 | 3/2005 | Mawson | |
| 2005/0165183 A1 | 7/2005 | McCullough | |
| 2005/0233892 A1 | 10/2005 | Tian et al. | |
| 2005/0266982 A1 | 12/2005 | Holtcamp | |
| 2005/0288462 A1 | 12/2005 | Jensen et al. | |
| 2006/0052552 A1 | 3/2006 | Vuorikari et al. | |
| 2006/0089470 A1 | 4/2006 | Lopez et al. | |
| 2007/0123414 A1 | 5/2007 | Kao et al. | |
| 2009/0042720 A1 | 2/2009 | Prades et al. | |

OTHER PUBLICATIONS

G.C. Ardell, B. Gumowski; "Model Prediction for Reactor Control"; CEP Jun. 1983; XP000600528; pp. 77-83.

*Primary Examiner* — Caixia Lu

(57) ABSTRACT

Supported catalyst systems and methods of forming the same are described herein. In one specific embodiment, the methods generally include providing an inorganic support material and contacting the inorganic support material with an aluminum fluoride compound represented by the formula $AlF_pX_{3-p}B_q$ to form an aluminum fluoride impregnated support, wherein X is selected from Cl, Br and $OH^-$, B is $H_2O$, p is selected from 1 to 3 and q is selected from 0 to 6. The method further includes contacting the aluminum fluoride impregnated support with a transition metal compound to form a supported catalyst system, wherein the transition metal compound is represented by the formula $[L]_mM[A]_n$; wherein L is a bulky ligand, A is a leaving group, M is a transition metal and m and n are such that a total ligand valency corresponds to the transition metal valency.

2 Claims, 3 Drawing Sheets

(Type 1 support with Type 1 catalyst)

FLUORINATED TRANSITION METAL CATALYSTS AND FORMATION THEREOF

CROSS-REFERENCE TO RELATED APPLICATIONS

This application is a continuation in part of U.S. patent application Ser. No. 11/413,791, filed Apr. 28, 2006.

This application is also a continuation of U.S. patent application Ser. No. 11/529,903, filed Sep. 29, 2006, which is a continuation in part of U.S. patent application Ser. No. 11/413,791, filed Apr. 28, 2006.

This application is also a continuation of U.S. patent application Ser. No. 11/493,090, filed Jul. 26, 2006, which is a continuation in part of U.S. patent application Ser. No. 11/413,791, filed Apr. 28, 2006.

This application is also a continuation of U.S. patent application Ser. No. 11/471,821, filed Jun. 21, 2006, which is a continuation in part of U.S. patent application Ser. No. 11/413,791, filed Apr. 28, 2006.

This application is also a continuation of U.S. patent application Ser. No. 11/540,181, filed Sep. 29, 2006, which is a continuation in part of U.S. patent application Ser. No. 11/413,791, filed Apr. 28, 2006.

This application is also a continuation of U.S. patent application Ser. No. 11/715,017, filed Mar. 7, 2007, which claims the benefit of U.S. Provisional Patent Application No. 60/848,214, filed on Sep. 29, 2006 and is a continuation in part of U.S. patent application Ser. No. 11/471,821, filed Jun. 21, 2006, which is a continuation in part of U.S. patent application Ser. No. 11/413,791, filed Apr. 28, 2006.

This application is also a continuation of U.S. patent application Ser. No. 11/414,653, filed Apr. 28, 2006 and U.S. patent application Ser. No. 11/414,424, filed Apr. 28, 2006.

This application is also a continuation of U.S. patent application Ser. No. 11/740,478, filed Apr. 26, 2007, which is a continuation in part of U.S. patent application Ser. No. 11/413,791, filed Apr. 28, 2006.

FIELD

Embodiments of the present invention generally relate to supported catalyst compositions and methods of forming the same.

BACKGROUND

Many methods of forming olefin polymers include contacting olefin monomers with transition metal catalyst systems, such as metallocene catalyst systems to form polyolefins. While it is widely recognized that the transition metal catalyst systems are capable of producing polymers having desirable properties, the transition metal catalysts generally do not experience commercially viable activities.

Therefore, a need exists to produce transition metal catalyst systems having enhanced activity.

SUMMARY

One or more embodiments of the present invention include methods of forming supported catalyst systems. The methods generally include providing an inorganic support material and contacting the inorganic support material with an aluminum fluoride compound represented by the formula $AlF_pX_{3-p}B_q$ to form an aluminum fluoride impregnated support, wherein X is selected from Cl, Br and OH$^-$, B is $H_2O$, p is selected from 1 to 3 and q is selected from 0 to 6. The method further includes contacting the aluminum fluoride impregnated support with a transition metal compound to form a supported catalyst system, wherein the transition metal compound is represented by the formula $[L]_mM[A]_n$; wherein L is a bulky ligand, A is a leaving group, M is a transition metal and m and n are such that a total ligand valency corresponds to the transition metal valency.

In the one or more embodiments, the method may further include heating the aluminum fluoride impregnated support at a temperature of greater than about 200° C.

In the one or more embodiments, the method may further include heating the aluminum fluoride impregnated support at a temperature of greater than about 400° C.

In the one or more embodiments, the contacting of the inorganic support material with the aluminum fluoride compound may occur in the presence of water, an organic medium or in solid phase.

In the one or more embodiments, the inorganic support material may include silica and alumina.

In the one or more embodiments, the inorganic support material may consists essentially of silica and alumina.

In the one or more embodiments, the inorganic support material may be selected from fluorinated silica, fluorinated alumina, fluorinated alumina-silica, silica, alumina and combinations thereof.

In the one or more embodiments, the aluminum fluoride impregnated support may include a bonding sequence selected from Si—O—Al—F and Si—O—Al—O—Al—F.

In the one or more embodiments, the aluminum fluoride compound may include $AlF_3$.

In the one or more embodiments, the supported catalyst system may include at least about 1 wt. % alumina.

In the one or more embodiments, the supported catalyst system may include at least about 1 wt. % aluminum fluoride.

In the one or more embodiments, supported metallocene catalyst compositions may be formed by the method described herein.

In the one or more embodiments, the transition metal compound may include dimethylsilybis(2-methyl-4-phenyl-indenyl)zirconium dichloride.

In the one or more embodiments, the method may further include contacting the supported catalyst system with an olefin monomer to form a polyolefin.

In the one or more embodiments, the method may further include contacting the supported catalyst system with an olefin monomer to form a polyolefin, wherein the polyolefin includes a polymer selected from ethylene, a $C_3$ or greater alpha olefin, a $C_4$ or greater conjugated diene, an ethylene-alpha olefin copolymer or combinations thereof.

In the one or more embodiments, the method may further include contacting the supported catalyst system with a propylene monomer to form isotactic polypropylene.

One or more embodiments of the invention generally include a method including providing an inorganic support composition, wherein the inorganic support composition includes a bonding sequence selected from Si—O—Al—F, F—Si—O—Al, F—Si—O—Al—F and combinations thereof and contacting the inorganic support composition with a transition metal compound to form a supported catalyst system, wherein the transition metal compound is represented by the formula $[L]_mM[A]_n$; wherein L is a bulky ligand, A is a leaving group, M is a transition metal and m and n are such that a total ligand valency corresponds to the transition metal valency.

In the one or more embodiments, the inorganic support composition may be formed by simultaneously forming $SiO_2$ and $Al_2O_3$ and contacting the $SiO_2$ and $Al_2O_3$ with a fluorinating agent.

In the one or more embodiments, the inorganic support composition may be formed by contacting a silica containing compound with a fluorinating agent and then with an organic aluminum containing compound, wherein the organic aluminum containing compound is represented by the formula $AlR_3$ and wherein each R is independently selected from alkyls, aryls and combinations thereof.

In the one or more embodiments, the inorganic support composition may be formed by contacting a silica containing compound with an aluminum containing compound and then with a fluorinating agent, wherein the organic aluminum containing compound is represented by the formula $AlR_3$ and where each R is independently selected from alkyls, aryls and combinations thereof.

In the one or more embodiments, the inorganic support composition may be formed by providing an alumina-silica support and contacting the alumina-silica support with a fluorinating agent.

In the one or more embodiments, the inorganic support composition may be formed by providing a silica containing support and contacting the silica support with a fluorinating agent represented by the formula $R_nAlF_{3-n}$, wherein each R is independently selected from alkyls, aryls and combinations thereof and n is 1 or 2.

In the one or more embodiments, the inorganic support composition may be contacted with the transition metal compound in the presence of a second aluminum containing compound represented by the formula $AlR_3$, wherein each R is independently selected from alkyls, alkoxys, aryls, aryloxys, halogens or combinations thereof.

In the one or more embodiments, the second aluminum containing compound may be selected from triisobutylaluminum, trioctylaluminum and combinations thereof.

In the one or more embodiments, the supported catalyst composition may include a weight ratio of silica to aluminum ($Al^1$) of from about 0.01:1 to about 1000:1 and a weight ratio of fluorine to silica of from about 0.001:1 to about 0.3:1.

In the one or more embodiments, the supported catalyst composition may include a molar ratio of fluorine to aluminum of about 1:1.

In the one or more embodiments, the inorganic support composition may be contacted with the transition metal compound in the presence of a second aluminum containing compound represented by the formula $AlR_3$, wherein each R is independently selected from alkyls, alkoxys, aryls, aryloxys, halogens or combinations thereof and in presence of a boron containing organic compound.

In the one or more embodiments, the supported catalyst composition may be active for polymerization absent alkylation.

In the one or more embodiments, the method may further include storing the supported catalyst system for a period of time prior to contact with an olefin monomer.

In the one or more embodiments, the contact of the inorganic support composition and the transition metal compound may occur in proximity to contact with an olefin monomer.

In the one or more embodiments, the inorganic support composition may be contacted with a plurality of transition metal compounds.

In the one or more embodiments, the method may further include contacting the supported catalyst system with an olefin monomer to form a polyolefin, wherein the polyolefin has a bimodal molecular weight distribution.

In the one or more embodiments, a supported metallocene catalyst composition may be formed.

In the one or more embodiments, the method may further include contacting the supported catalyst system with an olefin monomer to form a polyolefin in a process selected from gas phase process, solution phase process, slurry phase processes and combinations thereof.

In the one or more embodiments, the method may further include contacting the supported catalyst system with an olefin monomer to form a polyolefin, wherein the polyolefin comprises a polymer selected from ethylene, a $C_3$ or greater alpha olefin, a $C_4$ or greater conjugated diene, an ethylene-alpha olefin copolymer or combinations thereof.

In the one or more embodiments, the method may further include contacting the supported catalyst system with an olefin monomer to form a polyolefin, wherein the polyolefin is selected from polyethylene, polypropylene and combinations thereof.

In the one or more embodiments, the method may further include contacting the supported catalyst system with a propylene monomer to form isotactic polypropylene.

In the one or more embodiments, the method may further include contacting the supported catalyst system with an olefin monomer to form a polyolefin comprising a molecular weight distribution selected from unimodal, bimodal or multimodal.

In the one or more embodiments, the method may further include contacting the supported catalyst system with a propylene monomer to form a syndiotactic polypropylene.

In the one or more embodiments, the transition metal compound may be selected from metallocene catalysts comprising a symmetry selected from $C_1$, $C_s$ or $C_2$.

In the one or more embodiments, the transition metal compound may be selected from metallocene catalysts, late transition metal catalysts, post metallocene catalysts and combinations thereof.

In the one or more embodiments, the method may further include calcining the inorganic support composition at a temperature of from about 200° C. to about 800° C. in the presence of oxygen.

One or more embodiments of the invention generally include catalyst systems. The catalyst systems generally include an inorganic support composition, wherein the inorganic support composition includes a bonding sequence selected from Si—O—Al—F, F—Si—O—Al, F—Si—O—Al—F and combinations thereof and an organometallic catalyst compound, wherein the transition metal compound is represented by the formula $[L]_mM[A]_n$; wherein L is a bulky ligand, A is a leaving group, M is a transition metal and m and n are such that a total ligand valency corresponds to the transition metal valency.

In the one or more embodiments, the catalyst system may further include a second aluminum containing compound represented by the formula $AlR_3$, wherein each R is independently selected from alkyls, aryls, halogens or combinations thereof.

In the one or more embodiments, the catalyst system may further include

In the one or more embodiments, the second aluminum containing compound may be selected from triisobutylaluminum, trioctylaluminum or combinations thereof.

In the one or more embodiments, the catalyst system may further include a weight ratio of silica to aluminum ($Al^1$) of from about 0.01:1 to about 1000:1 and a weight ratio of fluorine to silica of from about 0.001:1 to about 0.3:1.

In the one or more embodiments, the catalyst system may further include from about 0.1 wt. % to about 5 wt. % transition metal compound.

In the one or more embodiments, the transition metal compound may be selected from metallocene catalysts, late transition metal catalysts, post metallocene catalysts and combinations thereof.

One or more embodiments of the invention may further include methods of forming a supported catalyst system. The methods generally include providing a support material comprising silica-alumina prepared by cogel methods, contacting the support material with a fluorinating agent to form a fluorinated support and contacting the fluorinated support with a transition metal compound to form a supported catalyst system.

In the one or more embodiments, the methods may further include contacting the fluorinated support with an organoaluminum compound represented by AlR3, wherein each R is independently selected from alkyls, aryls and combinations thereof.

In the one or more embodiments, the fluorinated support may include semi-spherical particles, a surface area of from about 100 m$^2$/g to about 300 m$^2$/g, a pore volume of from about 1.0 ml/g to about 1.5 ml/g and a pore size of from about 15 microns to about 30 microns.

In the one or more embodiments, the fluorinated support may include semi-spherical particles, a surface area of from about 80 m$^2$/g to about 800 m$^2$/g, a pore volume of from about 0.1 ml/g to about 5 ml/g and a pore size of from about 10 microns to about 100 microns.

In the one or more embodiments, the transition metal compound may be selected from dichlorides, dimethyls, hydrides and combinations thereof.

In the one or more embodiments, the fluorinated support may include from about 0.1 mmol OH$^-$/g Si to about 5 mmol OH$^-$/g Si.

In the one or more embodiments, the methods may further include contacting the fluorinated support and the transition metal compound in the presence of a solvent.

In the one or more embodiments, the solvent may include toluene.

In the one or more embodiments, the methods may further include contacting the fluorinated support and the transition metal compound at a temperature of from about −60° C. to about 120° C.

In the one or more embodiments, the methods may further include contacting the fluorinated support and the transition metal compound at room temperature.

In the one or more embodiments, the fluorinating agent may include an ammonium fluoride containing compound.

In the one or more embodiments, the fluorinating agent may be selected from $(NH_4)F_2NH_4F.HF_2$, $(NH_4)_2BF_4$, $(NH_4)_2SiF_6$ and combinations thereof.

One or more embodiments of the invention include supported metallocene catalysts. The supported metallocene catalysts generally include a support composition including aluminum, fluorine and silica, wherein the support composition includes from about 0.1 wt. % to about 20 wt. % aluminum, an Al:F molar ratio of from about 1:0.1 to about 1:10, a surface area of from about 80 m$^2$/g to about 800 m$^2$/g, a pore volume of from about 0.1 ml/g to about 5 ml/g and a pore size of from about 10 microns to about 100 microns and a metallocene compound.

In the one or more embodiments, the metallocene compound may be selected from cyclopentadienyl compounds, indenyl compounds, fluorenyl compounds and combinations thereof.

In the one or more embodiments, the metallocene compound may include rac-dimethylsilanylbis(2-methyl-4-phenyl-1-indenyl)zirconium dichloride.

One or more embodiments of the invention include polymerization processes. The polymerization processes generally include introducing a supported catalyst system including a fluorinated support composition and transition metal compound into a polymerization vessel, wherein the supported catalyst system is formed by a process. The process generally includes providing a support material including silica-alumina prepared by cogel methods, contacting the support material with a fluorinating agent selected from ammonium fluoride containing compounds to form a fluorinated support, contacting the fluorinated support with a transition metal compound to form a supported catalyst system and contacting the supported catalyst system with an olefin monomer within the polymerization vessel to form a polyolefin.

In the one or more embodiments, the polymerization vessel may include a gas phase vessel and the metallocene compound may include a cyclopentadienyl fluorenyl catalyst.

In the one or more embodiments, the supported catalyst system and the olefin monomer may be contacted in the presence of an organoaluminum compound represented by $AlR_3$, wherein each R is independently selected from alkyls, aryls and combinations thereof.

In the one or more embodiments, the polyolefin may include a molecular weight distribution of from about 2 to about 4.

In the one or more embodiments, the polyolefin may include a molecular weight distribution of from about 4 to about 25.

One or more embodiments include methods of forming catalyst systems. The methods generally include contacting an alumina-silica support composition with a fluorination reagent in the presence of water to form a first fluorinated support composition, heating the first fluorinated support composition in an oxygen containing atmosphere to a temperature of from about 200° C. to about 800° C. to form a second fluorinated support composition, wherein the second fluorinated support composition includes a bonding sequence selected from Si—O—Al—F, F—Si—O—Al, F—Si—O—Al—F and combinations thereof and contacting the second fluorinated support composition with a transition metal compound to form a supported catalyst system, wherein the transition metal compound is represented by the formula $[L]_mM[A]_n$; wherein L is a bulky ligand, A is a leaving group, M is a transition metal and m and n are such that a total ligand valency corresponds to the transition metal valency.

One or more embodiments of the present invention include methods of forming catalyst systems for commercial production. The methods generally include contacting a commercial quantity of alumina-silica support composition with an aqueous fluorinating agent to form a first fluorinated support composition, heating the first fluorinated support composition in an oxygen containing atmosphere to a temperature of from about 200° C. to about 800° C. to form a second fluorinated support composition, wherein the second fluorinated support composition includes a bonding sequence selected from Si—O—Al—F, F—Si—O—Al, F—Si—O—Al—F and combinations thereof and contacting the second fluorinated support composition with a transition metal compound to form a supported catalyst system, wherein the transition metal compound is represented by the formula $[L]_mM[A]_n$; wherein L is a bulky ligand, A is a leaving group, M is a transition metal and m and n are such that a total ligand valency corresponds to the transition metal valency.

One or more embodiments of the present invention include methods of forming catalyst systems comprising contacting an alumina-silica support composition with a fluorinating agent within a muffle furnace or fluidized bed to form a first fluorinated support composition, heating the first fluorinated support composition in an oxygen containing atmosphere to a temperature of from about 200° C. to about 800° C. to form a second fluorinated support composition, wherein the second fluorinated support composition includes a bonding sequence selected from Si—O—Al—F, F—Si—O—Al, F—Si—O—Al—F and combinations thereof and contacting the second fluorinated support composition with a transition metal compound to form a supported catalyst system, wherein the transition metal compound is represented by the formula $[L]_mM[A]_n$; wherein L is a bulky ligand, A is a leaving group, M is a transition metal and m and n are such that a total ligand valency corresponds to the transition metal valency.

In the one or more embodiments, the contact of the alumina-silica support composition with the fluorinating agent may occur in a single batch.

In the one or more embodiments, the heating of the first fluorinated support composition may occur in an open dish or fluidized bed.

In the one or more embodiments the heating of the first fluorinated support composition may occur in a container with partial removal of the volatile product.

In the one or more embodiments, the fluorinating agent may include ammonium and a fluorine containing compound.

In the one or more embodiments, the fluorinating agent may include ammonium bifluoride.

In the one or more embodiments, the first fluorinated support composition may include from about 1 wt. % to about 30 wt. % fluorinating agent.

In the one or more embodiments, the alumina-silica may include from about 1 wt. % to about 30 wt. % alumina.

In the one or more embodiments, the alumina-silica may include P10 silica.

In the one or more embodiments, the second fluorinated support composition may include from about 0.1 wt. % to about 15 wt. % fluorine.

In the one or more embodiments, the second fluorinated support composition may include a molar ratio of aluminum to fluorine of from about 0.1 to about 10.

In the one or more embodiments, the second fluorinated support composition may include a molar ratio of aluminum to fluorine of from about 1 to about 1.

In the one or more embodiments, the first fluorinated support composition may be heated to a first temperature for a first time of from about 1 hour to about 4 hours and then to a second temperature for a time of from about 1 hour to about 10 hours, wherein the second temperature is greater than the first temperature.

In the one or more embodiments, the first temperature may be from about 20° C. to about 200° C. and the second temperature is from about 200° C. to about 450° C.

In the one or more embodiments, the temperature may be from about 300° C. to about 800° C.

In the one or more embodiments, the methods may further include from about 1 wt. % to about 20 wt. % alumina and from about 1 wt. % to about 20 wt. % fluorine.

In the one or more embodiments, from about 2 to about 10 kilograms of alumina-silica support composition may contact the fluorinating agent.

In the one or more embodiments, the fluorinating agent may be represented by the formula $R_nAlF_{3-n}$, wherein each R is independently selected from alkyls, aryls and combinations thereof and n is 1 or 2.

In the one or more embodiments, the second fluorinated support composition may be contacted with the transition metal compound in the presence of a second aluminum containing compound represented by the formula $AlR_3$, wherein each R is independently selected from alkyls, alkoxys, aryls, aryloxys, halogens or combinations thereof.

In the one or more embodiments, the catalyst system may include from about 0.1 wt. % to about 5 wt. % transition metal compound.

In the one or more embodiments, the second fluorinated support composition may be contacted with a plurality of transition metal compounds.

In the one or more embodiments, the second transition metal compound may be selected from dimethylsilylbis(2-methyl-4-phenyl-indenyl)zirconium dichloride, dimethylsilylbis(2-methyl-indenyl)zirconium dichloride, dimethylsilylbis(2-methyl-4,5-benzo-indenyl)zirconium dichloride, diphenylmethylene(fluorenyl)(cyclopentadienyl)zirconium dichloride, dimethylmethylene(2,7-di-tert-butyl-fluorenyl)(cyclopentadienyl)zirconium dichloride, diphenylmethylene(3,6-di-tert-butyl-fluorenyl)(cyclopentadienyl)zirconium dichloride and combinations thereof.

In the one or more embodiments, the methods may further include contacting the second fluorinated support composition with a Ziegler-Natta catalyst.

One or more embodiments of the invention generally include polymerization processes. The polymerization processes generally include contacting an inorganic support composition with a fluorinating agent to form a fluorinated support, wherein the fluorinating agent comprises an organofluorine compound having the formula $R^4{}_nAlF_{3-n}$ and wherein each R is independently selected from alkyls, aryls and combinations thereof and n is 1 or 2, contacting the fluorinated support with a transition metal compound to form a supported catalyst system and contacting an olefin monomer with the supported catalyst composition to form a polyolefin.

In the one or more embodiments, the inorganic support composition may include a hydroxyl containing oxide.

In the one or more embodiments, the inorganic support composition may include silica.

In the one or more embodiments, the silica may include a surface area of from about 80 m²/g to about 800 m²/g, a pore volume of from about 1.0 ml/g to about 1.5 ml/g and a pore size of from about 15 microns to about 30 microns.

In the one or more embodiments, the fluorinating agent may include diethylaluminum fluoride.

In the one or more embodiments, the transition metal compound may include a cyclopentadienyl fluorenyl metallocene catalyst.

In the one or more embodiments, the polyolefin may include syndiotactic polypropylene.

In the one or more embodiments, the processes may further include contacting the fluorinated support with a compound selected from aluminum or boron containing compounds.

In the one or more embodiments, the processes may further include calcining the fluorinated support at a temperature of from about 200° C. to about 800° C. in the presence of oxygen.

In the one or more embodiments, the fluorinated support may include from about 0.1 wt. % to about 50 wt. % aluminum and an Al:F molar ratio of from about 1:0.1 to about 1:2.

One or more embodiments of the invention generally include methods of forming polyolefins. The methods generally include introducing an inorganic support material to a reaction zone, wherein the inorganic support material includes a bonding sequence selected from Si—O—Al—F, F—Si—O—Al, F—Si—O—Al—F and combinations thereof, introducing a transition metal compound to the reaction zone, contacting the transition metal compound with the inorganic support material for in situ activation/heterogenization of the transition metal compound to form a catalyst system, introducing an olefin monomer to the reaction zone and contacting the catalyst system with the olefin monomer to form a polyolefin.

In the one or more embodiments, the catalyst system may contact the olefin monomer in the presence of an alkyl aluminum compound.

In the one or more embodiments, the alkyl aluminum compound may include triisobutyl aluminum.

One or more embodiments of the invention include methods of forming supported catalyst systems. The methods generally include contacting an inorganic support material with a transition metal compound to form a supported catalyst system, wherein the contact includes in situ activation/heterogenization and wherein the inorganic support material includes a bonding sequence selected from Si—O—Al—F, F—Si—O—Al, F—Si—O—Al—F and combinations thereof.

In the one or more embodiments, the inorganic support composition may be formed by simultaneously forming $SiO_2$ and $Al_2O_3$ and contacting the $SiO_2$ and $Al_2O_3$ with a fluorinating agent.

In the one or more embodiments, the inorganic support composition may be formed by contacting a silica containing compound with a fluorinating agent and then with an organic aluminum containing compound, wherein the organic aluminum containing compound is represented by the formula $AlR_3$ and wherein each R is independently selected from alkyls, aryls and combinations thereof.

In the one or more embodiments, the inorganic support composition may be formed by contacting a silica containing compound with an aluminum containing compound and then with a fluorinating agent, wherein the organic aluminum containing compound is represented by the formula $AlR_3$ and where each R is independently selected from alkyls, aryls and combinations thereof.

In the one or more embodiments, the inorganic support composition may be formed by providing an alumina-silica support and contacting the alumina-silica support with a fluorinating agent.

In the one or more embodiments, the inorganic support composition may be formed by providing a silica containing support and contacting the silica containing support with a fluorinating agent represented by the formula $R_nAlF_{3-n}$, wherein each R is independently selected from alkyls, aryls and combinations thereof and n is 1 or 2.

In the one or more embodiments, the supported catalyst composition may include a weight ratio of silica to aluminum ($Al^1$) of from about 0.01:1 to about 1000:1 and a weight ratio of fluorine to silica of from about 0.001:1 to about 0.3:1.

In the one or more embodiments, the supported catalyst composition may include a molar ratio of fluorine to aluminum ($Al^1$) of about 1:1.

In the one or more embodiments, the supported catalyst composition may include from about 0.1 wt. % to about 5 wt. % transition metal compound.

One or more embodiments of the invention include methods of forming polyolefins. The methods generally include identifying desired polymer properties, providing a transition metal compound, selecting a support material capable of producing the desired polymer properties, wherein the support material includes a bonding sequence selected from Si—O—Al—F, F—Si—O—Al, F—Si—O—Al—F and combinations thereof, contacting the transition metal compound with the support material to form an active supported catalyst system, wherein the contact of the transition metal compound with the support material occurs in proximity to contact with an olefin monomer and contacting the active supported catalyst system with the olefin monomer to form a polyolefin, wherein the polyolefin comprises the desired polymer properties.

In the one or more embodiments, the contact of the transition metal compound with the support material may include in situ activation/heterogenization of the transition metal compound.

In the one or more embodiments, the transition metal compound may include a bis-indenyl transition metal compound.

In the one or more embodiments, the contact of the transition metal compound with the support material is carried out in the presence of triisobutyl aluminum to form polypropylene and the desired polymer properties include a unimodal and narrow molecular weight distribution.

In the one or more embodiments, the contact of the transition metal compound with the support material may be carried out in the presence of methyl alumoxane or combinations of methyl alumoxane and triisobutyl aluminum to form polypropylene and the desired polymer properties may include a bimodal and broad molecular weight distribution.

In the one or more embodiments, the desired polymer properties may include a high molecular weight polymer.

In the one or more embodiments, the polyolefin may include polypropylene or ethylene/propylene copolymers.

In the one or more embodiments, the desired polymer properties may include a low molecular weight and the support material may include a weight ratio of fluorine to aluminum of from about 1.8:1 to about 7:1.

In the one or more embodiments, the desired polymer properties may include a middle molecular weight and the support material comprises a weight ratio of fluorine to aluminum of from about 0.9:1 to about 1.8:1.

In the one or more embodiments, the desired polymer properties may include a middle molecular weight and the active supported catalyst system may be contacted with the olefin monomer in the presence of triethylaluminum or isoprenyl aluminum.

In the one or more embodiments, the desired polymer properties may include a high molecular weight and the active supported catalyst system may be contacted with the olefin monomer in the presence of triisobutyl aluminum.

In the one or more embodiments, the methods may further include contacting the support material with a second aluminum containing compound.

In the one or more embodiments, the desired polymer properties may include a high molecular weight and the second aluminum containing compound may include methyl alumoxane.

In the one or more embodiments, the desired polymer properties may include a middle molecular weight and the second aluminum containing compound may include triisobutyl aluminum.

In the one or more embodiments, the desired polymer properties may include a broad molecular weight distribution.

In the one or more embodiments, the active supported catalyst system may include a weight ratio of silica to aluminum ($Al^{(1)}$) of from about 0.01:1 to about 1000:1 and a weight ratio of fluorine to silica of from about 0.001:1 to about 0.3:1.

In the one or more embodiments, the active supported catalyst system may include a molar ratio of fluorine to silica of about 1:1.

One or more embodiments of the invention include methods of forming polyolefins. The methods generally include identifying a desired polymer molecular weight, providing a transition metal compound, providing a support material includes a bonding sequence selected from Si—O—Al—F, F—Si—O—Al, F—Si—O—Al—F and combinations thereof and wherein a fluorine to aluminum ratio of the support material is capable of producing the desired polymer molecular weight, contacting the transition metal compound with the support material to form an active supported catalyst system, wherein the contact of the transition metal compound with the support material occurs in proximity to contact with an olefin monomer and contacting the active supported catalyst system with the olefin monomer to form a polyolefin, wherein the polyolefin includes the desired polymer molecular weight.

One or more embodiments of the invention include bimodal propylene polymers. The bimodal propylene polymers are generally formed by the process including contacting a transition metal catalyst with a support material to form an active supported catalyst system, wherein the support material includes a bonding sequence selected from Si—O—Al—F, F—Si—O—Al, F—Si—O—Al—F and combinations thereof and the contact of the transition metal catalyst with the support material occurs in proximity to contact with a propylene monomer and contacting the active supported catalyst system with the olefin monomer to form a polyolefin in the presence of methyl alumoxane.

One or more embodiments of the invention include methods of forming copolymers. The methods generally include providing a transition metal compound represented by the formula $[L]_m M[A]_n$, wherein L is a bulky ligand including bis-indenyl, A is a leaving group, M is a transition metal and m and n are such that the total ligand valency corresponds to the transition metal valency, providing a support material including a bonding sequence selected from Si—O—Al—F, F—Si—O—Al, F—Si—O—Al—F and combinations thereof, contacting the transition metal compound with the support material to form an active supported catalyst system, wherein the contact of the transition metal compound with the support material occurs in proximity to contact with monomer and contacting the active supported catalyst system with a plurality of monomers to form an copolymer.

In the one or more embodiments, the transition metal compound may be represented by the formula $XCp^A Cp^B MA_n$, wherein X is a structural bridge, $Cp^A$ and $Cp^B$ each denote a cyclopentadienyl group, each being the same or different, at least one comprising a bis-indenyl and which may be either substituted or unsubstituted, M is a transition metal and A is an alkyl, hydrocarbyl or halogen group and n is an integer between 0 and 4.

In the one or more embodiments, the methods may further include contacting the plurality of monomers with a second transition metal compound.

In the one or more embodiments, the second transition metal compound may be selected from dimethylsilylbis(2-methyl-4-phenyl-indenyl)zirconium dichloride, dimethylsilylbis(2-methyl-indenyl)zirconium dichloride, dimethylsilylbis(2-methyl-4,5-benzo-indenyl)zirconium dichloride, diphenylmethylene(fluorenyl)(cyclopentadienyl)zirconium dichloride, dimethylmethylene(2,7-di-tert-butyl-fluorenyl)(cyclopentadienyl)zirconium dichloride, diphenylmethylene(3,6-di-tert-butyl-fluorenyl)(cyclopentadienyl)zirconium dichloride and combinations thereof.

In the one or more embodiments, the second transition metal compound may include a symmetry that is different that the transition metal compound.

In the one or more embodiments, the plurality of monomers may include propylene and at least one monomer represented by the formula $CH_2=CHR$, wherein R is selected from hydrogen, $C_2$ to $C_{20}$ alkyls, $C_6$ to $C_{30}$ aryls and combinations thereof.

In the one or more embodiments, the at least one monomer may include ethylene.

In the one or more embodiments, the at least one monomer includes ethylene and an alpha olefin represented by the formula $CH_2=CHR$, wherein R is selected from $C_2$ to $C_{20}$ alkyls.

In the one or more embodiments, the plurality of monomers may include a first olefin monomer comprising propylene, a second olefin monomer represented by the formula $CH_2=CHR$, wherein R is selected from hydrogen, $C_2$ to $C_{20}$ alkyls, $C_6$ to $C_{30}$ aryls and combinations thereof and a third olefin monomer represented by the formula $CH_2=CHR$, wherein R is a $C_2$ to $C_{20}$ alkyl.

In the one or more embodiments, the second olefin monomer may include ethylene and the third olefin monomer comprises a $C_6$ to $C_{30}$ styrenic olefin.

In the one or more embodiments, the copolymer may include from about 0.5 wt. % to about 70 wt. % polyethylene.

In the one or more embodiments, the plurality of monomers may include from about 0.5 wt. % to about 10 wt. % ethylene.

In the one or more embodiments, the copolymer may include a melt flow index that increases with an increasing amount of polyethylene therein.

In the one or more embodiments, the active supported catalyst system experiences an increase in activity with an increasing amount of ethylene monomer.

In the one or more embodiments, the active supported catalyst system first contacts bulk propylene and then contacts gas phase ethylene.

One or more embodiments of the invention include olefin copolymers.

In the one or more embodiments, the copolymers may be selected from random copolymers, impact copolymers, block copolymers, elastomers, rubbers and combinations thereof.

In the one or more embodiments, the copolymers may include from about 0.5 wt. % to about 60 wt. % polyethylene and a melt flow index of from about 1 g/10 min. to about 1000 g/10 min.

In the one or more embodiments, the copolymers may include a melting temperature of from about 90° C. to about 160° C.

In the one or more embodiments, the copolymer exhibits no melting temperature peak.

In the one or more embodiments, the contact of the transition metal compound with the support material may include in situ activation/heterogenization of the transition metal compound.

In the one or more embodiments, the contact of the transition metal compound with the support material may be carried out in the presence of triisobutyl aluminum.

One or more embodiments of the invention include catalyst systems. The catalyst systems generally include an inorganic support material including a bonding sequence selected from Si—O—Al—F, F—Si—O—Al, F—Si—O—Al—F and combinations thereof, wherein the inorganic support material includes an acid strength (pKa) of less than about 4.8 and a transition metal compound, wherein the transition metal compound is represented by the formula $[L]_m M[A]_n$; wherein L is a bulky ligand, A is a leaving group, M is a transition metal and m and n are such that a total ligand valency corresponds to a transition metal valency.

In the one or more embodiments, the inorganic support material may include a surface acidity of at least 0.3 mmol/g.

In the one or more embodiments, the catalyst system may include a weight ratio of silica to aluminum of from about 0.01:1 to about 1000:1 and a weight ratio of fluorine to silica of from about 0.001:1 to about 0.3:1.

In the one or more embodiments, the catalyst system may include a molar ratio of fluorine to aluminum ($Al^1$) of about 1:1.

In the one or more embodiments, the catalyst system may include from about 0.1 wt. % to about 5 wt. % transition metal compound.

In the one or more embodiments, the inorganic support material may include a pH of less than about 7.5.

One or more embodiments include methods of forming catalyst systems. The methods generally include providing an inorganic support material including a bonding sequence selected from Si—O—Al—F, F—Si—O—Al, F—Si—O—Al—F and combinations thereof, wherein the inorganic support material includes an acid strength (pKa) of less than about 4.8 and contacting the inorganic support material with a transition metal compound to form the catalyst system, wherein the transition metal compound is represented by the formula $[L]_m M[A]_n$; wherein L is a bulky ligand, A is a leaving group, M is a transition metal and m and n are such that a total ligand valency corresponds to a transition metal valency.

In the one or more embodiments, the inorganic support material may include a surface acidity of at least 0.3 mmol/g.

One or more embodiments of the invention generally include methods of forming polyolefins. The methods generally include introducing an inorganic support material to a reaction zone, wherein the inorganic support material includes a bonding sequence selected from Si—O—Al—F, F—Si—O—Al, F—Si—O—Al—F and combinations thereof and an acid strength (pKa) of less than about 4.8, introducing a transition metal compound to the reaction zone, contacting the transition metal compound with the inorganic support material for in situ activation/heterogenization of the transition metal compound to form a catalyst system, introducing an olefin monomer to the reaction zone and contacting the catalyst system with the olefin monomer to form a polyolefin.

In the one or more embodiments, the inorganic support material may include a surface acidity of at least 0.3 mmol/g.

In the one or more embodiments, the catalyst system contacts the olefin monomer in the presence of an alkyl aluminum compound.

In the one or more embodiments, the alkyl aluminum compound may include triisobutyl aluminum.

One or more embodiments include methods of forming catalyst compositions for olefin polymerization. The methods generally include providing an inorganic support composition, wherein the inorganic support includes aluminum, fluorine and silica, contacting the inorganic support composition with a transition metal compound to form a supported catalyst system, wherein the transition metal compound is represented by the formula $[L]_m M[A]_n$; wherein L is a bulky ligand, A is a leaving group, M is a transition metal and m and n are such that a total ligand valency corresponds to the transition metal valency and contacting the inorganic support composition, the transition metal compound, the supported catalyst system or combinations thereof with at least one compound represented by the formula $XR_n$, wherein X is selected from Group 12 to 13 metals, lanthanide series metals or combinations thereof and each R is independently selected from alkyls, alkoxys, aryls, aryloxys, halogens, hydrides, Group 1 or 2 metals, organic nitrogen compounds, organic phosphorous compounds and combinations thereof and n is from 2 to 5.

In the one or more embodiments, each R is selected from $C_4$ to $C_{30}$ alkyls.

In the one or more embodiments, each R is selected from $C_4$ to $C_8$ alkyls.

In the one or more embodiments, X includes aluminum.

In the one or more embodiments, X includes boron.

In the one or more embodiments, the at least one compound includes a plurality of compounds.

In the one or more embodiments, the at least one compound may include a trialkyl aluminum and a trialkyl boron.

In the one or more embodiments, the inorganic support composition may include a bonding sequence selected from Si—O—Al—F, F—Si—O—Al, F—Si—O—Al—F and combinations thereof.

In the one or more embodiments, the aluminum and fluorine of the inorganic support composition are chemically bonded.

In the one or more embodiments, the inorganic support composition may include from about 1 to about 70 wt. % fluorine.

In the one or more embodiments, the inorganic support composition may include from about 1 to about 30 wt. % fluorine.

In the one or more embodiments, the inorganic support composition may include from about 2 to about 15 wt. % fluorine.

In the one or more embodiments, the inorganic support composition may include from about 2 to about 10 wt. % fluorine.

In the one or more embodiments, the inorganic support composition may include from about 5 to about 7 wt. % fluorine.

In the one or more embodiments, the inorganic support composition may include from about 1 to about 60 wt. % aluminum.

In the one or more embodiments, the inorganic support composition may include from about 13 to about 17 wt. % aluminum.

In the one or more embodiments, the L may include a $C_4$ to $C_{30}$ hydrocarbon, oxygen, nitrogen, phosphorus or combinations thereof, M is selected from Group 3 to 14 metals, lanthanides, actinides and combinations thereof and A is selected from halogens and $C_4$ to $C_{30}$ hydrocarbons.

In the one or more embodiments, the transition metal compound may include a Cp-Flu metallocene.

In the one or more embodiments, the transition metal compound may include a bis-indenyl metallocene.

In the one or more embodiments, the transition metal compound may include a bis-indenyl metallocene and a Cp-Flu metallocene.

In the one or more embodiments, the transition metal compound may include dimethylsilylbis(2-methyl-4-phenyl-indenyl)zirconium dichloride.

In the one or more embodiments, the at least one compound contacts the transition metal compound in an amount that is insufficient to alkylate the transition metal compound.

In the one or more embodiments, the method may further include isolating the supported catalyst system.

In the one or more embodiments, the supported catalyst system contacts the olefin monomer without isolation.

In the one or more embodiments, the method may further include contacting the inorganic support composition, the transition metal compound or the supported catalyst system with an anti-fouling agent.

In the one or more embodiments, at least one compound may be represented by the formula $XR_3$, wherein X is selected from Group 12 to 13 metals, lanthanide series metals or combinations thereof and each R is independently selected from alkyls, alkoxys, aryls, aryloxys, halogens, hydrides and combinations thereof.

One or more embodiments of the invention include methods of forming a catalyst composition for olefin polymerization. The methods generally include providing an inorganic support composition, wherein the inorganic support composition includes aluminum, fluorine and silica, contacting the inorganic support composition with a transition metal compound to form a supported catalyst system, wherein the transition metal compound is represented by the formula $[L]_m M [A]_n$; wherein L is a bulky ligand, A is a leaving group, M is a transition metal and m and n are such that a total ligand valency corresponds to the transition metal valency and contacting the inorganic support composition, the transition metal compound, the supported catalyst system or combinations thereof with a plurality of compounds, wherein the plurality of compounds include a first compound including an organo aluminum compound and a second compound comprising boron.

One or more embodiments of the invention include polymerization processes. The polymerization processes generally include providing an inorganic support composition, wherein the inorganic support composition includes aluminum, fluorine and silica, contacting the inorganic support composition with a transition metal compound to form a supported catalyst system, wherein the transition metal compound is represented by the formula $[L]_m M[A]_n$; wherein L is a bulky ligand, A is a leaving group, M is a transition metal and m and n are such that a total ligand valency corresponds to the transition metal valency, contacting the inorganic support composition, the transition metal compound, the supported catalyst system or combinations thereof with at least one compound represented by the formula $XR_n$, wherein X is selected from Group 12 to 13 metals, lanthanide series metals or combinations thereof and each R is independently selected from alkyls, alkoxys, aryls, aryloxys, halogens, hydrides, Group 1 or 2 metals, organic nitrogen compounds, organic phosphorous compounds and combinations thereof and n is from 2 to 5 and contacting the supported catalyst system with an olefin monomer to form a polyolefin.

DETAILED DESCRIPTION

Introduction and Definitions

Figure 1:
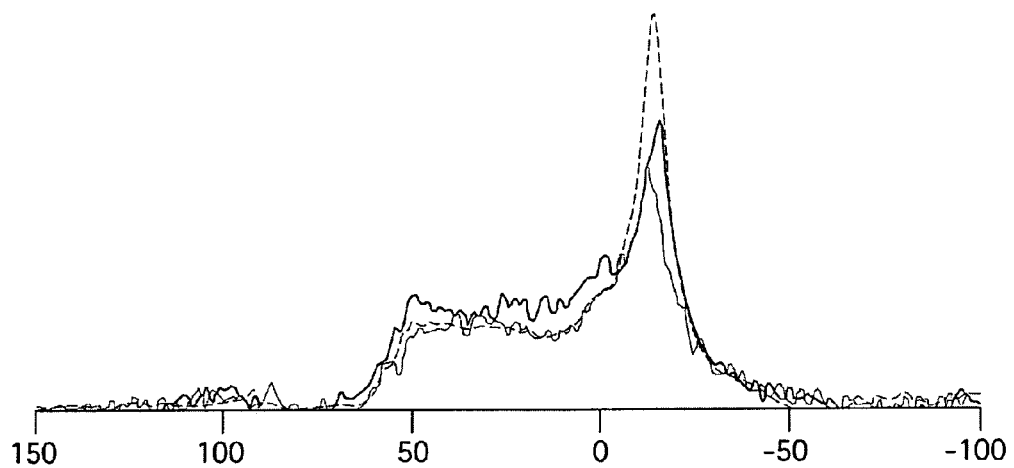
FIG. 1 illustrates $Al^{27}$ NMR spectra of polymer samples.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

As used herein, the term "impregnated" refers to a support material in which the aluminum fluoride (or derivatives thereof) is chemically bonded to the surface of the support material.

As used herein, the term "bonding sequence" refers to an element's sequence, wherein each element is connected to another by sigma bonds, dative bonds, ionic bonds or combinations thereof.

The term "tacticity" refers to the arrangement of pendant groups in a polymer. For example, a polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain.

As used herein, the term "aluminum containing support material" refers to the support material of all embodiments that is contacted with the transition metal catalyst. For example, the aluminum containing support material of the first embodiments refers to the aluminum fluoride impregnated support while the aluminum containing support material of other embodiments (e.g., the second embodiments) refers to the fluorinated support.

The term "commercial quantity" includes an amount sufficient to produce from about 1 ton/hr to about 5 tons/hour of a polyolefin or from about 1 ton to about 50 tons over a period of from about 5 days to about 2 years.

The term "open dish" refers to fast removal of volatile product.

The term "heterogeneous" refers to processes wherein the catalyst system is in a different phase than one or more reactants in the process.

As used herein, "room temperature", which is used interchangeably with the term "ambient", means that a temperature difference of a few degrees does not matter to the phenomenon under investigation, such as a preparation method. In some environments, room temperature may include a temperature of from about 21° C. to about 28° C. (68° F. to 72° F.), for example. However, room temperature measurements generally do not include close monitoring of the temperature of the process and therefore such a recitation does not intend to bind the embodiments described herein to any predetermined temperature range.

As used herein, the terms "aluminum", "silica", "fluorine" and "boron" refer to the chemical composition, as well as derivates thereof, such as borates, for example.

Various ranges are further recited below. It should be recognized that unless stated otherwise, it is intended that the endpoints are to be interchangeable. Further, any point within that range is contemplated as being disclosed herein.

Catalyst Systems

Embodiments of the invention generally include supported catalyst systems. The supported catalyst systems generally include a support material and a transition metal compound, which are described in greater detail below. As discussed in further detail below, the catalyst systems may be formed in a number of ways and sequences.

In one or more embodiments (e.g., first embodiment), the supported catalyst systems generally are formed by contacting a support material with an aluminum fluoride compound to form an aluminum fluoride impregnated support and contacting the aluminum fluoride impregnated support with a transition metal compound to form a supported catalyst system.

The "support material" as used in reference to the first embodiments refers to the support material prior to contact with the "aluminum fluoride", discussed in further detail below, and, in one embodiment, includes an inorganic support composition. The inorganic support compositions as used in all embodiments herein generally include materials known to one skilled in the art, such as talc, inorganic oxides, clays and clay minerals, ion-exchanged layered compounds, diatomaceous earth compounds, zeolites or a resinous support material, such as a polyolefin, for example. Specific inorganic oxides include silica, alumina, magnesia, titania, zirconia and combinations thereof, for example.

In one or more embodiments, the support material includes silica. In another embodiment, the support material is an alumina-silica (which may be used interchangeably herein as silica-alumina). In yet another embodiment, the support material includes a fluorinated alumina-silica. In one or more embodiments, the support material is formed of spherical particles and/or semi-spherical particles. In one or more embodiments, the support material is an aluminum containing support material.

In one or more embodiments, the support materials may have an average particle size of from about 5 microns to 200 microns, or from about 15 microns to about 30 microns, or from about 10 microns to 100 microns or from about 10 microns to about 30 microns, for example. The support materials may further have a surface area of from 50 m$^2$/g to 1,000 m$^2$/g, or from about 80 m$^2$/g to about 800 m$^2$/g, or from 100 m$^2$/g to 400 m$^2$/g, or from about 200 m$^2$/g to about 300 m$^2$/g or from about 150 m$^2$/g to about 300 m$^2$/g, for example. In addition, the support materials may have a pore volume of from about 0.1 cc/g to about 5 cc/g, or from about 0.5 cc/g to about 3.5 cc/g, or from about 0.5 cc/g to about 2.0 cc/g or from about 1.0 cc/g to about 1.5 cc/g, for example.

In one or more embodiments, the support material may have an effective number of reactive hydroxyl groups, e.g., a number that is sufficient for binding the aluminum fluoride to the support material. For example, the number of reactive hydroxyl groups in excess of the number needed to bind the aluminum fluoride to the support material may be minimized. In one embodiment, the support material may include from about 0.1 mmol OH$^-$/g Si to about 5 mmol OH$^-$/g Si or from about 0.5 mmol OH$^-$/g Si to about 4 mmol OH$^-$/g Si, for example.

The support materials are generally commercially available materials, such as P10 alumina silica, commercially available from Fuji Sylisia Chemical LTD, for example (e.g., silica alumina having a surface area of 281 m$^2$/g and a pore volume of 1.4 ml/g).

First embodiments of the invention further include contacting the support material with an aluminum fluoride to form an aluminum fluoride impregnated support.

Attempts to create highly active (e.g., greater than about 10,000 g/g/hr) metallocene catalysts have recently included utilizing fluorine salts and ammonium fluorides, for example. However, when such processes have approached commercial production, environmental concerns have been raised (e.g., such processes may result in ammonia releases into the environment).

Further, analysis of such fluorinated aluminum silica samples, and in particular NMR analysis, has revealed an interesting phenomenon. The Al$^{27}$ NMR spectra of such samples exhibited peaks around −15 ppm, which is generally characteristic of an aluminum trifluoride (AlF$_5$ moiety) species. In addition, a broad feature from 50 ppm to −40 ppm was observed, corresponding to a variety of aluminum containing compounds. See, FIG. 1. The analysis further revealed that the intensity of the peaks around −15 ppm increased with an increasing amount of aluminum fluoride being used in the fluorination process, which also corresponded with the polymers formed from catalysts exhibiting the highest activities. Note that the specific species corresponding to each line is not relevant to this analysis and therefore is not included herein.

As briefly discussed, first embodiments of the invention include contacting the support material with an aluminum fluoride. The aluminum fluoride includes a compound including aluminum and fluorine. For example, in one embodiment, the aluminum fluoride is generally represented by the formula AlF$_p$X$_{3-p}$B$_q$, wherein X is selected from Cl, Br and OH$^-$, B is H$_2$O, p is selected from 1 to 3 and q is selected from 0 to 6. In one embodiment, the aluminum fluoride is aluminum trifluoride. It is to be noted that in one or more embodiments, primarily the first embodiments, the aluminum fluoride does not include ammonium, as it is believed that ammonium may decompose during the fluorinating process, resulting in environmental concerns for large scale production.

The fluorination process of the first embodiments may include contacting the support material with the aluminum fluoride at a temperature of from about 100° C. to about 250° C. or from about 150° C. to about 200° C. for a time of from about 1 hour to about 10 hours or from about 1 hour to about 5 hours, for example, to form an aluminum fluoride impregnated support.

In the fluorination process of one or more embodiments (e.g., the second embodiments), the aluminum containing support materials may be formed by contacting the support material with a first aluminum containing compound. Such contact may occur at a reaction temperature of from about room temperature to about 150° C. The formation may further include calcining at a calcining temperature of from about 150° C. to about 600° C., or from about 200° C. to about 600° C. or from about 350° C. to about 500° C., for example. In one embodiment, the calcining occurs in the presence of an oxygen containing compound, for example.

The first aluminum containing compound may include an organic aluminum containing compound. The organic aluminum containing compound may be represented by the formula AlR$_3$, wherein each R is independently selected from alkyls, aryls and combinations thereof. The organic aluminum compound may include methyl alumoxane (MAO) or modified methyl alumoxane (MMAO), for example or, in a specific embodiment, triethyl aluminum (TEAl), triisobutyl aluminum (TIBAl) or trioctylaluminum (TNOAl), for example.

The support composition of the second embodiments is fluorinated by methods known to one skilled in the art. For example, the support composition may be contacted with a fluorinating agent to form the fluorinated support. The fluorination process may include contacting the support composition with the fluorine containing compound at a first temperature of from about 100° C. to about 200° C. for a first time of from about 1 hour to about 10 hours or from about 1 hour to about 5 hours, for example and then raising the temperature to a second temperature of from about 250° C. to about 550° C. or from about 400° C. to about 500° C. for a second time of from about 1 hour to about 10 hours, for example.

As described herein, the "support composition" of the second embodiments may be impregnated with aluminum prior to contact with the fluorinating agent, after contact with the fluorinating agent or simultaneously with contact with the fluorinating agent. In one of the second embodiments, the fluorinated support composition is formed by simultaneously forming $SiO_2$ and $Al_2O_3$ and then contacting the with the fluorinating agent. In another of the second embodiments, the fluorinated support composition is formed by contacting an aluminum containing silica support material with the fluorinating agent. In yet another second embodiment, the fluorinated support composition is formed by contacting a silica support material with the fluorinating agent and then contacting the fluorinated support with the first aluminum containing compound.

The fluorinating agent of the second embodiments generally includes any fluorinating agent which can form fluorinated supports. Suitable fluorinating agents include, but are not limited to, hydrofluoric acid (HF), ammonium fluoride ($NH_4F$), ammonium bifluoride ($NH_4HF_2$), ammonium fluoroborate ($NH_4BF_4$), ammonium silicofluoride (($NH_4)_2SiF_6$), ammonium fluorophosphates ($NH_4PF_6$), ($NH_4)_2TaF_7$, $NH_4NbF_4$, ($NH_4)_2GeF_6$, ($NH_4)_2SmF_6$, ($NH_4)_2TiF_6$, ($NH_4$)$ZrF_6$, $MoF_6$, $ReF_6$, $SO_2ClF$, $F_2$, $SiF_4$, $SF_6$, $ClF_3$, $ClF_5$, $BrF_5$, $IF_7$, $NF_3$, HF, $BF_3$, $NHF_2$ and combinations thereof, for example. In one or more embodiments, the fluorinating agent is an ammonium fluoride including a metalloid or nonmetal (e.g., ($NH_4)_2PF_6$, ($NH_4)_2BF_4$, ($NH_4)_2SiF_6$).

In one or more of the second embodiments, the molar ratio of fluorine to the first aluminum containing compound (F:$Al^1$) is generally from about 0.5:1 to 6:1 or from about 0.5:1 to about 4:1, for example.

In one or more embodiments, the aluminum containing support material has a bonding sequence selected from Si—O—Al—F, F—Si—O—Al or F—Si—O—Al—F, for example. In one of the first embodiments, the aluminum fluoride impregnated support exhibits a bonding sequence of Fl-Al—O—Si or Fl-Al—O—Al—O—Si.

In one or more embodiments, the aluminum containing support materials (e.g., aluminum fluoride impregnated support) may have an aluminum content of from about 0.5 wt. % to about 95 wt. %, or from about 0.1 wt. % to about 20 wt. %, or from about 0.1 wt. % to about 50 wt. %, or from about 1 wt. % to about 25 wt. %, or from about 2 wt. % to about 8 wt. %, or from about 7 wt. % to about 15 wt. % or at least about 10 wt. %, for example.

In one of the first embodiments, the aluminum fluoride impregnated support includes at least about 1 wt. % or at least about 5 wt. % of the aluminum fluoride, for example.

It has been observed that fluorinated supports having a high aluminum and fluorine content (as discussed herein) resulted in increased thermal stability, and therein increased activity.

In one of the second embodiments, the aluminum containing support materials may further have a silica to aluminum molar ratio of from about 0.01:1 to about 1000:1, for example.

Six well-characterized crystalline phases of aluminum fluorides are known to one skilled in the art, which exhibit varying degrees of Lewis acidity. See, T. Krahl, E. Kemnitz, J. Fluorine Chem., 127 (2006), 663-678, which is incorporated by reference herein. Analysis of the structures of $AlF_3$ by embodiments of the invention has led to the extrapolation that the acidity of the surface, and therefore the activity of the resulting catalyst may relate to the coordination number of the aluminum center. Therefore, the first embodiments of the invention generally provide for lowering the coordination number of the aluminum fluoride (e.g., via complex formation, dissolution or impregnation). In one or more first embodiments, the coordination number is lowered via impregnation of the aluminum fluoride.

The first embodiments of the invention further include heating the aluminum fluoride impregnated support at a temperature of at least about 400° C., or from about 350° C. to about 600° C. or from about 400° C. to about 500° C. for a time of at least about 1 hour, or from about 1 hour to about 10 hours or from about 1.5 hours to about 5 hours, for example, to form a support which may have a modified chemical structure.

In one or more embodiments, the aluminum containing support (e.g., the aluminum fluoride impregnated support) is prepared by a cogel method (e.g., a gel including both silica and alumina). As used herein, the term "cogel method" refers to a preparation process including mixing a solution including the aluminum fluoride into a gel of the support material (e.g., $AlF_3+H_2SO_4+Na_2O$—$SiO_2$).

Embodiments of the invention generally include contacting the aluminum containing support material (e.g., aluminum fluoride impregnated support) with a transition metal compound to form a supported catalyst composition. Such processes are generally known to ones skilled in the art and may include charging the transition metal compound in an inert solvent. Although the process is discussed below in terms of charging the transition metal compound in an inert solvent, the aluminum containing support material (either in combination with the transition metal compound or alternatively) may be mixed with the inert solvent to form a support slurry prior to contact with the transition metal compound. Methods for supporting transition metal catalysts are generally known in the art. (See, U.S. Pat. No. 5,643,847, U.S. Pat. No. 9,184,358 and U.S. Pat. No. 9,184,389, which are incorporated by reference herein.)

A variety of solvents may be used as the inert solvent, but any solvent selected should remain in liquid form at all relevant reaction temperatures and the ingredients used to form the supported catalyst composition should be at least partially soluble in the solvent.

Suitable solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof. In one specific embodiment, the inert solvent includes isohexane. In another embodiment, the inert solvent includes mineral oil including an amount of toluene.

The transition metal compound and the aluminum containing support material may be contacted at a reaction temperature of from about −60° C. to about 120° C. or from about −45° C. to about 112° C. or at a reaction temperature below about 90° C., e.g., from about 0° C. to about 50° C., or from about 20° C. to about 30° C. or at room temperature, for example, for a time of from about 10 minutes to about 5 hours or from about 30 minutes to about 120 minutes, for example.

In addition, and depending on the desired degree of substitution, the weight ratio of fluorine to transition metal (F:M) may be from about 1:1 to about 20:1 or from about 1:1 to about 5:1, for example. In one embodiment, the supported catalyst composition includes from about 0.1 wt. % to about 5 wt. % or from about 1 wt. % to about 3 wt. % transition metal compound.

Upon completion of the reaction, the solvent, along with reaction by-products, may be removed from the mixture in a conventional manner, such as by evaporation or filtering, to obtain the dry, supported catalyst composition. For example, the supported catalyst composition may be dried in the presence of magnesium sulfate. The filtrate, which contains the supported catalyst composition in high purity and yield can, without further processing, be directly used in the polymerization of olefins if the solvent is a hydrocarbon. In such a process, the aluminum fluoride impregnated support and the transition metal compound are contacted prior to subsequent polymerization (e.g., prior to entering a reaction vessel). Alternatively, the process may include contacting the aluminum fluoride impregnated support with the transition metal in proximity to contact with an olefin monomer (e.g., contact within a reaction vessel).

In one specific embodiment (e.g., third embodiments) useful for producing the catalyst systems described herein in commercial quantities, the catalyst system is formed by contacting an alumina-silica support composition with ammonium bifluoride in the presence of water to form a first fluorinated support composition. The third embodiments then include heating the first fluorinated support composition in an oxygen containing atmosphere to a temperature of from about 200° C. to about 600° C. to form a second fluorinated support composition, wherein the second fluorinated support composition includes a bonding sequence selected from Si—O—Al—F, F—Si—O—Al, F—Si—O—Al—F and combinations thereof and then contacting the second fluorinated support composition with a transition metal compound to form a supported catalyst system, wherein the transition metal compound is represented by the formula $[L]_m M[A]_n$; wherein L is a bulky ligand, A is a leaving group, M is a transition metal and m and n are such that a total ligand valency corresponds to the transition metal valency.

In one specific third embodiment, the method includes contacting a commercial quantity of alumina-silica support composition with an aqueous fluorinating agent to form a first fluorinated support composition, heating the first fluorinated support composition in an oxygen containing atmosphere to a temperature of from about 200° C. to about 600° C. to form a second fluorinated support composition and contacting the second fluorinated support composition with the transition metal compound to form a supported catalyst system.

In another specific third embodiment, the method includes contacting an alumina-silica support composition with a fluorinating agent in the presence of water within a muffle furnace to form a first fluorinated support composition, heating the first fluorinated support composition in an oxygen containing atmosphere to a temperature of from about 200° C. to about 600° C. to form a second fluorinated support composition and contacting the second fluorinated support composition with the transition metal compound to form a supported catalyst system.

The contact of the alumina-silica support composition with the fluorinating agent in third embodiments may occur in a single batch, in multiple batches, in an open dish or in a container with partial removal of the volatile product, for example.

In one specific third embodiment, the fluorinating agent includes ammonium and a fluorine containing compound. For example, the fluorinating agent includes ammonium bifluoride.

In one or more third embodiments, the first fluorinated support composition includes from about 1 wt. % to about 30 wt. % fluorinating agent, or from about 2 wt. % to about 25 wt. % or from about 5 wt. % to about 20 wt. %, for example.

In one or more third embodiments, the alumina-silica includes from about 1 wt. % to about 30 wt. % alumina, or from about 2 wt. % to about 25 wt. % or from about 5 wt. % to about 20 wt. %, for example.

In one or more third embodiments, the second fluorinated support composition includes from about 0.1 wt. % to about 15 wt. % fluorine or from about 1 wt. % to about 10 wt. %, for example.

In one or more third embodiments, the second fluorinated support composition includes a molar ratio of aluminum to fluorine of from about 0.1 to about 10, or from about 1 to about 8 or of about 1 to 1, for example.

In one or more third embodiments, the first fluorinated support composition is heated to a first temperature for a first time of from about 1 hour to about 4 hours or from about 2 hours to about 3 hours, for example, and then to a second temperature for a time of from about 1 hour to about 10 hours or from about 2 hours to about 6 hours, for example, wherein the second temperature is greater than the first temperature. For example, the first temperature may be from about 20° C. to about 200° C. or from about 50° C. to about 150° C. and the second temperature may be from about 200° C. to about 450° C. or from about 300° C. to about 400° C.

One or more embodiments (e.g., fourth embodiments) of the invention generally include contacting the fluorinated support with a transition metal compound to form a supported catalyst composition. The contact includes in situ activation/heterogenization of the transition metal compound. The term "in situ activation/heterogenization" refers to activation/formation of the catalyst at the point of contact between the support material and the transition metal compound. Such contact may occur in a reaction zone, either prior to, simultaneous with or after the introduction of one or more olefin monomers thereto.

Alternatively, the transition metal compound and the fluorinated support may be pre-contacted (contacted prior to entrance to a reaction zone) at a reaction temperature of from about −60° C. to about 120° C. or from about −45° C. to about 100° C. or at a reaction temperature below about 90° C., e.g., from about 0° C. to about 50° C., or from about 20° C. to about 30° C. or at room temperature, for example, for a time of from about 10 minutes to about 5 hours or from about 30 minutes to about 120 minutes, for example.

In addition, and depending on the desired degree of substitution, the weight ratio of fluorine to transition metal (F:M) is, in the fourth embodiments, from about 1 equivalent to about 20 equivalents or from about 1 to about 5 equivalents, for example. In one fourth embodiment, the supported catalyst composition includes from about 0.1 wt. % to about 5 wt. % or from about 0.5 wt. % to about 2.5 wt. % transition metal compound.

In one or more embodiments (e.g., fifth embodiments), the molar ratio of fluorine to the first aluminum containing compound (F:Al$^1$) is generally from about 0.5:1 to 6:1, or from about 0.5:1 to about 4:1 or from about 2.5:1 to about 3.5:1, for example.

The fluorinated support of the fifth embodiments may have a pH that is lower than about 8.0, or less than about 7.8, or less than about 7.6, or less than about 7.0, or less than about 6.5, or less than about 6.0 or less than about 5.5, for example.

The fluorinated support of the fifth embodiments generally has an acid strength (pKa) that is lower than about 4.8, or less than about 4.6, or less than about 4.3 or less than about 4.0, for example.

The fluorinated support of the fifth embodiments may have a surface acidity (as defined in the examples) that is greater than about 0.3 mmol/g, or greater than about 0.35 or greater than about 4.0, for example.

In one or more embodiments, the transition metal compound includes a metallocene catalyst, a late transition metal catalyst, a post metallocene catalyst or combinations thereof. Late transition metal catalysts may be characterized generally as transition metal catalysts including late transition metals, such as nickel, iron or palladium, for example. Post metallocene catalysts may be characterized generally as transition metal catalysts including Group IV, V or VI metals, for example. A brief discussion of such catalyst systems is included below, but is in no way intended to limit the scope of the invention to such catalysts.

Metallocene catalysts may be characterized generally as coordination compounds incorporating one or more cyclopentadienyl (Cp) groups (which may be substituted or unsubstituted, each substitution being the same or different) coordinated with a transition metal.

The substituent groups on Cp may be linear, branched or cyclic hydrocarbyl radicals, for example. The inclusion of cyclic hydrocarbyl radicals may transform the Cp into other contiguous ring structures, such as indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

A specific, non-limiting, example of a metallocene catalyst is a bulky ligand metallocene compound generally represented by the formula:

$$[L]_m M[A]_n;$$

wherein L is a bulky ligand, A is a leaving group, M is a transition metal and m and n are such that the total ligand valency corresponds to the transition metal valency. For example m may be from 1 to 4 and n may be from 0 to 3.

The metal atom "M" of the metallocene catalyst compound, as described throughout the specification and claims, may be selected from Groups 3 through 12 atoms and lanthanide Group atoms, or from Groups 3 through 10 atoms or from Sc, Ti, Zr, Hf, V, Nb, Ta, Mn, Re, Fe, Ru, Os, Co, Rh, Ir and Ni. The oxidation state of the metal atom "M" may range from 0 to +7 or is +1, +2, +3, +4 or +5, for example.

The bulky ligand generally includes a cyclopentadienyl group (Cp) or a derivative thereof. The Cp ligand(s) form at least one chemical bond with the metal atom M to form the "metallocene catalyst". The Cp ligands are distinct from the leaving groups bound to the catalyst compound in that they are not as highly susceptible to substitution/abstraction reactions as the leaving groups.

Cp ligands may include ring(s) or ring system(s) including atoms selected from group 13 to 16 atoms, such as carbon, nitrogen, oxygen, silicon, sulfur, phosphorous, germanium, boron, aluminum and combinations thereof, wherein carbon makes up at least 50% of the ring members. Non-limiting examples of the ring or ring systems include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, 3,4-benzofluorenyl, 9-phenylfluorenyl, 8-H-cyclopent[a]acenaphthylenyl, 7-H-dibenzofluorenyl, indeno[1, 2-9]anthrene, thiophenoindenyl, thiophenofluorenyl, hydrogenated versions thereof (e.g., 4,5, 6,7-tetrahydroindenyl or "H$_4$Ind"), substituted versions thereof and heterocyclic versions thereof, for example.

Cp substituent groups may include hydrogen radicals, alkyls (e.g., methyl, ethyl, propyl, butyl, pentyl, hexyl, fluoromethyl, fluoroethyl, difluoroethyl, iodopropyl, bromohexyl, benzyl, phenyl, methylphenyl, tert-butylphenyl, chlorobenzyl, dimethylphosphine and methylphenylphosphine), alkenyls (e.g., 3-butenyl, 2-propenyl and 5-hexenyl), alkynyls, cycloalkyls (e.g., cyclopentyl and cyclohexyl), aryls (e.g., trimethylsilyl, trimethylgermyl, methyldiethylsilyl, acyls, aroyls, tris(trifluoromethyl)silyl, methylbis(difluoromethyl)silyl and bromomethyldimethylgermyl), alkoxys (e.g., methoxy, ethoxy, propoxy and phenoxy), aryloxys, alkylthiols, dialkylamines (e.g., dimethylamine and diphenylamine), alkylamidos, alkoxycarbonyls, aryloxycarbonyls, carbamoyls, alkyl- and dialkyl-carbamoyls, acyloxys, acylaminos, aroylaminos, organometalloid radicals (e.g., dimethylboron), Group 15 and Group 16 radicals (e.g., methylsulfide and ethylsulfide) and combinations thereof, for example. In one embodiment, at least two substituent groups, two adjacent substituent groups in one embodiment, are joined to form a ring structure.

Each leaving group "A" is independently selected and may include any ionic leaving group, such as halogens (e.g., chloride and fluoride), hydrides, $C_1$ to $C_{12}$ alkyls (e.g., methyl, ethyl, propyl, phenyl, cyclobutyl, cyclohexyl, heptyl, tolyl, trifluoromethyl, methylphenyl, dimethylphenyl and trimethylphenyl), $C_2$ to $C_{12}$ alkenyls (e.g., $C_2$ to $C_6$ fluoroalkenyls), $C_6$ to $C_{12}$ aryls (e.g., $C_7$ to $C_{20}$ alkylaryls), $C_1$ to $C_{12}$ alkoxys (e.g., phenoxy, methyoxy, ethyoxy, propoxy and benzoxy), $C_6$ to $C_{16}$ aryloxys, $C_7$ to $C_{18}$ alkylaryloxys and $C_1$ to $C_{12}$ heteroatom-containing hydrocarbons and substituted derivatives thereof, for example.

Other non-limiting examples of leaving groups include amines, phosphines, ethers, carboxylates (e.g., $C_1$ to $C_6$ alkylcarboxylates, $C_6$ to $C_{12}$ arylcarboxylates and $C_7$ to $C_{18}$ alkylarylcarboxylates), dienes, alkenes (e.g., tetramethylene, pentamethylene, methylidene), hydrocarbon radicals having from 1 to 20 carbon atoms (e.g., pentafluorophenyl) and combinations thereof, for example. In one embodiment, two or more leaving groups form a part of a fused ring or ring system.

In a specific embodiment, L and A may be bridged to one another to form a bridged metallocene catalyst. A bridged metallocene catalyst, for example, may be described by the general formula:

$$XCp^A Cp^B MA_n;$$

wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups "X" include divalent hydrocarbon groups containing at least one Group 13 to 16 atom, such as, but not limited to, at least one of a carbon, oxygen, nitrogen, silicon, aluminum, boron, germanium, tin and combinations thereof, wherein the heteroatom may also be a $C_1$ to $C_{12}$ alkyl or aryl group substituted to satisfy a neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, $—Si(R)_2Si(R_2)—$, $R_2Ge=$ or $RP=$ (wherein "=" represents two chemical bonds), where R is independently selected from hydrides, hydrocarbyls, halocarbyls, hydrocarbyl-substituted organometalloids, halocarbyl-substituted organometalloids, disubstituted boron atoms, disubstituted Group 15 atoms, substituted Group 16 atoms and halogen radicals, for example. In one embodiment, the bridged metallocene catalyst component has two or more bridging groups.

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl.

In another embodiment, the bridging group may also be cyclic and include 4 to 10 ring members or 5 to 7 ring members, for example. The ring members may be selected from the elements mentioned above and/or from one or more of boron, carbon, silicon, germanium, nitrogen and oxygen, for example. Non-limiting examples of ring structures which may be present as or part of the bridging moiety are cyclobutylidene, cyclopentylidene, cyclohexylidene, cycloheptylidene, cyclooctylidene, for example. The cyclic bridging groups may be saturated or unsaturated and/or carry one or more substituents and/or be fused to one or more other ring structures. The one or more Cp groups which the above cyclic bridging moieties may optionally be fused to may be saturated or unsaturated. Moreover, these ring structures may themselves be fused, such as, for example, in the case of a naphthyl group.

In one embodiment, the metallocene catalyst includes CpFlu Type catalysts (e.g., a metallocene catalyst wherein the ligand includes a Cp fluorenyl ligand structure) represented by the following formula:

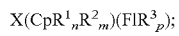

wherein Cp is a cyclopentadienyl group or derivatives thereof, Fl is a fluorenyl group, X is a structural bridge between Cp and Fl, $R^1$ is an optional substituent on the Cp, n is 1 or 2, $R^2$ is an optional substituent on the Cp bound to a carbon immediately adjacent to the ipso carbon, m is 1 or 2 and each $R^3$ is optional, may be the same or different and may be selected from $C_1$ to $C_{20}$ hydrocarbyls. In one embodiment, at least one $R^3$ is substituted in either the 2 or 7 position on the fluorenyl group and at least one other $R^3$ being substituted at an opposed 2 or 7 position on the fluorenyl group and p is 2 or 4.

In yet another aspect, the metallocene catalyst includes bridged mono-ligand metallocene compounds (e.g., mono cyclopentadienyl catalyst components). In this embodiment, the metallocene catalyst is a bridged "half-sandwich" metallocene catalyst. In yet another aspect of the invention, the at least one metallocene catalyst component is an unbridged "half sandwich" metallocene. (See, U.S. Pat. No. 6,069,213, U.S. Pat. No. 5,026,798, U.S. Pat. No. 5,703,187, U.S. Pat. No. 5,747,406, U.S. Pat. No. 5,026,798 and U.S. Pat. No. 6,069,213, which are incorporated by reference herein.)

Non-limiting examples of metallocene catalyst components consistent with the description herein include, for example cyclopentadienylzirconium$A_n$; indenylzirconium$A_n$; (1-methylindenyl)zirconium$A_n$; (2-methylindenyl)zirconium$A_n$, (1-propylindenyl)zirconium$A_n$; (2-propylindenyl)zirconium$A_n$; (1-butylindenyl)zirconium$A_n$; (2-butylindenyl)zirconium$A_n$; methylcyclopentadienylzirconium$A_n$; tetrahydroindenylzirconium$A_n$; pentamethylcyclopentadienylzirconium$A_n$; cyclopentadienylzirconium$A_n$; pentamethylcyclopentadienyltitanium$A_n$; tetramethylcyclopentyltitanium$A_n$; (1,2,4-trimethylcyclopentadienyl)zirconium$A_n$; dimethylsilyl(1,2,3,4-tetramethylcyclopentadienyl)(cyclopentadienyl)zirconium$A_n$; dimethylsilyl(1,2,3,4-tetramethylcyclopentadienyl)(1,2,3-trimethylcyclopentadienyl)zirconium$A_n$; dimethylsilyl(1,2,3,4-tetramethylcyclopentadienyl)(1,2-dimethylcyclopentadienyl)zirconium$A_m$; dimethylsilyl(1,2,3,4-tetramethylcyclopentadienyl)(2-methylcyclopentadienyl)zirconium$A_n$; dimethylsilylcyclopentadienylindenylzirconium$A_n$; dimethylsilyl(2-methylindenyl)(fluorenyl)zirconium$A_n$; diphenylsilyl(1,2,3,4-tetramethylcyclopentadienyl)(3-propylcyclopentadienyl)zirconium$A_n$; dimethylsilyl (1,2,3,4-tetramethylcyclopentadienyl) (3-t-butylcyclopentadienyl)zirconium$A_n$; dimethylgermyl(1,2-dimethylcyclopentadienyl)(3-isopropylcyclopentadienyl)zirconium$A_n$; dimethylsilyl(1,2,3,4-tetramethylcyclopentadienyl)(3-methylcyclopentadienyl)zirconium$A_n$; diphenylmethylene(cyclopentadienyl)(9-fluorenyl)zirconium$A_n$; diphenylmethylenecyclopentadienylindenylzirconium$A_n$; isopropylidenebiscyclopentadienylzirconium$A_n$; isopropylidene(cyclopentadienyl)(9-fluorenyl)zirconium$A_n$; isopropylidene(3-methylcyclopentadienyl)(9-fluorenyl)zirconium$A_n$; ethylenebis(9-fluorenyl)zirconium$A_n$; ethylenebis(1-indenyl)zirconium$A_n$; ethylenebis(1-indenyl)zirconium$A_n$; ethylenebis(2-methyl-1-indenyl)zirconium$A_n$; ethylenebis(2-methyl-4,5,6,7-tetrahydro-1-indenyl)zirconium$A_n$; ethylenebis(2-propyl-4,5,6,7-tetrahydro-1-indenyl)zirconium$A_n$; ethylenebis(2-isopropyl-4,5,6,7-tetrahydro-1-indenyl)zirconium$A_n$; ethylenebis(2-butyl-4,5,6,7-tetrahydro-1-indenyl)zirconium$A_n$; ethylenebis(2-isobutyl-4,5,6,7-tetrahydro-1-indenyl)zirconium$A_n$; dimethylsilyl(4,5,6,7-tetrahydro-1-indenyl)zirconium$A_n$; diphenyl(4,5,6,7-tetrahydro-1-indenyl)zirconium$A_n$; ethylenebis(4,5,6,7-tetrahydro-1-indenyl)zirconium$A_n$; dimethylsilylbis(cyclopentadienyl)zirconium$A_n$; dimethylsilylbis(9-fluorenyl)zirconium$A_n$; dimethylsilylbis(1-indenyl)zirconium$A_n$; dimethylsilylbis(2-methylindenyl)zirconium$A_n$; dimethylsilylbis(2-propylindenyl)zirconium$A_n$; dimethylsilylbis(2-butylindenyl)zirconium$A_n$; diphenylsilylbis(2-methylindenyl)zirconium$A_n$; diphenylsilylbis(2-propylindenyl)zirconium$A_n$; diphenylsilylbis(2-butylindenyl)zirconium$A_n$; dimethylgermylbis(2-methylindenyl)zirconium$A_n$; dimethylsilylbistetrahydroindenylzirconium$A_n$; dimethylsilylbistetramethylcyclopentadienylzirconium$A_n$; dimethylsilyl(cyclopentadienyl)(9-fluorenyl)zirconium$A_n$; diphenylsilyl(cyclopentadienyl)(9-fluorenyl)zirconium$A_n$; diphenylsilylbisindenylzirconium$A_n$; cyclotrimethylenesilyltetramethylcyclopentadienylcyclopentadienylzirconium$A_n$; cyclotetramethylenesilyltetramethylcyclopentadienylcyclopentadienylzirconium$A_n$; cyclotrimethylenesilyl(tetramethylcyclopentadienyl)(2-methylindenyl)zirconium$A_n$; cyclotrimethylenesilyl(tetramethylcyclopentadienyl)(3-methylcyclopentadienyl)zirconium$A_n$; cyclotrimethylenesilylbis(2-methylindenyl)zirconium$A_n$; cyclotrimethylenesilyl(tetramethylcyclopentadienyl)(2,3,5-trimethylclopentadienyl)zirconium$A_n$; cyclotrimethylenesilylbis(tetramethylcyclopentadienyl)zirconium$A_n$; dimethylsilyl(tetramethylcyclopentadieneyl)(N-tertbutylamido)titanium$A_n$; biscyclopentadienylchromium$A_n$; biscyclopentadienylzirconium$A_n$; bis(n-butylcyclopentadienyl)zirconium$A_n$; bis(n- dodecyclcyclopentadienyl)zirconium$A_n$; bisethylcyclopentadienylzirconium$A_n$; bisisobutylcyclopentadienylzirconium$A_n$; bisisopropylcyclopentadienylzirconium$A_n$; bismethylcyclopentadienylzirconium$A_n$; bisoctylcyclopentadienylzirconium$A_n$; bis(n-pentylcyclopentadienyl)zirconium$A_n$; bis(n-propylcyclopentadienyl)zirconium$A_n$; bistrimethylsilylcyclopentadienylzirconium$A_n$; bis(1,3-bis(trimethylsilyl)cyclopentadienyl)zirconium$A_n$; bis(1-ethyl-2-methylcyclopentadienyl)zirconium$A_n$; bis(1-ethyl-3-methylcyclopentadienyl)zirconium$A_n$; bispentamethylcyclopentadienylzirconium$A_n$; bispentamethylcyclopentadienylzirconium$A_n$; bis(1-propyl-3-methylcyclopentadienyl)zirconium$A_n$; bis(1-n-butyl-3-methylcyclopentadienyl)zirconium$A_n$; bis(1-isobutyl-3-methylcyclopentadienyl)zirconium$A_n$; bis(1-propyl-3-butylcyclopentadienyl)zirconium$A_n$; bis(1,3-n-butylcyclopentadienyl)zirconium$A_n$; bis(4,7-dimethylindenyl)zirconium$A_n$; bisindenylzirconium$A_n$; bis(2-methylindenyl)zirconium$A_n$; cyclopentadienylindenylzirconium$A_n$; bis(n-propylcyclopentadienyl)hafnium$A_n$; bis(n-butylcyclopentadienyl)hafnium$A_n$; bis(n-pentylcyclopentadienyl)hafnium$A_n$; (n-propylcyclopentadienyl)(n-butylcyclopentadienyl)hafnium$A_n$; bis[(2-trimethylsilylethyl)cyclopentadienyl]hafnium$A_n$; bis(trimethylsilylcyclopentadienyl)hafnium$A_n$; bis(2-n-propylindenyl)hafnium$A_n$; bis(2-n-butylindenyl)hafnium$A_n$; dimethylsilylbis(n-propylcyclopentadienyl)hafnium$A_n$; dimethylsilylbis(n-butylcyclopentadienyl)hafnium$A_n$; bis(9-n-propylfluorenyl)hafnium$A_n$; bis(9-n-butylfluorenyl)hafnium$A_n$; (9-n-propylfluorenyl)(2-n-propylindenyl)hafnium$A_n$; bis(1-n-propyl-2-methylcyclopentadienyl)hafnium$A_n$; (n-propylcyclopentadienyl)(1-n-propyl-3-n-butylcyclopentadienyl)hafnium$A_n$; dimethylsilyltetramethylcyclopentadienylcyclopropylamidotitanium$A_n$; dimethylsilyltetramethyleyclopentadienylcyclobutylamidotitanium$A_n$; dimethylsilyltetramethyleyclopentadienylcyclopentylamidotitanium$A_n$; dimethylsilyltetramethylcyclopentadienylcyclohexylamidotitanium$A_n$; dimethylsilyltetramethylcyclopentadienylcycloheptylamidotitanium$A_n$; dimethylsilyltetramethylcyclopentadienylcyclooctylamidotitanium$A_n$; dimethylsilyltetramethylcyclopentadienylcyclononylamidotitanium$A_n$; dimethylsilyltetramethylcyclopentadienylcyclodecylamidotitanium$A_n$; dimethylsilyltetramethylcyclopentadienylcycloundecylamidotitanium$A_n$; dimethylsilyltetramethylcyclopentadienylcyclododecylamidotitanium$A_n$; dimethylsilyltetramethylcyclopentadienyl(sec-butylamido)titanium$A_n$; dimethylsilyl(tetramethylcyclopentadienyl)(n-octylamido)titanium$A_n$; dimethylsilyl(tetramethylcyclopentadienyl)(n-decylamido)titanium$A_n$; dimethylsilyl(tetramethylcyclopentadienyl)(n-octadecylamido)titanium$A_n$; dimethylsilylbis(cyclopentadienyl)zirconium$A_n$; dimethylsilylbis(tetramethylcyclopentadienyl)zirconium$A_n$; dimethylsilylbis(methylcyclopentadienyl)zirconium$A_n$; dimethylsilylbis(dimethylcyclopentadienyl)zirconium$A_n$; dimethylsilyl(2,4-dimethylcyclopentadienyl)(3',5'-dimethylcyclopentadienyl)zirconium$A_n$; dimethylsilyl(2,3,5-trimethylcyclopentadienyl)(2',4',5'-dimethylcyclopentadienyl)zirconium$A_n$; dimethylsilylbis(t-butylcyclopentadienyl)zirconium$A_n$; dimethylsilylbis(trimethylsilylcyclopentadienyl)zirconium$A_n$; dimethylsilylbis(2-trimethylsilyl-4-t-butylcyclopentadienyl)zirconium$A_n$; dimethylsilylbis(4,5,6,7-tetrahydro-indenyl)zirconium$A_n$; dimethylsilylbis(indenyl)zirconium$A_n$; dimethylsilylbis(2-methylindenyl)zirconium$A_n$; dimethylsilylbis(2,4-dimethylindenyl)zirconium$A_n$; dimethylsilylbis(2,4,7-trimethylindenyl)zirconium$A_n$; dimethylsilylbis(2-methyl-4-phenylindenyl)zirconium$A_n$; dimethylsilylbis(2-ethyl-4-phenylindenyl)zirconium$A_n$; dimethylsilylbis(benz[e]indenyl)zirconium$A_n$; dimethylsilylbis(2-methylbenz[e]indenyl)zirconium$A_n$; dimethylsilylbis(benz[f]indenyl)zirconium$A_n$; dimethylsilylbis(2-methylbenz[f]indenyl)zirconium$A_n$; dimethylsilylbis(3-methylbenz[f]indenyl)zirconium$A_n$; dimethylsilylbis(cyclopenta[cd]indenyl)zirconium$A_n$; dimethylsilylbis(cyclopentadienyl)zirconium$A_n$; dimethylsilylbis(tetramethylcyclopentadienyl)zirconium$A_n$; dimethylsilylbis(methylcyclopentadienyl)zirconium$A_n$; dimethylsilylbis(dimethylcyclopentadienyl)zirconium$A_n$; isopropylidene(cyclopentadienyl-fluorenyl)zirconium$A_n$; isopropylidene(cyclopentadienyl-indenyl)zirconium$A_n$; isopropylidene(cyclopentadienyl-2,7-di-t-butylfluorenyl)zirconium$A_n$; isopropylidene(cyclopentadienyl-3-methylfluorenyl)zirconium$A_n$; isoropylidene(cyclopentadienyl-4-methylfluorenyl)zirconium$A_n$; isopropylidene(cyclopentadienyl-octahydrofluorenyl)zirconium$A_n$; isopropylidene(methylcyclopentadienyl-fluorenyl)zirconium$A_n$; isopropylidene(dimethylcyclopentadienylfluorenyl)zirconium$A_n$; isopropylidene(tetramethylcyclopentadienyl-fluorenyl)zirconium$A_n$; diphenylmethylene(cyclopentadienyl-fluorenyl)zirconium$A_n$; diphenylmethylene(cyclopentadienyl-indenyl)zirconium$A_n$; diphenylmethylene(cyclopentadienyl-2,7-di-t-butylfluorenyl)zirconium$A_n$; diphenylmethylene(cyclopentadienyl-3-methyl fluorenyl)zirconium$A_n$; diphenylmethylene(cyclopentadienyl-4-methylfluorenyl)zirconium$A_n$; diphenylmethylene(cyclopentadienyloctahydrofluorenyl)zirconium$A_n$; diphenylmethylene(methylcyclopentadienyl-fluorenyl)zirconium$A_n$; diphenylmethylene(dimethylcyclopentadienyl-fluorenyl)zirconium$A_n$; diphenylmethylene(tetramethylcyclopentadienyl-fluorenyl)zirconium$A_n$; cyclohexylidene(cyclopentadienyl-fluorenyl)zirconium$A_n$; cyclohexylidene(cyclopentadienylindenyl)zirconium$A_n$; cyclohexylidene(cyclopentadienyl-2,7-di-t-butylfluorenyl)zirconium$A_n$; cyclohexylidene(cyclopentadienyl-3-methylfluorenyl)zirconium$A_n$; cyclohexylidene(cyclopentadienyl-4-methylfluorenyl)zirconium$A_n$; cyclohexylidene(cyclopentadienyloctahydrofluorenyl)zirconium$A_n$; cyclohexylidene(methylcyclopentadienylfluorenyl)zirconium$A_n$; cyclohexylidene(dimethylcyclopentadienyl-fluorenyl)zirconium$A_n$; cyclohexylidene(tetramethylcyclopentadienylfluorenyl)zirconium$A_n$; dimethylsilyl(cyclopentadienyl-fluorenyl)zirconium$A_n$; dimethylsilyl(cyclopentadienyl-indenyl)zirconium$A_n$; dimethylsilyl(cyclopentdienyl-2,7-di-t-butylfluorenyl)zirconium$A_n$; dimethylsilyl(cyclopentadienyl-3-methylfluorenyl)zirconium$A_n$; dimethylsilyl(cyclopentadienyl-4-methylfluorenyl)zirconium$A_n$; dimethylsilyl(cyclopentadienyl-octahydrofluorenyl)zirconium$A_n$; dimethylsilyl(methylcyclopentanedienyl-fluorenyl)zirconium$A_n$; dimethylsilyl(dimethylcyclopentadienylfluorenyl)zirconium$A_n$; dimethylsilyl(tetramethylcyclopentadienylfluorenyl)zirconium$A_n$; isopropylidene(cyclopentadienyl-fluorenyl)zirconium$A_n$; isopropylidene(cyclopentadienyl-indenyl)zirconium$A_n$; isopropylidene(cyclopentadienyl-2,7-di-t-butylfluorenyl)zirconium$A_n$; cyclohexylidene(cyclopentadienylfluorenyl)zirconium$A_n$; cyclohexylidene(cyclopentadienyl-2,7-di-t-butylfluorenyl)zirconium$A_n$; dimethylsilyl(cyclopentadienylfluorenyl)zirconium$A_n$; methylphenylsilyltetramethylcyclopentadienylcyclopropylamidotitaniumAn; methylphenylsilyltetramethylcyclopentadienylcyclobutylamidotitanium$A_n$;
methylphenylsilyltetramethylcyclopentadienylcyclopentylamidotitanium$A_n$; methylphenylsilyltetramethylcyclopentadienylcyclohexylamidotitanium$A_n$;
methylphenylsilyltetramethylcyclopentadienylcycloheptylamidotitanium$A_n$; methylphenylsilyltetramethylcyclopentadienylcyclooctylamidotitanium$A_n$;
methylphenylsilyltetramethylcyclopentadienylcyclononylamidotitanium$A_n$; methylphenylsilyltetramethylcyclopentadienylcyclodecylamidotitanium$A_n$;
methylphenylsilyltetramethylcyclopentadienylcycloundecylamidotitanium$A_n$; methylphenylsilyltetramethylcyclopentadienylcyclododecylamidotitanium$A_n$;
methylphenylsilyl(tetramethylcyclopentadienyl)(sec-butylamido)titanium$A_n$; methylphenylsilyl(tetramethylcyclopentadienyl)(n-octylamido)titanium$A_n$; methylphenylsilyl(tetramethylcyclopentadienyl)(n-decylamido)titanium$A_n$; methylphenylsilyl(tetramethylcyclopentadienyl)(n-octadecylamido)titanium$A_n$; diphenylsilyltetramethylcyclopentadienylcyclopropylamidotitanium$A_n$; diphenylsilyltetramethylcyclopentadienylcyclobutylamidotitanium$A_n$;
diphenylsilyltetramethylcyclopentadienylcyclopentylamidotitanium$A_n$; diphenylsilyltetramethylcyclopentadienylcyclohexylamidotitanium$A_n$;
diphenylsilyltetramethylcyclopentadienylcycloheptylamidotitaniUm$A_n$; diphenylsilyltetramethylcyclopentadienylcyclooctylamidotitanium$A_n$;
diphenylsilyltetramethylcyclopentadienylcyclononylamidotitanium$A_n$; diphenylsilyltetramethylcyclopentadienylcyclodecylamidotitanium$A_n$;
diphenylsilyltetramethylcyclopentadienylcycloundecylamidotitanium$A_n$; diphenylsilyltetramethylcyclopentadienylcyclododecylamidotitanium$A_n$; diphenylsilyl(tetramethylcyclopentadienyl)(sec-butylamido)titanium$A_n$; diphenylsilyl(tetramethylcyclopentadienyl)(n-octylamido)titanium$A_n$; diphenylsilyl(tetramethylcyclopentadienyl)(n-decylamido)titanium$A_n$; and diphenylsilyl(tetramethylcyclopentadienyl)(n-octadecylamido)titanium$A_n$.

In one or more embodiments, the transition metal compound includes cyclopentadienyl ligands, indenyl ligands, fluorenyl ligands, tetrahydroindenyl ligands, CpFlu type catalysts, alkyls, aryls, amides or combinations thereof. In one or more embodiments, the transition metal compound includes a transition metal dichloride, dimethyl or hydride. In one specific embodiment, the transition metal compound includes rac-dimethylsilanylbis(2-methyl-4-phenyl-1-indenyl)zirconium dichloride.

In one or more embodiments, L is selected from $C_4$ to $C_{30}$ hydrocarbons, oxygen, nitrogen, phosphorous and combinations thereof. In one or more embodiments, M is selected from Group 3 to Group 14 metals, lanthanides, actinides and combinations thereof. In one or more embodiments, A is selected from halogens, $C_4$ to $C_{30}$ hydrocarbons and combinations thereof. In one specific embodiment, the transition metal compound includes rac-dimethylsilanylbis(2-methyl-4-phenyl-1-indenyl)zirconium dichloride.

One or more embodiments may further include contacting the aluminum fluoride impregnated support with a plurality of catalyst compounds (e.g., a bimetallic catalyst). As used herein, the term "bimetallic catalyst" means any composition, mixture or system that includes at least two different catalyst compounds. Each catalyst compound may reside on a single support particle so that the bimetallic catalyst is a supported bimetallic catalyst. However, the term bimetallic catalyst also broadly includes a system or mixture in which one of the catalysts resides on one collection of support particles and another catalyst resides on another collection of support particles. The plurality of catalyst components may include any catalyst component known to one skilled in the art, so long as at least one of those catalyst components includes a transition metal compound as described herein.

Optionally, the aluminum fluoride impregnated support, the transition metal compound, the catalyst system or combinations thereof, may be contacted with one or more scavenging compounds prior to or during polymerization. The term "scavenging compounds" is meant to include those compounds effective for removing impurities (e.g., polar impurities) from the subsequent polymerization reaction environment. Impurities may be inadvertently introduced with any of the polymerization reaction components, particularly with solvent, monomer and catalyst feed, and adversely affect catalyst activity and stability. Such impurities may result in decreasing, or even elimination, of catalytic activity, for example. The polar impurities or catalyst poisons may include water, oxygen and metal impurities, for example.

The scavenging compound may include an excess of the aluminum containing compounds described above, or may be additional known organometallic compounds, such as Group 13 organometallic compounds. For example, the scavenging compounds may include triethyl aluminum (TMA), triisobutyl aluminum (TIBAl), methylalumoxane (MAO), isobutyl aluminoxane and tri-n-octyl aluminum. In one specific embodiment, the scavenging compound is TIBAl.

In one embodiment, the amount of scavenging compound is minimized during polymerization to that amount effective to enhance activity and avoided altogether if the feeds and polymerization medium may be sufficiently free of impurities.

In one or more embodiments, the fluorinated support and/or the transition metal compound may be contacted with at least one compound prior to or after contact with one another. The at least one compound is generally represented by the formula $XR_n$, wherein X is selected from Group 12 to 13 metals, lanthanide series metals or combinations thereof and each R is independently selected from alkyls, alkoxys, aryls, aryloxys, halogens, hydrides, Group 1 or 2 metals, organic nitrogen compounds, organic phosphorous compounds and combinations thereof and n is from 2 to 5.

In one embodiment, X includes aluminum. For example, the compound may include an organic aluminum compound. The organic aluminum compound may include triethyl aluminum (TEAl), triisobutyl aluminum (TIBAl), tri-n-hexyl aluminum (TNHAl), tri-n-octyl aluminum (TNOAl) or tri-isoprenyl aluminum (TISPAl), for example. However, in one specific embodiment, the supported catalyst system is formed in the absence of TIBAl.

In one embodiment, X includes boron. For example, the compound may include an organic boron compound, such as a $C_2$ to $C_{30}$ trialkyl boron. In one specific embodiment, the compound includes a borate. For example, the borate may include a borate salt, such as a lithium borate, triethyl borate or trimethyl borate.

In one embodiment, the weight ratio of the silica to the compound ($Si:X^2$) may be from about 0.01:1 to about 10:1 or from about 0.1:1 to about 7:1, for example. The compound generally contacts the fluorinated support (or components thereof) in an amount that is insufficient to alkylate the fluorinated support.

In one or more embodiments, the compound includes a plurality of compounds. For example, the plurality of compounds may include a first compound including aluminum and a second compound including borane. For example, the plurality of compounds may include a trialkyl aluminum and a trialkyl borane.

In one specific embodiment, the compound includes more aluminum than boron. For example, the compound may include only a minor amount of boron (e.g., less than about 10 wt. %, or less than about 5 wt. %, or less than about 2.5 wt. % or less than about 1.0 wt. %).

It is contemplated that the first and second compound may contact one another prior to, during or after contact with any portion of the fluorinated support.

While it has been observed that contacting the fluorinated support with the compound results in a catalyst having increased activity, it is contemplated that the compound may contact the transition metal compound. When the compound contacts the transition metal compound, the weight ratio of the compound to transition metal ($X^2$:M) may be from about 0.1: to about 5000:1, for example.

Optionally, the aluminum containing support material and/or the transition metal compound may be contacted with a second aluminum containing compound prior to contact with one another. In one embodiment, the aluminum containing support material is contacted with the second aluminum containing compound prior to contact with the transition metal compound. Alternatively, the aluminum containing support material may be contacted with the transition metal compound in the presence of the second aluminum containing compound.

For example, the contact may occur by contacting the aluminum containing support material with the second aluminum containing compound at a reaction temperature of from about 0° C. to about 150° C. or from about 20° C. to about 100° C. for a time of from about 10 minutes hour to about 5 hours or from about 30 minutes to about 120 minutes, for example.

The second aluminum containing compound may include an organic aluminum compound. The organic aluminum compound may include TEAl, TIBAl, TNOAl, MAO or MMAO, for example. In one embodiment, the organic aluminum compound may be represented by the formula $AlR_3$, wherein each R is independently selected from alkyls, aryls or combinations thereof.

In one embodiment, the weight ratio of the silica of the aluminum containing support material to the second aluminum containing compound ($Si:Al^2$) is generally from about 0.01:1 to about 10:1, for example While it has been observed that contacting the aluminum containing support material with the second aluminum containing compound results in a catalyst having increased activity, it is contemplated that the second aluminum containing compound may contact the transition metal compound. When the second aluminum containing compound contacts the transition metal compound, the weight ratio of the second aluminum containing compound to transition metal ($Al^2$:M) may be from about 0.1: to about 5000:1, for example.

As demonstrated in the examples that follow, contacting the aluminum containing support materials with the transition metal compound via the methods described herein unexpectedly results in a supported catalyst composition that is active without alkylation processes (e.g., contact of the catalyst component with an organometallic compound, such as MAO.)

The absence of substances, such as MAO, generally results in lower polymer production costs as alumoxanes are expensive compounds. Further, alumoxanes are generally unstable compounds that are generally stored in cold storage. However, embodiments of the present invention unexpectedly result in a catalyst composition that may be stored at room temperature for periods of time (e.g., up to 2 months) and then used directly in polymerization reactions. Such storage ability further results in improved catalyst variability as a large batch of support material may be prepared and contacted with a variety of transition metal compounds (which may be formed in small amounts optimized based on the polymer to be formed.)

In addition, it is contemplated that polymerizations absent alumoxane activators result in minimal leaching/fouling in comparison with alumoxane based systems. However, embodiments of the invention generally provide processes wherein alumoxanes may be included without detriment.

Such processes, as described by the first embodiments, are further expected to reduce the amount of byproducts released into the environment as a result of the fluorination process as compared with other fluorination methods.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

In one embodiment, the polymerization process includes contacting the supported catalyst composition with a bulk olefin monomer prior to contact with the olefin monomer in the gas phase.

In one embodiment, the catalyst preparation is an in-situ process. Such process may occur with our without isolation of the fluorinated catalyst. While an increase in catalytic activity has been observed as a result of contacting the supported catalyst system (or components thereof) with the compound represented by the formula $XR_3$ regardless of isolation, processes utilizing non-isolated catalysts resulted in catalyst activities different than that obtained with isolated catalysts.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene, polypropylene copolymers, random ethylene-propylene copolymers and impact copolymers, for example.

Unless otherwise designated herein, all testing methods are the current methods at the time of filing.

In one embodiment, the polymer includes syndiotactic polypropylene. The syndiotactic polypropylene may be formed by a supported catalyst composition including a CpFlu type catalyst.

In one embodiment, the polymer includes isotactic polypropylene. The isotactic polypropylene may be formed by a supported catalyst composition including dimethylsilyl-bis(2-methyl-4-phenyl-indenyl)zirconium dichloride as the transition metal compound.

In one embodiment, the polymer includes a bimodal molecular weight distribution. The bimodal molecular weight distribution polymer may be formed by a supported catalyst composition including a plurality of transition metal compounds.

In one embodiment, the polymer includes a unimodal molecular weight distribution. The unimodal molecular weight distribution polymer may be formed by contacting the transition metal compound with the support material in the presence of TIBAl, for example.

In one or more embodiments, the polymer has a low molecular weight (e.g., a molecular weight of less than about 100,000). The low molecular weight polymer may be formed by a support material having a weight ratio of fluorine to aluminum of from about 1.8:1 to about 7:1 or from about 2:1 to about 5:1, for example.

In one or more embodiments, the polymer has a middle molecular weight (e.g., a molecular weight of from about 100,000 to about 150,000.) The middle molecular weight polymer may be formed by a support material having a weight ratio of fluorine to aluminum of from about 0.9:1 to about 1.8:1 or from about 1:1 to about 1.5:1, for example. Alternatively, the middle molecular weight polymer may be formed by contacting the active supported catalyst system with an olefin monomer in the presence of triethyl aluminum (TEAl) or isoprenyl aluminum (IPA), for example.

In one or more embodiments, the polymer has a high molecular weight (e.g., a molecular weight of at least about 150,000). The high molecular weight polymer may be formed by contacting the active supported catalyst system with an olefin monomer in the presence of TIBAl, for example.

In one or more embodiments, the polymer has a narrow molecular weight distribution (e.g., a molecular weight distribution of from about 2 to about 4). In another embodiment, the polymer has a broad molecular weight distribution (e.g., a molecular weight distribution of from about 4 to about 25). The broad molecular weight distribution polymer may be formed by contacting the transition metal compound with the support material in the presence of MAO, for example.

In one embodiment, the polymer includes copolymers. The copolymers generally include a first polymer and a second polymer. In one or more embodiments, the copolymers include a third polymer.

For example, the first polymer may include polypropylene, while the second polymer may be represented by the formula $CH_2=CHR$, wherein R is selected from hydrogen, $C_2$ to $C_{20}$ alkyls, $C_6$ to $C_{30}$ aryls and combinations thereof. In one specific embodiment, the second polymer is polyethylene. The third polymer may include $C_2$ to $C_{30}$ alkyls, such as $C_6$ to $C_{30}$ styrenic olefins, for example.

In one embodiment, the copolymer includes from about 0.5 wt. % to about 70 wt. %, or from about 0.5 wt. % to about 50 wt. %, or from about 0.5 wt. % to about 10 wt. % or from about 2 wt. % to about 7 wt. % polyethylene, for example.

In one or more embodiments, the copolymer has a melt flow index (MFI) of from about 1 g/10 min to about 1000 g/10 min, or from about 5 g/10 min. to about 500 g. 10 min., or from about 10 g/10 min. to about 250 g/10 min. or from about to about 4 g/10 min. to about 150 g/10 min., for example. In particular, the copolymers have an MFI that increases with an increase in the polyethylene content of the copolymer.

In one or more embodiments, the copolymer has a melting point of from about 90° C. to about 160° C., or from about 110° C. to about 155° C. or from about 130° C. to about 150° C., for example. Further, it has been observed that in one or more embodiments, the copolymers described herein do not exhibit a melt temperature peak.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multi-layered constructions in the form of bottles, tanks, large hollow articles, rigid food containers and toys, for example.

EXAMPLES

Examples-I

In the following examples, samples of fluorinated metallocene catalyst compounds were prepared according to the first embodiments described herein. Examples 1 and 2 illustrate the impregnation of $AlF_3$ into silica in a water medium. Examples 3-9 illustrate the preparation of supported $AlF_3$ on the alumina-silica in a water medium. Example 10 illustrates the preparation of supported $AlF_3$ on the alumina-silica in a tetrahydrofuran (THF) medium. Example 13 illustrates the preparation of supported $AlF_3$ on the alumina-silica by using the solid phase reaction of $AlF_3$ with alumina-silica in a fluidizing bed at 450° C.

As used herein, "room temperature" means that a temperature difference of a few degrees does not matter to the phenomenon under investigation, such as a preparation method. In some environments, room temperature may include a temperature of from about 20° C. to about 28° C. (68° F. to 82° F.), while in other environments, room temperature may include a temperature of from about 50° F. to about 90° F., for example. However, room temperature measurements generally do not include close monitoring of the temperature of the process and therefore such a recitation does not intend to bind the embodiments described herein to any predetermined temperature range.

Example 1

10 g of silica from Grace (20 μkm) was mixed with 2 g of $AlF_3.3H_2O$ and 100 ml of water. The mixture was stirred at 70° C. for 1 h. The water was removed under vacuum at 90° C. and the resulting solids were then heated in a muffle furnace at 200° C. for 1 h and 450° C. for 3 h.

Example 2

9.3 g of silica from Fuji Sylisia (40 μkm) was mixed with 3.9 g of $AlF_3.3H_2O$ and 100 ml of water. The mixture was stirred at 70° C. for 1 h. The water was removed under vacuum at 90° C. and the resulting solids were then heated in a muffle furnace at 200° C. for 1 h and 450° C. for 3 h.

Example 3

10 g of alumina-silica from Fuji Sylisia (5% $Al_2O_3$, 20 μkm) was mixed with 1 g of $AlF_3.3H_2O$ and 100 ml of water. The mixture was stirred at 70° C. for 1 h. The water was removed under vacuum at 90° C. and the resulting solid was then heated in a muffle furnace at 200° C. for 1 h and 450° C. for 3 h.

Example 4

10.3 g of alumina-silica from Grace (MS13/110, 13% $Al_2O_3$, 60 μkm) was mixed with 0.37 g of $AlF_3.3H_2O$ and 100 ml of water. The mixture was stirred at 70° C. for 1 h. The water was removed under vacuum at 90° C. and the resulting solid was then heated in a muffle furnace at 200° C. for 1 h and 450° C. for 3 h.

Example 5

10.1 g of alumina-silica from Grace (MS13/110, 13% $Al_2O_3$, 60 μkm) was mixed with 0.54 g of $AlF_3.3H_2O$ and 100 ml of water. The mixture was stirred at 70° C. for 1 h. The water was removed under vacuum at 90° C. and the resulting solid was then heated in a muffle furnace at 200° C. for 1 h and 450° C. for 3 h.

Example 6

10.1 g of alumina-silica from Grace (MS13/110, 13% $Al_2O_3$, 60 μkm) was mixed with 1.1 g of $AlF_3.3H_2O$ and 100 ml of water. The mixture was stirred at 70° C. for 1 h. The water was removed under vacuum at 90° C. and the resulting solid was then heated in a muffle furnace at 200° C. for 1 h and 450° C. for 3 h.

Example 7

20.2 g of alumina-silica from Grace (MS13/110, 13% $Al_2O_3$, 60 μkm) was mixed with 2.1 g of $AlF_3.3H_2O$ and 100 ml of water. The mixture was stirred at 70° C. for 1 h. The water was removed under vacuum at 90° C. and the resulting solid was then heated in a muffle furnace at 200° C. for 5 h and 450° C. for 4 h.

Example 8

10.0 g of alumina-silica from Grace (MS13/110, 13% $Al_2O_3$, 60 μkm) was mixed with 2.0 g of $AlF_3.3H_2O$ and 100 ml of water. The mixture was stirred at 70° C. for 1 h. The water was removed under vacuum at 90° C. and the resulting solid was then heated in a muffle furnace at 200° C. for 1 h and 450° C. for 3 h.

Example 9

10.0 g of alumina-silica from Grace (MS13/110, 13% $Al_2O_3$, 60 μkm) was mixed with 3.0 g of $AlF_3.3H_2O$ and 100 ml of water. The mixture was stirred at 70° C. for 1 h. The water was removed under vacuum at 90° C. and the resulting solid was then heated in a muffle furnace at 200° C. for 1 h and 450° C. for 3 h.

Example 10

5.0 g of alumina-silica from Grace (MS13/110, 13% $Al_2O_3$, 60 μkm) was mixed with 0.61 g of $AlF_3$ and 50 ml of THF. The mixture was stirred at 70° C. for 1 h. The solvent was removed under vacuum and the resulting solid was then heated in a muffle furnace at 200° C. for 15 min. and 450° C. for 3 h.

Example 11

10.1 g of alumina-silica from Grace (MS13/110, 13% $Al_2O_3$, 60 μkm) was mixed with 0.54 g of $AlF_3.3H_2O$ and 100 ml of water. The mixture was stirred at 70° C. for 1 h. The water was removed under vacuum at 90° C. and the resulting solid was then heated in a muffle furnace at 200° C. for 1 h.

Example 12

20.2 g of alumina-silica from Grace (MS13/110, 13% $Al_2O_3$, 60 μkm) was mixed with 2.1 g of $AlF_3.3H_2O$ and 100 ml of water. The mixture was stirred at 70° C. for 1 h. The water was removed under vacuum at 90° C. and the resulting solid was then heated in a muffle furnace at 200° C. for 5 h.

Example 13

25.1 g of alumina-silica from Grace (MS13/110, 13% $Al_2O_3$, 60 μkm, heated at 200° C. for 12 h in tube furnace with 0.4 slpm of $N_2$) was mixed with 3.8 g of $AlF_3$ (heated at 200° C. for 3 h). The mixture was heated in tube furnace under $N_2$ flow (0.6 slpm) at room temperature for 1 h, then at 500° C. at 3 h and room temperature for another 4 h.

Example 14

19.5 g of fluorided alumina-silica from Grace (MS13/110, 13% $Al_2O_3$, treated with $NH_4FFH$ at 400° C.) was mixed with 2.1 g of $AlF_3$ (heated at 200° C. for 3 h) and placed in tube furnace. The mixture was heated in tube furnace under $N_2$ flow (0.6 slpm) at room temperature for 1 h, then at 500° C. for 3 h and at room temperature for another 4 h.

Example 15

$AlF_3$ from Aldrich was heated in a muffle furnace at 200° C. for 2 h.

Catalyst Preparation: 1.0 gram of each support was slurried in 4.3 grams of isohexane followed by 1.70 grams of TIBAL solution (30 wt. % in hexane). 10.0 mg of dimethylsilylbis(2-methyl-4-phenyl-indenyl)zirconium dichloride was reacted with 1.70 grams of TIBAL solution (30 wt. % in hexane) at ambient temperature and then added to the support. After stirring at ambient temperature for 1 hour, mineral oil was added to make a solid percent concentration of 5 to 6 wt %.

Polymerization: The catalysts were tested in bulk propylene polymerization using 6-x pack and 4 L bench reactor at 67° C. The process conditions and activity of such polymerizations are illustrated in Table IA below.

TABLE IA

| Example # | % $AlF_3$ | Heating | Activity, g/g/h | MF | % Zr |
|---|---|---|---|---|---|
| 1 | 13.6 | 200° C., 1 h; 450° C., 3 h | 480 | NR | NR |
| 2 | 28.3 | 200° C., 1 h; 450° C., 3 h | 620 | NR | NR |
| 3 | 6.8 | 200° C., 1 h; 450° C., 3 h | 5,830 | 18.3 | NR |
| 4 | 2.4 | 200° C., 1.5 h; 450° C., 3 h | 2,740 | NR | 0.0259 |
| 5 | 3.5 | 200° C., 1.5 h; 450° C., 3 h | 4,650 | NR | NR |
| 6 | 6.8 | 200° C., 1 h; 450° C., 3 h | 12,492 | 9.5 | 0.0668 |
| 7 | 7.0 | 450° C., 3 h | 8,400 | NR | NR |
| 8 | 13.6 | 200° C., 1 h; 450° C., 3 h | 9,676 | 13.6 | NR |
| 9 | 20.4 | 200° C., 1 h; 450° C., 3 h | 7,505 | 18.7 | NR |
| 10 | 12 | 450° C., 3 h | 10,795 | 9.2 | NR |
| 11 | 3.5 | 200° C., 1.5 h | 52 | NR | NR |
| 12 | 7 | 200° C., 5 h; | 27 | NR | NR |
| 13 | 12 | Tube furnace | 6,000 | NR | NR |
| 14 | 100 | 200° C., 2 h | trace | NR | NR |
| 15 | 12 | Tube furnace | 12,040 | 10.7 | NR |

*NR = not recorded

It was observed that the temperature of the heat treatment is a crucial factor in high activity catalysts. The heat treatment at 200° C. resulted in the catalysts having significantly lower activity compared to the catalysts heated at 450° C.

Figure 2:
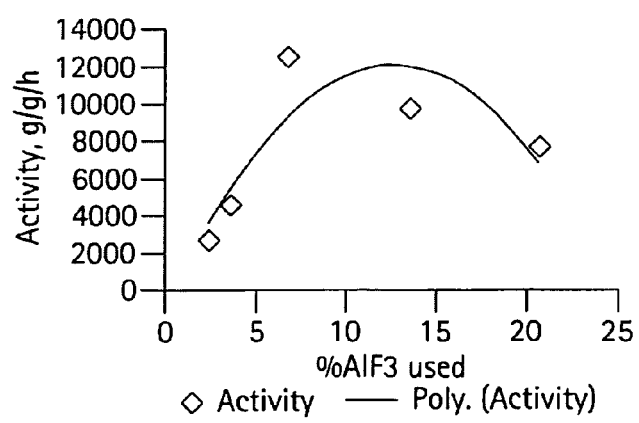
FIG. 2 illustrates the activity of polymer samples.

Further increasing activity was observed when the concentration of alumina in alumina-silica was increased. While high activities were observed at about 7-13 wt. % of $AlF_3$ impregnated on the alumina-silica, the catalysts including 13 wt. % $Al_2O_3$ exhibited activities of greater than 12,000 g/g/h. See, FIG. 2. It was further observed that $AlF_3$ impregnated on fluorinated alumina-silica resulted in lower catalyst activity than $AlF_3$ impregnated on alumina-silica.

Additionally, the catalysts prepared by mixing the support and aluminum fluoride in water or an organic solvent (THF) followed by heat treatment showed approximately the same activity as one another. However, the catalysts prepared by impregnating the aluminum fluoride on the support using a solid-phase reaction in fluidized bed resulted in slightly higher activity.

The properties of the polymers formed via such polymerizations were further analyzed and are illustrated in Table IB below.

TABLE IB

| Example # | $T_m$ ° C. | $\Delta H_m$, J/g | $T_c$, ° C. | $\Delta H_c$, J/g | $M_n$/1000 | $M_w$/1000 | $M_z$/1000 | $M_w/M_n$ |
|---|---|---|---|---|---|---|---|---|
| 1 | 149.7 | 88.4 | 110.3 | −89.9 | 30.3 | 142.4 | 354.8 | 4.7 |
| 2 | 150.7 | 88.3 | 109.8 | −89.9 | 38.0 | 148.3 | 286.3 | 3.9 |
| 3 | 151.1 | 90.1 | 109.3 | −91.1 | 39.0 | 185.3 | 398.4 | 4.8 |
| 4 | 149.9 | 105.1 | 109.9 | −96.8 | 30.1 | 178.6 | 410.5 | 5.9 |
| 5 | 150.8 | 106.0 | 109.4 | −96.4 | 36.8 | 193.3 | 429.8 | 5.3 |
| 6 | 150.3 | 88.3 | 106.8 | −90.9 | 52.4 | 258.7 | 511.5 | 4.9 |
| 7 | 150.6 | 104.9 | 108.1 | 96.6 | 34.0 | 212.7 | 473.4 | 6.3 |
| 8 | 150.7 | 85.1 | 105.9 | −88.5 | 40.5 | 208.3 | 429.7 | 5.1 |
| 9 | 149.2 | 91.2 | 107.3 | −92.5 | 38.4 | 200.7 | 411.7 | 5.2 |
| 10 | 150.7 | 89.3 | 106.9 | −90.1 | 48.2 | 241.5 | 518.9 | 5.0 |
| 11 | 158.2 | 105.7 | 116.9 | −107.3 | 35.9 | 137.5 | 315.6 | 3.9 |
| 12 | 156.2 | 95.8 | 114.9 | −92.3 | 33.7 | 154.3 | 364.5 | 4.6 |
| 13 | 149.3 | 92.8 | 109.7 | −86.4 | 41.6 | 183.0 | 376.8 | 4.4 |
| 14 | 152.5 | 81.1 | 106.9 | −83.5 | 42.8 | 139.4 | 304.3 | 3.3 |
| 15 | 150.3 | 106.6 | 110.1 | −98.5 | 42.4 | 229.3 | 499.8 | 5.4 |

It was observed that the catalysts treated at 450° C. produced highly isotactic polypropylene (99% mmmm pentads by NMR analysis, see, Table IC below illustrating the tacticity of the polymer produced in Example 6) with a melting point of about 150° C. and a molecular weight distribution in range of 4 to 6. However, the catalysts treated at 200° C. produced polypropylene with a melting point of about 158° C.

TABLE IC

| Pentades | % |
|---|---|
| mmmm | 98.9 |
| mmmr | 0.3 |
| rmmr | 0.0 |
| mmrr | 0.3 |
| xmrx | 0.1 |
| mrmr | 0.0 |
| rrrr | 0.0 |
| rrrm | 0.2 |
| mrrm | 0.1 |
| % meso | 99.5 |
| % racemic | 0.5 |
| % error | 0.1 |

Examples-II

In the following examples, samples of fluorinated metallocene catalyst compounds were prepared according to the second embodiments of the invention.

As used below "Silica P-10" refers to silica that was obtained from Fuji Sylisia Chemical LTD (grade: Cariact P-10, 20 μm), such silica having a surface area of 281 m²/g, a pore volume of 1.41 mL/g, an average particle size of 20.5 μm and a pH of 6.3.

As used below "SiAl(5%)" refers to silica alumina that was obtained from Fuji Sylisia Chemical LTD (Silica-Alumina 205 20 μm), such silica having a surface area of 260 m²/g, a pore volume of 1.30 mL/g, an aluminum content of 4.8 wt. %, an average particle size of 20.5 μm, a pH of 6.5 and a 0.2% loss on drying.

As used below "$(NH_4)_2SiF_6$" refers to ammonium hexafluorosilicate that was obtained from Aldrich Chemical Company.

As used below "DEAF" refers to diethylaluminum fluoride (26.9 wt. % in heptane) that was obtained from Akzo Nobel Polymer Chemicals, L.L.C.

As used below "MAO" refers to methylaluminoxane (30 wt. % in toluene) that was obtained from Albemarle Corporation.

Fluorinated Support A: The preparation of Fluorinated Support A was achieved by dry mixing 25.0 g of silica P10 with 0.76 g of $(NH_4)_2SiF_6$ and then transferring the mixture into a quartz tube having a glass-fritted disc. The quartz tube was then inserted into a tube furnace and equipped with an inverted glass fritted funnel on the top opening of the tube. The mixture was then fluidized with nitrogen (0.4 SLPM). Upon fluidization, the tube was heated from room temperature to an average reaction temperature of 116° C. over a period of 5 hours. Upon reaching the average reaction temperature, the tube was maintained at the average reaction temperature for another 4 hours. The tube was then heated to an average calcining temperature of 470° C. over 2 hours and then held at the calcining temperature for 4 hours. The tube was then removed from the heat and cooled under nitrogen. The fluorinated silica P-10 (1.0 g) was added to a glass insert that was equipped with the magnetic stirrer. The fluorinated silica was then slurried in 10 mL of toluene and stirred at ambient temperature. Slowly, 2.5 mL of MAO (30 wt. % in toluene) was added to the silica at ambient temperature. The glass inserts were then loaded to the reactor vessel. The reactor was then closed, placed on a magnetic stir plate and connected to the top manifold assembly under nitrogen. The reaction was then heated to 115° C. for 4 hours. After 4 hours, the solid was filtered through a glass filter funnel and washed once with 5 mL of toluene followed by washing 3× with 5 mL of hexane. The solid was then dried under vacuum at ambient temperature.

Fluorinated Support B. The preparation of Fluorinated Support B (middle F:Al/high Al:Si) was achieved by dry mixing 25.22 g of SiAl(5%) with 1.51 g of $(NH_4)_2SiF_6$ and then transferring the mixture into a quartz tube having a glass-fritted disc. The quartz tube was then inserted into a tube furnace and equipped with an inverted glass fritted funnel on the top opening of the tube. The mixture was then fluidized with nitrogen (0.4 SLPM). Upon fluidization, the tube was heated from room temperature to an average reaction temperature of 116° C. over a period of 5 hours. Upon reaching the average reaction temperature, the tube was maintained at the average reaction temperature for another 4 hours. The tube was then heated to an average calcining temperature of 470° C. over 2 hours and then held at the calcining temperature for 4 hours. The tube was then removed from the heat and cooled under nitrogen.

Fluorinated Support C: The preparation of Fluorinated Support C was achieved by transferring 50 grams of silica P-10 into a quartz glass tube (1.5"×4") equipped with a fritted glass disc. A flow of 0.6 SLPM Nitrogen was attached to the bottom of the tube. The tube was placed in a tube furnace and the silica was heated at 150° C. for 16 hours. The silica was then collected in an Erlenmeyer flask that was equipped with a rubber tube. The rubber tube was "pinched" with a tube clip under nitrogen. The flask was then transferred into a glove box. The silica was transferred into a glass bottle and left to stand. The preparation further included weighing and transferring 20 grams of the heat treated silica P-10 (0.72 mmole OH/gram silica) into a 250 mL, 1-neck, side arm round bottom flask that was equipped with a magnetic stirrer. The silica was slurred in approximately 150 mL of toluene and stirred at room temperature. 2.36 g (0.0240 moles) of DEAF were slowly added to the slurry at room temperature and stirred for 5 minutes. The round bottom flask was equipped with a reflux condenser and heated at 50° C. for 1.0 hours. The resulting mixture was then filtered though a medium glass fritted funnel and washed 3 times each with 50 mL of hexane. The resulting solids were dried under vacuum. The preparation further included transferring 16.97 grams of the solids into the quartz glass tube and heating under a nitrogen flow of 0.6 standard liters per minute (SLPM). Upon fluidization, the tube was heated from room temperature to an average reaction temperature of 130° C. over a period of 1.0 hour. Upon reaching the temperature at 130° C., the temperature was increased to 450° C. in 1.0 hour. Once the temperature was reached to 450° C., it was held at 450° C. for 2 hours. The tube was then removed from the heat and cooled under nitrogen. The solids were collected and stored under nitrogen. The solids from part were further heat treated under the same conditions as described above except that air was used to fluidize the solids.

Comparative Support D: The preparation of Support D was achieved by transferring 25.0 g of silica P10 into a quartz tube having a glass-fritted disc. The quartz tube was then inserted into a tube furnace and equipped with an inverted glass fritted funnel on the top opening of the tube. The silica was then fluidized with nitrogen (0.4 SLPM). Upon fluidization, the tube was then heated to an average calcining temperature of 200° C. over 12 hours. The tube was then removed from the heat and cooled under nitrogen. 1.0 gram of the silica P-10 was added to a glass insert that was equipped with the magnetic stirrer. The silica was then slurried in 10 mL of toluene and stirred at ambient temperature. Slowly, 2.5 mL of MAO (30 wt. % in toluene) was added to the silica at ambient temperature. The glass inserts were then loaded to the reactor vessel. The reactor was then closed, placed on a magnetic stir plate and connected to the top manifold assembly under nitrogen. The reaction was then heated to 115° C. for 4 hours. After 4 hours, the solid was filtered through a glass filter funnel and washed once with 5 mL of toluene followed by washing 3 times with 5 mL of hexane. The solid was then dried under vacuum at ambient temperature.

Catalyst A: The preparation of Catalyst A was achieved by slurrying 0.5 grams of the support A in 5 mL of toluene at ambient temperature and stirring with a magnetic stir bar. The preparation then included adding 5 mg of rac-diemthylsilanylbis(2-methyl-4-phenyl-1-indenyl)zirconium dichloride to the fluorinated support at room temperature. The resulting mixture was then stirred for 1.0 hour. The resulting mixture was filtered through a glass filter funnel and washed once with 2 mL toluene followed by washing 3 times with 3 mL hexane. The final solids were then dried under vacuum and slurried in mineral oil.

Catalyst B. The preparation of Catalyst B was achieved by slurrying 1.01 g of Fluorinated Support B in 6 mL of toluene and stirring with a magnetic stir bar. The preparation then included adding 4.0 g of TIBAl (25.2 wt. % in heptane) to the mixture and the mixture was then stirred for about 5 minutes at room temperature. The preparation then included adding 22.7 mg of rac-dimethylsilanylbis(2-methyl-4-phenyl-1-indenyl)zirconium dichloride to the fluorinated support at room temperature. The resulting mixture was then stirred for 2 hours at room temperature. The resulting mixture was then filtered through a medium glass filter funnel and washed two times with 5 mL of hexane. The final solids were then dried under vacuum and slurried in 12.3 g of mineral oil.

Catalyst C: The preparation of Catalyst C was achieved by slurrying 1.03 g of Fluorinated Support C in 6 mL of toluene and stirring with a magnetic stir bar. The preparation then included adding 4.01 g of TIBAl (25.2 wt. % in heptane) to the mixture and the mixture was then stirred for about 5 minutes at room temperature. The preparation then included adding 20.0 mg of rac-dimethylsilanylbis(2-methyl-4-phenyl-1-indenyl)zirconium dichloride to the fluorinated support at room temperature. The resulting mixture was then stirred for 1.5 hours at room temperature. The resulting mixture was then filtered through a medium glass filter funnel and washed once with 5 mL toluene followed by washing once with 5 mL hexane. After drying at ambient temperature for about 1 hour, the solids were slurried in dry mineral oil. The final solids were then dried under vacuum and slurried in mineral oil.

Catalyst D: The preparation of Catalyst D was achieved by slurrying 0.5 grams of the support D in 5 mL of toluene at ambient temperature and stirring with a magnetic stir bar. The preparation then included adding 5 mg of rac-diemthylsilanylbis(2-methyl-4-phenyl-1-indenyl)zirconium dichloride to the fluorinated support at room temperature. The resulting mixture was then stirred for 1.0 hour. The resulting mixture was filtered through a glass filter funnel and washed once with 2 mL toluene followed by washing 3 times with 3 mL hexane. The final solids were then dried under vacuum and slurried in mineral oil.

The resulting catalysts were then exposed to polymerization with olefin monomer to form the resulting polymer. The results of such polymerizations follow in Tables IIA and IIB, respectively.

TABLE IIA

| (Polypropylene) | | | | | | | | |
|---|---|---|---|---|---|---|---|---|
| Catalyst | Co-Catalyst | Activity | M | $T_R$ | $T_{M2}$ | Mw | Mw/Mn | Mz/Mw |
| D | TEAL | 10786 | 1 | 107.6 | 149.0 | 200199 | 5.2 | 3.3 |
| A | TEAL | 12508 | 1 | 107.6 | 149.4 | 211691 | 3.7 | 2.7 |
| B | TEAL | 1334 | 2 | 108.0 | 148.7 | 105258 | 5.2 | 2.3 |
| B | TIBAL | 5272 | 2 | 107.1 | 149.4 | 200708 | 4.8 | 2.6 |
| C | TEAL | 405 | 2 | 109.5 | 149.9 | 119610 | 5.6 | 2.3 |
| C | TIBAL | 5849 | 2 | 108.0 | 149.7 | 174815 | 4.7 | 2.7 |

*t is polymerization time in minutes, activity is expressed in gPP/gCat/hour, M is the catalyst loading in wt. %, $T_R$ is recrystallization temperature in ° C., $T_{M2}$ is the temperature of the second melt peak in ° C.

TABLE IIB

| | | | | | | | | | | |
|---|---|---|---|---|---|---|---|---|---|---|
| | | | | (Polyethylene) | | | | | | |
| Catalyst | Co-Catlyst | t | Activity | M | $T_R$ | $T_{M2}$ | Mn | Mw | Mz | HLMI |
| B | TIBAL | 60 | 1903 | 2 | 94.6 | 103.7 | 29730 | 201841 | 590085 | 0.3 |
| E | TIBAL | 60 | 5151 | 2 | 111.0 | 128.0 | 23807 | 216617 | 618982 | 1.7 |

*t is polymerization time in minutes, activity is expressed in gPP/gCat/hour, M is the catalyst loading in wt. %, $T_R$ is recrystallization temperature in °C., $T_{M2}$ is the temperature of the second melt peak in °C., HLMI is explessed in g/10 min., Catalyst E is composed of the metallocene rac-Ethylenebis(tetrahydroindenyl)ZrCl2 supported on MAO/SiO2 support.

Unexpectedly, it has been discovered that the productivity of polyolefin polymerizations can be controlled by the catalyst preparation methods described herein.

As demonstrated in the examples above, a higher (5 wt. %) $Al^1$:Si ratio results in higher catalyst activity than the lower (1 wt. %) $Al^1$:Si molar ratio. (See, Catalysts E and C.)

Further, it has been demonstrated that F:$Al^1$ molar ratios of about 3:1 result in higher catalyst activities than ratios of 6:1 or 2:1. (See, Catalysts B, C and D.) It has also been observed that transition metal loadings of 2 wt. % result in higher catalyst activities than loadings of 1 wt. %. (See, Catalysts B and C.)

In addition, it was unexpectedly observed that when the scavenger was added to the fluorinated support prior to contact with the transition metal compound, higher catalyst activities were observed than when the transition metal compound is contacted with the scavenging compound. (See, Catalysts A and B.)

Examples-III

In the following examples, samples of fluorinated metallocene catalyst compounds were prepared.

As used below "SiAl(5%)" refers to Silica Alumina that was obtained from Fuji Sylisia Chemical LTD (Silica-Alumina 205 20 μm), such silica having a surface area of 260 m²/g, a pore volume of 1.30 mL/g, an aluminum content of 4.8 wt. %, an average particle size of 20.5 μm, a pH of 6.5 and a 0.2% loss on drying.

As used below "SiAl(1%)" refers to Silica Alumina that was obtained from Fuji Sylisia Chemical LTD (Silica-Alumina 201 20 μm), such silica having a surface area of 264 m²/g, a pore volume of 1.30 mL/g, an aluminum content of 1.3 wt. %, an average particle size of 21.7 μm, a pH of 6.5 and a 0.2% loss on drying.

As used below "$(NH_4)_2SiF_6$" refers to ammonium hexafluorosilicate that was obtained from Aldrich Chemical Company.

As used below "$NH_4BF_4$" refers to ammonium tetrafluoroborate that was obtained from Aldrich Chemical Company.

As used below "$NH_4FHF$" refers to ammonium bifluoride that was obtained from Aldrich Chemical Company.

Fluorinated Support A: The preparation of Fluorinated Support A (low F:Al/high Al:Si) was achieved by dry mixing 20.19 g of SiAl(5%) with 0.60 g of $(NH_4)_2SiF_6$ and then transferring the mixture into a quartz tube having a glass-fritted disc. The quartz tube was then inserted into a tube furnace and equipped with an inverted glass fritted funnel on the top opening of the tube. The mixture was then fluidized with nitrogen (0.4 SLPM). Upon fluidization, the tube was heated from room temperature to an average reaction temperature of 116° C. over a period of 5 hours. Upon reaching the average reaction temperature, the tube was maintained at the average reaction temperature for another 4 hours. The tube was then heated to an average calcining temperature of 470° C. over 2 hours and then held at the calcining temperature for 4 hours. The tube was then removed from the heat and cooled under nitrogen.

Fluorinated Support B: The preparation of Fluorinated Support B (middle F:Al/high Al:Si) was achieved by dry mixing 25.22 g of SiAl(5%) with 1.51 g of $(NH_4)_2SiF_6$ and then transferring the mixture into a quartz tube having a glass-fritted disc. The quartz tube was then inserted into a tube furnace and equipped with an inverted glass fritted funnel on the top opening of the tube. The mixture was then fluidized with nitrogen (0.4 SLPM). Upon fluidization, the tube was heated from room temperature to an average reaction temperature of 116° C. over a period of 5 hours. Upon reaching the average reaction temperature, the tube was maintained at the average reaction temperature for another 4 hours. The tube was then heated to an average calcining temperature of 470° C. over 2 hours and then held at the calcining temperature for 4 hours. The tube was then removed from the heat and cooled under nitrogen.

Fluorinated Support C: The preparation of Fluorinated Support C (high F:Al/high Al:Si) was achieved by dry mixing 25.14 g of SiAl(5%) with 2.56 g of $(NH_4)_2SiF_6$ and then transferring the mixture into a quartz tube having a glass-fritted disc. The quartz tube was then inserted into a tube furnace and equipped with an inverted glass fritted funnel on the top opening of the tube. The mixture was then fluidized with nitrogen (0.4 SLPM). Upon fluidization, the tube was heated from room temperature to an average reaction temperature of 116° C. over a period of 5 hours. Upon reaching the average reaction temperature, the tube was maintained at the average reaction temperature for another 4 hours. The tube was then heated to an average calcining temperature of 470° C. over 2 hours and then held at the calcining temperature for 4 hours. The tube was then removed from the heat and cooled under nitrogen.

Fluorinated Support D: The preparation of Fluorinated Support D (middle F:Al/low Al:Si) was achieved by dry mixing 25.1 g of SiAl(1%) with 1.52 g of $(NH_4)_2SiF_6$ and then transferring the mixture into a quartz tube having a glass-fritted disc. The quartz tube was then inserted into a tube furnace and equipped with an inverted glass fritted funnel on the top opening of the tube. The mixture was then fluidized with nitrogen (0.4 SLPM). Upon fluidization, the tube was heated from room temperature to an average reaction temperature of 116° C. over a period of 5 hours. Upon reaching the average reaction temperature, the tube was maintained at the average reaction temperature for another 4 hours. The tube was then heated to an average calcining temperature of 470° C. over 2 hours and then held at the calcining temperature for 4 hours. The tube was then removed from the heat and cooled under nitrogen.

Fluorinated Support E: The preparation of Fluorinated Support E was achieved by dry mixing 22.0 g of SiAl(5%)

with 1.37 g of NH₄BF₄ and then transferring the mixture into a quartz tube having a glass-fritted disc. The quartz tube was then inserted into a tube furnace and equipped with an inverted glass fritted funnel on the top opening of the tube. The mixture was then fluidized with nitrogen (0.4 SLPM). Upon fluidization, the tube was heated from room temperature to an average reaction temperature of 116° C. over a period of 5 hours. Upon reaching the average reaction temperature, the tube was maintained at the average reaction temperature for another 4 hours. The tube was then heated to an average calcining temperature of 470° C. over 2 hours and then held at the calcining temperature for 4 hours. The tube was then removed from the heat and cooled under nitrogen.

Fluorinated Support F: The preparation of Fluorinated Support F was achieved by dry mixing 20.2 g of SiAl(5%) with 1.6 g of NH₄.HF and then transferring the mixture into a quartz tube having a glass-fritted disc. The quartz tube was then inserted into a tube furnace and equipped with an inverted glass fritted funnel on the top opening of the tube. The mixture was then fluidized with nitrogen (0.4 SLPM). Upon fluidization, the tube was heated from room temperature to an average reaction temperature of 116° C. over a period of 5 hours. Upon reaching the average reaction temperature, the tube was maintained at the average reaction temperature for another 4 hours. The tube was then heated to an average calcining temperature of 470° C. over 2 hours and then held at the calcining temperature for 4 hours. The tube was then removed from the heat and cooled under nitrogen.

Fluorinated Support G: The preparation of Fluorinated Support G was achieved by mixing 25.0 g of SiAl(5%) with a 150 mL aqueous solution that contained 1.50 g of NH₄.HF at ambient temperature. The water was then removed at 70° C. in a rotary evaporator. The dry solids were transferred into a quartz tube having a glass-fritted disc. The quartz tube was then inserted into a tube furnace and equipped with an inverted glass fritted funnel on the top opening of the tube. The mixture was then fluidized with nitrogen (0.4 SLPM). Upon fluidization, the tube was heated from room temperature to an average reaction temperature of 116° C. over a period of 5 hours. Upon reaching the average reaction temperature, the tube was maintained at the average reaction temperature for another 4 hours. The tube was then heated to an average calcining temperature of 470° C. over 2 hours and then held at the calcining temperature for 4 hours. The tube was then removed from the heat and cooled under nitrogen.

Support H: The preparation of Non-Fluorinated Support H was achieved by transferring 45.6 g of SiAl(5%) into a quartz tube having a glass-fritted disc. The quartz tube was then inserted into a tube furnace and equipped with an inverted glass fritted funnel on the top opening of the tube. The SiAl (5%) was then fluidized with nitrogen (0.4 SLPM). Upon fluidization, the tube was heated from room temperature to an average reaction temperature of 116° C. over a period of 5 hours. Upon reaching the average reaction temperature, the tube was maintained at the average reaction temperature for another 4 hours. The tube was then heated to an average calcining temperature of 470° C. over 2 hours and then held at the calcining temperature for 4 hours. The tube was then removed from the heat and cooled under nitrogen.

Catalyst A: The preparation of Catalyst A (late scavenger) was achieved by slurrying 0.5 g of Fluorinated Support A in 5 mL or toluene and stirring with a magnetic stir bar. The preparation then included adding 5 mg of rac-dimethylsilanylbis(2-methyl-4-phenyl-1-indenyl)zirconium dichloride to the fluorinated support at room temperature. The mixture was then stirred for about 2 minutes and 1.0 g of TibAl (25.2 wt. % in heptane) was added to the mixture. The resulting mixture was then stirred for 1.5 hours at room temperature. The resulting mixture was then filtered through a medium glass filter funnel and washed three times with 5 mL of hexane. The final solids were then dried under vacuum and slurried in 6.27 g of mineral oil.

Catalyst B. The preparation of Catalyst B (early scavenger/high F:Al) was achieved by slurrying 1.02 g of Fluorinated Support A in 6 mL of toluene and stirring with a magnetic stir bar. The preparation then included adding 4.0 g of TibAl (25.2 wt. % in heptane) to the mixture and the mixture was then stirred for about 5 minutes at room temperature. The preparation then included adding 11.3 mg of rac-dimethylsilanyl-bis(2-methyl-4-phenyl-1-indenyl)zirconium dichloride to the fluorinated support at room temperature. The resulting mixture was then stirred for 2 hours at room temperature. The resulting mixture was then filtered through a medium glass filter funnel and washed once with 6.5 grams of toluene followed by washing three times with 5 mL of hexane. The final solids were then dried under vacuum and 0.48 g of the catalyst were slurried in 7.12 g of mineral oil.

Catalyst C: The preparation of Catalyst C (early scavenger) was achieved by slurrying 1.01 g of Fluorinated Support B in 6 mL of toluene and stirring with a magnetic stir bar. The preparation then included adding 4.0 g of TibAl (25.2 wt. % in heptane) to the mixture and the mixture was then stirred for about 5 minutes at room temperature. The preparation then included adding 22.7 mg of rac-dimethylsilanylbis(2-methyl-4-phenyl-1-indenyl)zirconium dichloride to the fluorinated support at room temperature. The resulting mixture was then stirred for 2 hours at room temperature. The resulting mixture was then filtered through a medium glass filter funnel and washed once with 6 mL of toluene followed by washing two times with 5 mL of hexane. The final solids were then dried under vacuum and slurried in 12.3 g of mineral oil.

Catalyst D: The preparation of Catalyst D (early scavenger) was achieved by slurrying 1.02 g of Fluorinated Support C in 6 mL or toluene and stirring with a magnetic stir bar. The preparation then included adding 4.0 g of TibAl (25.2 wt. % in heptane) to the mixture and the mixture was then stirred for about 5 minutes at room temperature. The preparation then included adding 21.3 mg of rac-dimethylsilanylbis(2-methyl-4-phenyl-1-indenyl)zirconium dichloride to the fluorinated support at room temperature. The resulting mixture was then stirred for 2 hours at room temperature. The resulting mixture was then filtered through a medium glass filter funnel and washed once with 6 mL of toluene followed by washing two times with 5 mL of hexane. The final solids were then dried under vacuum and slurried in 12.77 g of mineral oil.

Catalyst E: The preparation of Catalyst E (early scavenger) was achieved by slurrying 1 g of Fluorinated Support D in 6 mL or toluene and stirring with a magnetic stir bar. The preparation then included adding 4.0 g of TibAl (25.2 wt. % in heptane) to the mixture and the mixture was then stirred for about 5 minutes at room temperature. The preparation then included adding 21.0 mg of rac-dimethylsilanylbis(2-methyl-4-phenyl-1-indenyl)zirconium dichloride to the fluorinated support at room temperature. The resulting mixture was then stirred for 2 hours at room temperature. The resulting mixture was then filtered through a medium glass filter funnel and washed once with 6 mL of toluene followed by washing two times with 5 mL of hexane. The final solids were then dried under vacuum and slurried in 12.88 g of mineral oil.

Catalyst F: The preparation of Catalyst F (no scavenger) was achieved by slurrying 0.52 g of Fluorinated Support B in 4 mL of toluene and stirring with a magnetic stir bar. The preparation then included adding 11.7 mg of rac-dimethylsilanylbis(2-methyl-4-phenyl-1-indenyl)zirconium dichloride to the fluorinated support at room temperature. The resulting mixture was then stirred for 2 hours. The resulting mixture was then filtered through a medium glass filter funnel and washed once with 6 mL of toluene followed by washing three times with hexane. The final solids were then dried under vacuum and slurried in 3.24 g of mineral oil.

Catalyst G: The preparation of Catalyst G was achieved by slurrying 1.03 g of Non-fluorinated Support H in 6 mL of toluene and stirring with a magnetic stir bar. The preparation then included adding 4.0 g of TibAl (25.2 wt. % in heptane) to the mixture and the mixture was then stirred for about 5 minutes at room temperature. The preparation then included adding 21.5 mg of rac-dimethylsilanylbis(2-methyl-4-phenyl-1-indenyl)zirconium dichloride to the fluorinated support at room temperature. The resulting mixture was then stirred for 2 hours at room temperature. The resulting mixture was then filtered through a medium glass filter funnel and washed once with 6 mL of toluene followed by washing two times with 5 mL of hexane. The final solids were then dried under vacuum and slurried in 12.00 g of mineral oil.

Catalyst H: The preparation of Catalyst H (early scavenger) was achieved by slurrying 1.04 g of Fluorinated Support E in 6 mL of toluene and stirring with a magnetic stir bar. The preparation then included adding 4.0 g of TibAl (25.2 wt. % in heptane) to the mixture and the mixture was then stirred for about 5 minutes at room temperature. The preparation then included adding 11.8 mg of rac-dimethylsilanylbis(2-methyl-4-phenyl-1-indenyl)zirconium dichloride to the fluorinated support at room temperature. The resulting mixture was then stirred for 1.0 hour at room temperature. The resulting mixture was then filtered through a medium glass filter funnel and washed two times with 5 mL of hexane. The final solids were then dried under vacuum and slurried in mineral oil.

Catalyst I: The preparation of Catalyst I (early scavenger) was achieved by slurrying 1.04 g of Fluorinated Support F in 6 mL of toluene and stirring with a magnetic stir bar. The preparation then included adding 4.0 g of TibAl (25.2 wt. % in heptane) to the mixture and the mixture was then stirred for about 5 minutes at room temperature. The preparation then included adding 20.6 mg of rac-dimethylsilanylbis(2-methyl-4-phenyl-1-indenyl)zirconium dichloride to the fluorinated support at room temperature. The resulting mixture was then stirred for 2 hours at room temperature. The resulting mixture was then filtered through a medium glass filter funnel and washed once with 6 mL of hexane. The final solids were then dried under vacuum and slurried in mineral oil.

Catalyst J: The preparation of Catalyst J (early scavenger) was achieved by slurrying 1.01 g of Fluorinated Support G in 6 mL of toluene and stirring with a magnetic stir bar. The preparation then included adding 4.0 g of TibAl (25.2 wt. % in heptane) to the mixture and the mixture was then stirred for about 5 minutes at room temperature. The preparation then included adding 11.1 mg of rac-dimethylsilanylbis(2-methyl-4-phenyl-1-indenyl)zirconium dichloride to the fluorinated support at room temperature. The resulting mixture was then stirred for 1.0 hour at room temperature. The resulting mixture was then filtered through a medium glass filter funnel and dried under vacuum. The final solids were slurried in mineral oil.

Catalyst K: The preparation of Catalyst K (early scavenger) was achieved by slurrying 1.16 g of Fluorinated Support B in 6 mL of toluene and stirring with a magnetic stir bar. The preparation then included adding 8.0 g of TibAl (25.2 wt. % in heptane) to the mixture and the mixture was then stirred for about 5 minutes at room temperature. The preparation then included adding 21.2 mg of rac-dimethylsilanylbis(2-methyl-4-phenyl-1-indenyl)zirconium dichloride to the fluorinated support at room temperature. The resulting mixture was then stirred for 1.0 hour at room temperature. The resulting mixture was then filtered through a medium glass filter funnel and washed two times with 5 mL of hexane. The final solids were then dried under vacuum and slurried in mineral oil.

Catalyst L: The preparation of Catalyst L (early scavenger) was achieved by slurrying 1.05 g of Fluorinated Support B in 6 mL of toluene and stirring with a magnetic stir bar. The preparation then included adding 12.0 g of TibAl (25.2 wt. % in heptane) to the mixture and the mixture was then stirred for about 5 minutes at room temperature. The preparation then included adding 20.9 mg of rac-dimethylsilanylbis(2-methyl-4-phenyl-1-indenyl)zirconium dichloride to the fluorinated support at room temperature. The resulting mixture was then stirred for 1 hour at room temperature. The resulting mixture was then filtered through a medium glass filter funnel and washed two times with 5 mL of hexane. The final solids were then dried under vacuum and slurried in mineral oil.

Catalyst M: The preparation of Catalyst M (early scavenger) was achieved by slurrying 1.03 g of Fluorinated Support B in 6 mL of toluene and stirring with a magnetic stir bar. The preparation then included adding 4.0 g of TibAl (25.2 wt. % in heptane) to the mixture and the mixture was then stirred for about 5 minutes at room temperature. The preparation then included adding 19.8 mg of iPr(3-tBu-5-Me-Cp)(Flu)zirconium dichloride to the fluorinated support at room temperature. The resulting mixture was then stirred for 2 hours at room temperature. The resulting mixture was then filtered through a medium glass filter funnel and washed once with 6 mL of toluene followed by washing two times with 5 mL of hexane. The final solids were then dried under vacuum and slurried in mineral oil.

Catalyst N: The preparation of Catalyst N (early scavenger) was achieved by slurrying 1.03 g of Fluorinated Support B in 6 mL of toluene and stirring with a magnetic stir bar. The preparation then included adding 4.0 g of TiBAl (25.2 wt. % in heptane) to the mixture and the mixture was then stirred for about 5 minutes at room temperature. The preparation then included adding 22.5 mg of $Ph_2C(Cp)(Flu)$zirconium dichloride to the fluorinated support at room temperature. The resulting mixture was then stirred for 2 hours at room temperature. The resulting mixture was then filtered through a medium glass filter funnel and washed once with 6 mL of toluene followed by washing two times with 5 mL of hexane. The final solids were then dried under vacuum and slurried in mineral oil.

The resulting catalysts were then exposed to polymerization with propylene and ethylene monomer to form polypropylene and polyethylene. The results of such polymerizations follow in the tables below.

TABLE IIIA (Polypropylene)

| Reactor | Catalyst | Co-Cat | Activity (g/g/h) | $T_{rec}$ (°C.) | $\Delta_{Recryst}$ (J/g) | $T_{melt}$ (°C.) | $\Delta 2^{nd}_{melt}$ (J/g) | $2^{nd} T_m$ (°C.) | $M_w$ | $M_w/M_n$ | $M_z/M_w$ | mmmm |
|---|---|---|---|---|---|---|---|---|---|---|---|---|
| 6X | A | TEAL | 125 | 105.6 | −77.99 | 142.7 | 80.59 | | 49236 | 5.0 | 3.2 | |
| 6X | B | TEAL | 537 | 108.47 | 92.91 | 148 | 101.68 | | 90529 | 6.6 | 2.7 | |
| 6X | C | TEAL | 1334 | 107.97 | 94.24 | 148.7 | 104.55 | | 105258 | 5.2 | 2.3 | 98.3 |
| 6X | C | TIBAL | 5272 | 107.13 | 91.51 | 149.4 | 96.09 | | 200708 | 4.8 | 2.6 | |
| 4L | C | TIBAL | 3851 | | | | | | | | | |
| 6X | D | TEAL | 472 | 108 | −87.3 | 146.7 | 87.5 | | 76055 | 5.9 | 2.6 | |
| 6X | D | TIBAL | 2247 | 107.6 | −87.6 | 149.7 | 81.58 | | 236929 | 6.3 | 2.7 | |
| 6X | E | TEAL | 108 | 105.3 | −76.1 | 140.4 | 75.4 | 147 | 47833 | 5.2 | 3.2 | |
| 6X | E | TIBAL | 279 | | | | | | | | | |
| 6X | F | TEAL | 67 | 99.3 | 53.44 | 137.4 | 59.72 | | 66213 | 5.6 | 2.9 | |
| 6X | G | TEAL | 0 | | | | | | | | | |
| 6X | H | TIBAL | 1253 | | | | | | | | | |
| 6X | I | TIBAL | 431 | | | | | | | | | |
| 6X | J | TIBAL | 4043 | | | | | | | | | |
| 4L | K | TIBAL | 7280 | | | | | | | | | |
| 4L | L | TIBAL | 5022 | | | | | | | | | |

6X Polymerization Conditions: 170 g propylene, 14 mmoles H2, 10 mg Co-Catalyst, 67° C., 30 min.
4L Polymerization Conditions: 1350 g propylene, 24 mmoles H2, 90 mg Co-Catalyst, 67° C., 30 min.

TABLE IIIB (Polypropylene)

| Catalyst | Co-Cat | Polymerization Temp (°C.) | Activity (g/g/h) | $T_r$ (°C.) | $\Box H_r$ (J/g) | $T_m$ (°C.) | $\Box H_m$ (J/g) | $M_w$ | $M_w/M_n$ | $M_z/M_w$ |
|---|---|---|---|---|---|---|---|---|---|---|
| M | TIBAL | 67 | 25 | 99.3 | −58.5 | 136.0 | 55.2 | 107144 | 4 | 2.2 |
| N | TIBAL | 60 | 220 | 62.3 | 0.6 | 119.4 | 9.2 | 152963 | 3.3 | 2.3 |

6X Polymerization Conditions: 170 g propylene, 14 mmoles H2, 10 mg Co-Catalyst, 30 min.

TABLE IIIC (Polyethylene)

| Catalyst | Co-Catlyst | t | Activity | M | $T_R$ | $T_{M2}$ | Mn | Mw | Mz | HLMI |
|---|---|---|---|---|---|---|---|---|---|---|
| C | TIBAL | 60 | 1903 | 2 | 94.6 | 103.7 | 29730 | 201841 | 590085 | 0.3 |

*t is polymerization time in minutes, activity is expressed in gPP/gCat/hour, M is the catalyst loading in wt. %, $T_R$ is recrystallization temperature in ° C., $T_{M2}$ is the temperature of the second melt peak in ° C., HLMI is explessed in g/10 min.

Examples-IV

Samples of polymers were formed according to the third embodiments described herein. As used in these examples, silica-alumina refers to silica alumina that was obtained from Fuji Sylisia Chemical LTD (Silica-Alumina 205 20 μm), such silica having a surface area of 260 m²/g, a pore volume of 1.30 mL/g, an aluminum content of 4.8 wt. %, an average particle size of 20.5 μm and a pH of 6.5.

Unless otherwise specified, the fluorination of the alumina-silica was accomplished by slurrying 5.0 g of alumina-silica in 15 mL of water at ambient temperature. 0.30 g of NHF.HF (in 10 mL of water) was added to the slurry. The resulting mixture was then placed under partial vacuum at 90° C. in a rotavap. Heat treatment profile 1 included heating the resulting dry solids in a muffle furnace at 400° C. for 3 hours. Heat treatment profile 2 included heating the resulting dry solids in a muffle furnace at 260° C. for 1 hour and then at 400° C. for 3 hours. The solids were left to cool to ambient temperature and placed under vacuum.

Unless otherwise specified, the first catalyst preparation method ("isolated method") included mixing 1 g. of the fluorinated support in 6 mL of toluene with 4 g. of TIBAL (25.2 wt. % in heptane) at a 1:1 wt. ratio and stirring with a magnetic stir bar for 5 minutes at ambient temperature. 10 mg. of dimethylsilylbis(2-methyl-4-phenyl-indenyl)zirconium dichloride was then added at ambient temperature. The mixture was then stirred for 1 hour and filtered. The resulting solids were washed with 6 mL of toluene, washed twice with 5 mL of hexane and dried under vacuum. The dried solids were then slurried in 12.3 g. of mineral oil and stored at −35° C. until use for polymerizations.

Unless otherwise specified, the second catalyst preparation method ("one pot") included mixing 10 mg. of dimethylsilyl-bis(2-methyl-4-phenyl-indenyl)zirconium dichloride with 4.0 g of TIBAL (25.2 wt. % in heptane) and stirring the mixture for about 15 minutes at ambient temperature. 1.0 g of the fluorinated support was then added as a dry powder and the mixture was stirred for another 15 minutes. 6 g. of mineral oil were then added and the resulting mixture was stirred for 5 minutes.

Propylene Polymerizations The catalyst slurry was then contacted with propylene monomer to form polymer. The polymerization conditions and results of each polymerization follow in Tables IVA, IVB and IVC.

TABLE IVA

| Run # | Heat Treatment Profile | Prep Method | Fl. Agent | Wt % Fl. Agent | Supp:TIBAL wt. ratio | Activity (g/g/h) | BD (g/cc) |
|---|---|---|---|---|---|---|---|
| 1 | 1 | 1 | NH₄F•HF | | 1:2 | 2812 | 0.45 |
| 2 | 2 | 1 | NH₄F•HF | | 1:2 | 3175 | NR |
| 3 (comp) | Tube furnace (500° C.) | 1 | (NH₄)₂SiF₆ | | 1:1 | 3851 | NR |
| 4 | 2 | 1 | NH₄F•HF | 3.8 | 1:1 | 1729 | |
| 5 | 2 | 1 | NH₄F•HF | 6.0 | 1:1 | 3175 | |
| 6 | 2 | 1 | NH₄F•HF | 10.0 | 1:1 | 2867 | |

*BD refers to and is measured via ASTM-D-1238-E, 4L reactor, 1350 g. propylene, 24 mmol H₂, 90 mg TIBAL, 45 mg. catalyst, 67° C., 30 minutes

TABLE IVB

| Run # | $T_r$ (° C.) | $\Delta H_r$ (J/g) | $T_m$ (° C.) | $\Delta H_m$ (J/g) | Mw | Mw/Mn | Mz/Mw |
|---|---|---|---|---|---|---|---|
| 1 | 109.6 | 92.5 | 150.7 | 97.1 | 140547 | 4.4 | 1.9 |
| 2 | 112.6 | 99.2 | 151.7 | 76.8 | 133716 | 4.0 | 2.1 |
| 3(comp) | 107.6 | 94.6 | 150.0 | 99.1 | 142779 | 5.2 | 2.3 |
| 4 | 112.3 | 86.9 | 155.0 | 81.0 | 149935 | 3.5 | 2.0 |
| 5 | 112.6 | 99.2 | 151.7 | 76.8 | 133716 | 4.0 | 2.1 |
| 6 | 109.6 | 88.4 | 150.7 | 83.5 | 137613 | 4.2 | 2.0 |

*Tr refers to recrystallization temperature, ΔHr refers to heat of recrystallization, Tm refers to melting point, ΔHm refers to heat of melt, Mw refers to weight average molecular weight, Mn refers to number average molecular weight and Mz refers to z average molecular weight, NR means not recorded, NA means not applicable

TABLE IVC

| Run # | Prep Method | Fl. Agent | Wt % Fl. Agent | Supp:TIBAL wt. ratio | Activity (g/g/h) |
|---|---|---|---|---|---|
| 7(comp) | 0.7 MAO/P10 | NA | 0 | 1:1 | 6251 |
| 8 | 2 | NH₄F•HF | 5 | 1:1 | 4557 |
| 9 | 2 | (NH₄)₂SiF₆ | 6 | 1:1 | 5986 |
| 10 | 2 | NH₄F•HF | 7 | 1:1 | 7128 |
| 11 | 2 | NH₄F•HF | 8 | 1:1 | 10049 |

6X parallel reactor, 170 g. propylene, 10 mmol H₂, 90 mg TIBAL, 10 mg. catalyst, 67° C., 30 minutes Unexpectedly, it was observed that both heat treatment profiles resulted in approximately the same catalytic activity and properties. Further, it was observed that the highest catalyst activity was observed for the catalyst prepared with 6 wt. % fluorinating agent. It was further observed that one-pot catalyst preparation resulted in higher catalyst activity than the isolated method. In addition, the one-pot method produced polymer having a higher molecular weight.

Ethylene/Propylene Polymerizations: The catalyst slurry was then contacted with propylene monomer to form polymer. The polymerization conditions and results of each polymerization follow in Tables IVD and IVE.

TABLE IVD

| Run # | Prep Method | Fl. Agent | Wt % Fl. Agent | Supp:TIBAL wt. ratio | Wt. % ethylene in feed | Activity (g/g/h) | MFI (g/10 min) |
|---|---|---|---|---|---|---|---|
| 12 | Tube Furnace | NH₄F•HF | 6 | 1:1 | 2 | 8348 | 95.0 |
| 13 | Tube Furnace | NH₄F•HF | 6 | 1:1 | 3 | 16903 | 17.0 |
| 14 | Tube Furnace | NH₄F•HF | 6 | 1:1 | 5 | 34378 | 8.9 |
| 15(comp) | 0.7 MAO/P10 | | | 1:1 | 2 | 8392 | 66.9 |
| 16(comp) | 0.7 MAO/P10 | | | 1:1 | 3 | 8192 | 61.7 |
| 17(comp) | 0.7 MAO/P10 | | | 1:1 | 5 | 8025 | 61.4 |
| 18 | Muffle Furnace | NH₄F•HF | | | 0 | 10396 | 16.5 |
| 19 | Muffle Furnace | NH₄F•HF | | | 1 | 15173 | 7.3 |
| 20 | Muffle Furnace | NH₄F•HF | | | 2 | 17460 | 6.2 |

6X reactor, 170 g. propylene, 116 ppm H₂, 90 mg TIBAL, 10 mg. catalyst, 67° C., 30 minute, 0.5 TEAL:Cat ratio for comp

TABLE IVE

| Run # | $T_r$ (° C.) | $\Delta H_r$ (J/g) | $T_m$ (° C.) | $\Delta H_m$ (J/g) | Mw | Mw/Mn | Mz/Mw |
|---|---|---|---|---|---|---|---|
| 12 | 98.3 | 81.6 | 140.0 | 81.8 | 125039 | 4.8 | 2.3 |
| 13 | 93.3 | 75.4 | 135.5 | 75.3 | 188053 | 3.9 | 2.1 |
| 14 | 83.5 | 59.6 | 127.9 | 58.5 | 293066 | 4.1 | 2.5 |
| 15 | 99.0 | 78.0 | 140.2 | 79.3 | 127695 | 3.3 | 1.9 |
| 16 | 94.3 | 72.4 | 135.9 | 75.5 | 148156 | 3.7 | 2.3 |
| 17 | 83.8 | 61.1 | 131.0 | 59.6 | 138892 | 3.2 | 2.0 |

*Tr refers to recrystallization temperature, ΔHr refers to heat of recrystallization, Tm refers to melting point, ΔHm refers to heat of melt, Mw refers to weight average molecular weight, Mn refers to number average molecular weight and Mz refers to z average molecular weight, NR means not recorded, NA means not applicable Unexpectedly, it was observed that the fluorinated alumina-silica catalyst activity increased with an increase in the ethylene content of the feed. However, the activity of the MAO/SiO$_2$ catalyst remained relatively constant. Further, the melt flow if the fluorinated alumina-silica decreased with an increase in ethylene content, while the melt flow of the comparison system did not change.

Effect of % fluorine. Several samples of prepared fluorinated supports were analyzed for the amount of fluoride content, the results of which follow in Table IVF.

TABLE IVF

| Run # | Fluorination Method | Fl. Agent | Wt % Fl. Agent | Heat Treatment Method | Wt. % Fluorine | Activity (g/g/h) |
|---|---|---|---|---|---|---|
| 21 | Tube | (NH$_4$)$_2$SiF$_6$ | 6 | Tube | 1.56 | 5734 |
| 22 | Muffle | NH$_4$F•HF | 6 | Glass Dish (small) | 1.23 | 5986 |
| 23 | Muffle | NH$_4$F•HF | 8 | Glass Dish (small) | 2.32 | 10049 |
| 24 | Muffle | NH$_4$F•HF | 10 | Glass Dish (small) | 1.98 | 10461 |
| 25 | Muffle | NH$_4$F•HF | 10 | Flask | 1.38 | 6886 |
| 26 | Muffle | NH$_4$F•HF | 10 | Glass Dish (large) | 2.06 | 10086 |

6X reactor, 170 g. propylene, 116 ppm H2, 90 mg TIBAL, 10 mg. catalyst, 67° C., 30 minute, 0.5 TEAL:Cat ratio for comp It was observed that the highest fluoride content was obtained when the fluorinating process was carried out under open glass dish heat treatments at 400° C. for 5 hours, which also resulted in the highest activity.

Stability: A 20-gram sample of NH$_4$F.HF supported AlSiO$_2$ was heat-treated using the small glass dish heat treatment method (method Al). The resulting F—AlSiO$_2$ support was used to prepare catalyst using the insitu catalyst preparation method. The catalyst system was then tested for stability at 0° C. and at ambient temperature (25° C.).

TABLE IVG

| Item # | Stadis (ppm) | Storage Temp. (° C.) | Wt. % C$_2$ in Feed | Storage Time | Activity (g/g/h) | % Activity decrease |
|---|---|---|---|---|---|---|
| 1 | 0 | 0 | 0 | 1 night | 13088 | — |
| 2 | 0 | 0 | 0 | 2 nights | 11958 | 9 |
| 3 | 0 | 0 | 0 | 4 weeks | 9103 | 30 |
| 4 | 0.5 | 0 | 0 | 2 nights | 7855 | 40 |
| 5 | 1.5 | 0 | 0 | 2 nights | 6540 | 50 |
| 6 | 3 | 0 | 0 | 1 night | 7079 | 46 |
| 7 | 0.5 | 25 | 0 | 3 days | 9504 | 27 |
| 8 | 0.5 | 25 | 0 | 4 days | 7917 | 40 |
| 9 | 3 | 25 | 0 | 4 days | 4779 | 63 |
| 10 | 3 | 25 | 3 | 4 days | 4709 | 64 |

Polymerization conditions: 2L reactor: 700 g propylene, 15 mmoles H2, 67° C., 30 min. All runs produced fluff B.D. in the range of 0.40 to 0.45 g/cc.

Effect of Supporting Methods. Method A was achieved by slurrying 5.04 grams of alumina-silica in 10 mL of water at ambient temperature. To the silica/water slurry, a solution of 0.52 grams of NHF.HF in 15 mL of water was added at ambient temperature (25° C.). The resulting "wet" solids were then placed under partial vacuum (15 in. Hg) at 90° C. in a rotavap to remove the water.

Method B was a achieved adding about 3.15 L of water to a 3 gallon HDPE bucket that was equipped with a mechanical stirrer (4.5" L×3.5" W anchor-type). About 1.0 Kg of alumina-silica were slowly added to the water while maintaining agitation at 60 rpm. To the thick slurry, a solution of 100 grams of NH$_4$F.HF in 800 mL of water were slowly added while stirring at ambient temperature. The mixture was left to stir for 1 hour at ambient temperature.

Method 1 was achieved by adding to a 3.0-L, 1-neck (24/40), round bottom flask, the white slurry until the flask was about ⅔ full. The flask was attached to a rotavap that was equipped with a mineral oil bath and two-piece cold trap style condenser. The condenser was charged with ice and the flask was placed under full vacuum (760 mm mercury; dry vacuum pump). The flask was rotated at 60 rpm while the bath temperature increased from ambient temperature up to 95° C. The water was removed after 2 hours. The supported NH4F.HF on AlSiO2 was obtained as a semi-wet solid.

Method 2 was achieved by charging a vessel to about ¾ full with the water slurry of the supported NH4F.HF on AlSiO$_2$. The flask was equipped with a stir shaft that contained 4 kneading propeller-type impellors. The flask was closed with a 3 (24/40) neck lid and placed in a mineral oil bath. The slurry was heated from ambient temperature to 115° C. under a slow nitrogen purge while stirring. After 3 hours, about ¾ of the water evaporated and stirring was not possible. The stirrer and the oil bath were turned off and the slurry was left to slowly cool in the bath with a slow nitrogen flow overnight. The water evaporated overnight.

Heat treatment Method A1 was achieved by placing 20 gram of the supported NH$_4$F.HF on AlSiO$_2$ solid mixture in a small glass dish. The dish was placed in a muffle furnace and heated at 400° C. for 3 hours. While still "hot" (about 250° C.), the solids were transferred into a "hot" (about 110° C.) schlenk round bottom flask. The flask was capped with a rubber septa and placed under vacuum while it cooled to ambient temperature. The solids were then stored under nitrogen.

Heat treatment Method A2 was achieved by charging a 3 L round bottom flask (1-neck, 24/40) (⅔ full) with the supported ammonium bifluoride salt on AlSiO$_2$. The 3 L flask was then placed in a muffle furnace and heat-treated for 5 hours at 400° C. The flask was removed from the muffle furnace and cooled to about 250° C. The flask was then equipped with a coarse glass filter adapter and placed in a vacuum atmosphere's antechamber where it was then placed under vacuum and backfilled with nitrogen three times. The flask was then stored under nitrogen in a glove box.

Heat treatment Method A3 was achieved by transferring the contents from each 3 L Flask into two medium (170 mm O.D.×90 mm Height) glass dishes and two large (190 mm O.D.×100 mm Height) glass dishes. The glass dishes were then placed in a muffle furnace at 350° C. After 1.0 hour, the temperature reached to 400° C. and left at this temperature for 5 hours. The dish was taken out of the muffle furnace and place in a hood to cool to about 250° C. (thermocouple). The solids were slowly transferred into a 2 gallon pressure/vacuum vessel (Alloy Products) that was equipped with a metal funnel. The process was repeated for the second dish. The vessel was placed under vacuum (−30 in. Hg) overnight.

The vessel was transferred into a glove box and slowly filled with nitrogen. The catalysts were then exposed to polymerization, the results of which follow in the tables below.

TABLE IVH

| Example # | Support Method | Heat Treatment Method | Cat. (mg) | Pol. Time (min.) | Propylene (g) | $H_2$ (ppm) | Activity (g/g/h) | B.D. (g/mL) | MF (dg/min.) |
|---|---|---|---|---|---|---|---|---|---|
| 1 | A | A1 | 20 | 30 | 690 | 43 | 14642 | 0.41 | 16.5 |
| 2 | A | A1 | 20 | 60 | 698 | 43 | 10461 | 0.46 | 5 |
| 3 | B | A1 | 20.0 | 30 | 690 | 43 | 14806 | | |
| 4 | B | A1 | 10.2 | 30 | 170 | 118 | 2392 | | |
| 5 | B | A1 | 10.3 | 30 | 170 | 118 | 4224 | | |
| 6 | B | A2 | 10.0 | 30 | 170 | 118 | 1462 | | |
| 7 | B | A2 | 10.1 | 30 | 170 | 118 | 1308 | | |
| 8 | B | A2 | 10.2 | 30 | 170 | 118 | 512 | | |
| 9 | B | A1 | 10.2 | 30 | 170 | 118 | 8012 | | |
| 10 | B | A1 | 10.3 | 30 | 170 | 118 | 8548 | | |
| 11 | B | A2 | 10.0 | 30 | 170 | 118 | 3715 | | |
| 12 | B | A2 | 10.0 | 30 | 170 | 118 | 4052 | | |
| 13 | B | A2 | 10.3 | 30 | 170 | 118 | 2619 | | |
| 14 | B | A1 | 10.1 | 30 | 172 | 117 | 10826 | | |
| 15 | B | A1 | 10.2 | 30 | 175 | 115 | 5556 | | |
| 16 | B | A3 | 10.0 | 30 | 175 | 115 | 7328 | | |
| 17 | B | A3 | 10.4 | 30 | 175 | 115 | 9254 | | |
| 18 | B | A2* | 10.2 | 30 | 175 | 115 | 5274 | | |
| 19 | B | A2* | 10.0 | 30 | 175 | 115 | 6619 | | |
| 20 | | MAO/SiO2-M | 40.2 | 30 | 732 | 42 | 7312 | | |
| 21 | B | A3 | 30.6 | 30 | 729 | 42 | 5583 | | |
| 22 | B | A3 | 30.5 | 30 | 695 | 42 | 8020 | | |
| 23 | B | A3 | 30.0 | 30 | 695 | 42 | 10086 | | |

Examples-V

In the following examples, samples of fluorinated metallocene catalyst compounds were prepared.

As used below "Silica P-10" refers to silica that was obtained from Fuji Sylisia Chemical LTD (grade: Cariact P-10, 20 µm), such silica having a surface area of 281 m²/g, a pore volume of 1.41 mL/g, an average particle size of 20.5 µm and a pH of 6.3.

As used below "DEAF" refers to diethylaluminum fluoride (26.9 wt. % in heptane) that was obtained from Akzo Nobel Polymer Chemicals, L.L.C.

As used below "Silica H-121" refers to silica that was obtained from Asahi Sunsphere, such silica having a surface area of 761 m²/g, a pore volume of 0.91 mL/g, and an average particle size of 12.0 µm.

Fluorinated Support A: The preparation of Fluorinated Support A was achieved by slurrying 20.0 g of silica P10 (heat treated at 150° C. for 16 hours) in 150 mL of toluene at room temperature. The preparation then included adding 2.36 g (0.0240 moles) of DEAF (26.9 wt. % in heptane) to the slurry and stirring for 5 minutes. The resulting mixture was heated to a reaction temperature of 50° C. and stirred for 1 hour. The resulting solid was filtered through a glass filter funnel and washed 3 times with 50 mL of hexane. The solid was then dried under vacuum at ambient temperature. The solids were then transferred into a quartz tube having a glass-fritted disc. The quartz tube was then inserted into a tube furnace and equipped with an inverted glass fritted funnel on the top opening of the tube. The mixture was then fluidized with nitrogen (0.6 SLPM). Upon fluidization, the tube was heated from room temperature to 130° C. over 1.0 hour. Then the tube was heated from 130° C. to 450° C. over 1.0 hour. Upon reaching the average reaction temperature, the tube was maintained at the average reaction temperature for another 1.0 hours. The tube was then heated and held to an average calcining temperature of 480° C. for 1.0 hour. The tube was then removed from the heat and cooled under nitrogen.

Fluorinated Support B: The preparation of Fluorinated Support B was achieved by slurrying 20.0 g of silica P10 (heat treated at 150° C. for 16 hours) in 150 mL of toluene at room temperature. The preparation then included adding 2.36 g (0.0240 moles) of DEAF (26.9 wt. % in heptane) to the slurry and stirring for 5 minutes. The resulting mixture was heated to a reaction temperature of 50° C. and stirred for 1 hour. The resulting solid was filtered through a glass filter funnel and washed 3 times with 50 mL of hexane. The solid was then dried under vacuum at ambient temperature. The solids were then transferred into a quartz tube having a glass-fritted disc. The quartz tube was then inserted into a tube furnace and equipped with an inverted glass fritted funnel on the top opening of the tube. The mixture was then fluidized with nitrogen (0.6 SLPM). Upon fluidization, the tube was heated from room temperature to 130° C. over 1.0 hour. Then the tube was heated from 130° C. to 450° C. over 1.0 hour. Upon reaching the average reaction temperature, the tube was maintained at the average reaction temperature for another 1.0 hour. The tube was then heated and held to an average calcining temperature of 480° C. for 1.0 hour. The tube was then removed from the heat and cooled under nitrogen. The tube was then heat treated for the second time under air (0.6 SLPM) with the same heat treatment profile.

Fluorinated Support C. The preparation of Fluorinated Support C was achieved by slurrying 20.0 g (0.0144 moles) of silica H-121 (heat treated at 150° C. for 16 hours) in 100 mL toluene at room temperature. The preparation then included adding 25.5 g (0.0657 moles) of DEAF (26.9 wt. % in heptane) to the slurry and stirring for 5 minutes. The resulting mixture was heated to a reaction temperature of 50° C. and stirred for 1 hour. The resulting solid was filtered through a glass filter funnel and washed 3 times with 50 mL of hexane. The solid was then dried under vacuum at ambient temperature. The solids were then transferred into a quartz tube having a glass-fritted disc. The quartz tube was then inserted into a tube furnace and equipped with an inverted glass fritted funnel on the top opening of the tube. The mixture was then fluidized with nitrogen (0.6 SLPM). Upon fluidization, the tube was heated from room temperature to 130° C. over 1.0 hour. Then the tube was heated from 130° C. to 450° C. over 1.0 hour. Upon reaching the average reaction temperature, the tube was maintained at the average reaction temperature for another 1.0 hour. The tube was then heated and held to an average calcining temperature of 480° C. for 1.0 hour. The tube was then removed from the heat and cooled under nitrogen.

Fluorinated Support D: The preparation of Fluorinated Support D was achieved by slurrying 20.0 g (0.0144 moles) of silica H-121 (heat treated at 150° C. for 16 hours) in 100 mLtoluene at room temperature. The preparation then included adding 25.5 g (0.0657 moles) of DEAF (26.9 wt. % in heptane) to the slurry and stirring for 5 minutes. The resulting mixture was heated to a reaction temperature of 50° C. and stirred for 1 hour. The resulting solid was filtered through a glass filter funnel and washed 3 times with 50 mL of hexane. The solid was then dried under vacuum at ambient temperature. The solids were then transferred into a quartz tube having a glass-fritted disc. The quartz tube was then inserted into a tube furnace and equipped with an inverted glass fritted funnel on the top opening of the tube. The mixture was then fluidized with nitrogen (0.6 SLPM). Upon fluidization, the tube was heated from room temperature to 130° C. over 1.0 hour. Then the tube was heated from 130° C. to 450° C. over 1.0 hour. Upon reaching the average reaction temperature, the tube was maintained at the average reaction temperature for another 1.0 hour. The tube was then heated and held to an average calcining temperature of 480° C. for 1.0 hour. The tube was then removed from the heat and cooled under nitrogen. The tube was then heat treated for the second time under air (0.6 SLPM) with the same heat treatment profile.

Catalyst A: The preparation of Catalyst A was achieved by slurrying 1.05 grams of the support A in 6 mL of toluene at ambient temperature and stirring with a magnetic stir bar. The preparation then included adding 4.04 g of TIBAl (25.2 wt. % in heptane) to the mixture and the mixture was then stirred for about 5 minutes at room temperature. The preparation then included adding 25.2 mg of rac-diemthylsilanylbis(2-methyl-4-phenyl-1-indenyl)zirconium dichloride to the fluorinated support at room temperature. The resulting mixture was then stirred for 1.5 hours. The resulting mixture was filtered through a glass filter funnel and washed once with 5 mL toluene followed by washing once with 5 mL hexane. The final solids were then dried under vacuum and slurried in mineral oil.

Catalyst B. The preparation of Catalyst B was achieved by slurrying 1.03 grams of the support B in 6 mL of toluene at ambient temperature and stirring with a magnetic stir bar. The preparation then included adding 4.01 g of TIBAl (25.2 wt. % in heptane) to the mixture and the mixture was then stirred for about 5 minutes at room temperature. The preparation then included adding 20.0 mg of rac-diemthylsilanylbis(2-methyl-4-phenyl-1-indenyl)zirconium dichloride to the fluorinated support at room temperature. The resulting mixture was then stirred for 1.5 hours. The resulting mixture was filtered through a glass filter funnel and washed once with 5 mL toluene followed by washing once with 5 mL hexane. The final solids were then dried under vacuum and slurried in mineral oil.

Catalyst C: The preparation of Catalyst C was achieved by slurrying 1.0 gram of the support B in 6 mL of toluene at ambient temperature and stirring with a magnetic stir bar. The preparation then included adding 4.04 g of TIBAl (25.2 wt. % in heptane) to the mixture and the mixture was then stirred for about 5 minutes at room temperature. The preparation then included adding 21.2 mg of $Ph_2C(Cp)(Flu)$zirconium dichloride to the fluorinated support at room temperature. The resulting mixture was then stirred for 3.0 hours. The resulting mixture was filtered through a glass filter funnel and washed two times with 5 mL hexane. The final solids were then dried under vacuum and slurried in mineral oil.

Catalyst D: The preparation of Catalyst D was achieved by slurrying 1.02 gram of the support B in 6 mL of toluene at ambient temperature and stirring with a magnetic stir bar. The preparation then included adding 4.01 g of TIBAl (25.2 wt. % in heptane) to the mixture and the mixture was then stirred for about 5 minutes at room temperature. The preparation then included adding 22.7 mg of iPr(3-tBu-5-Me-Cp)(Flu)zirconium dichloride to the fluorinated support at room temperature. The resulting mixture was then stirred for 1.0 hour. The resulting mixture was filtered through a glass filter funnel and washed two times with 5 mL hexane. The final solids were then dried under vacuum and slurried in mineral oil.

Catalyst E: The preparation of Catalyst E was achieved by slurrying 1.10 g of Fluorinated Support C in 6 mL of toluene and stirring with a magnetic stir bar. The preparation then included adding 4.01 g of TIBAl (25.2 wt. % in heptane) to the mixture and the mixture was then stirred for about 5 minutes at room temperature. The preparation then included adding 21.2 mg of rac-dimethylsilanylbis(2-methyl-4-phenyl-1-indenyl)zirconium dichloride to the fluorinated support at room temperature. The resulting mixture was then stirred for 1.5 hours at room temperature. The resulting mixture was filtered through a glass filter funnel and washed once with 5 mL toluene followed by washing once with 5 mL hexane. The final solids were then dried under vacuum and slurried in mineral oil.

Catalyst F: The preparation of Catalyst F was achieved by slurrying 1.02 g of Fluorinated Support D in 6 mL of toluene and stirring with a magnetic stir bar. The preparation then included adding 4.02 g of TIBAl (25.2 wt. % in heptane) to the mixture and the mixture was then stirred for about 5 minutes at room temperature. The preparation then included adding 21.5 mg of rac-dimethylsilanylbis(2-methyl-4-phenyl-1-indenyl)zirconium dichloride to the fluorinated support at room temperature. The resulting mixture was then stirred for 1.0 hour at room temperature. The resulting mixture was filtered through a glass filter funnel and washed once with 5 mL toluene followed by washing once with 5 mL hexane. The final solids were then dried under vacuum and slurried in mineral oil.

The resulting catalysts were then exposed to polymerization with olefin monomer to form the resulting polymer. The results of such polymerizations follow in Table VA.

TABLE VA (Polypropylene)

| Catalyst | Temp (° C.) | Co-Catalyst | Activity (g/g/h) | MFI (g/10 min) | $T_r$ (° C.) | $DH_r$ (J/g) | $T_m$ (° C.) | $DH_m$ (J/g) | $M_w$ | $M_w/M_n$ | $M_z/M_w$ |
|---|---|---|---|---|---|---|---|---|---|---|---|
| A | 67 | TiBAl | 1511 |  | 108.8 | 95.0 | 150.0 | 100.0 | 96747 | 3.8 | 2.0 |
| B | 67 | TiBAl | 5849 | 45.8 | 108.0 | 91.4 | 149.7 | 97.2 | 174815 | 4.7 | 2.7 |
| B | 67 | TiBAl | 6613 |  |  |  |  |  |  |  |  |
| B | 67 | TEAL | 405 |  | 109.5 | 94.2 | 149.9 | 102.0 | 119610 | 5.6 | 2.3 |
| C | 60 | TiBAl | 562 |  | 122.9 | 10.5 | n.d. |  | 127746 | 2.8 | 2.1 |
| D | 67 | TiBAl | 110 |  | 108.0 | −80.1 | 145.4 | 80.3 | 107649 | 3.5 | 2.1 |
| E | 67 | TiBAl | 64 |  | 105.3 | 74.3 | 139.7 | 66.6 | 18336 | 3.3 | 4.9 |
| F | 67 | TiBAl | 203 |  | 109.1 | 90.1 | 143.0 | 103.3 | 38372 | 5.5 | 6.0 |

Polymerization Conditions: 170 g Propylene, 14 mmoles H2, 10 mg Co-Catalyst, 30 min. n.d. = not detected, t is polymerization time in minutes, activity is expressed in gPP/gCat/hour, M is the catalyst loading in wt. %, $T_R$ is recrystallization temperature in ° C., $T_{M2}$ is the temperature of the second melt peak in ° C., HLMI is explessed in g/10 min., Catalyst E is composed of the metallocene rac-Ethylenebis(tetrahydroindenyl)ZrCl2 supported on MAO/SiO2 support.

Unexpectedly, it has been discovered that the productivity of polyolefin polymerizations can be controlled by the catalyst preparation methods described herein.

As demonstrated in the examples above, a higher activity was observed with the silica P-10 than with the silica H-121.

Examples-VI

In the following examples, samples of fluorinated metallocene catalysts were prepared according to the fourth embodiments.

As used in the examples, the first support type "SiAl(5%)" refers to silica alumina that was obtained from Fuji Sylisia Chemical LTD (Silica-Alumina 205 20 µm), such silica having a surface area of 260 m²/g, a pore volume of 1.30 mL/g, an aluminum content of 4.8 wt. %, an average particle size of 20.5 µm, a pH of 6.5 and a 0.2% loss on drying.

As used in the examples, the second support type "Silica P-10" refers to silica that was obtained from Fuji Sylisia Chemical LTD (grade: Cariact P-10, 20 µm), such silica having a surface area of 281 m²/g, a pore volume of 1.41 mL/g, an average particle size of 20.5 µm and a pH of 6.3.

As used in the examples, "$(NH_4)_2SiF_6$" refers to ammonium hexafluorosilicate that was obtained from Aldrich Chemical Company.

As used in the examples, "DEAF" refers to diethylaluminum fluoride (26.9 wt. % in heptane) that was obtained from Akzo Nobel Polymer Chemicals, L.L.C.

As used in the examples, "TIBAL" refers to triisobutyl aluminum (25 wt. % in heptane) that was obtained from Akzo Nobel.

As used in the examples, metallocene type "A" refers to rac-dimethylsilanylbis(2-methyl-4-phenyl-1-indenyl)zirconium dichloride.

As used in the examples, metallocene type "B" refers to diphenylmethylidene(cyclopentadienyl)(9-fluorenyl)zirconium dichloride.

As used in the examples, metallocene type "C" refers to rac-dimethylsilanylbis(2-methyl-4,5-benzo-1 indenyl)zirconium dichloride Example 1

The first preparation of fluorinated metallocene catalyst (Type #1) included a first support material including an alumina-silica (SiAl(5%)) prepared in a tube furnace with 6 wt. % $(NH_4)_2SiF_6$ at 450° C. under nitrogen. The second preparation of fluorinated metallocene catalyst (Type #2) included a second support material including alumina silica prepared by reaction of Silica P-10 with DEAF.

The support materials were slurried in mineral oil and treated with 1 equivalent of TIBAL.

The metallocene compound was prepared in a solution of hexane and treated with 2 equivalents of TIBAL.

The fluorinated metallocene catalysts were prepared by mixing the prepared metallocene compound and the support material slurry in a vessel at room temperature for a precontact time.

Figure 3:
FIG. 3 illustrates an optical microscopy of polymer fluff produced from embodiments of the invention.
Figure 4:
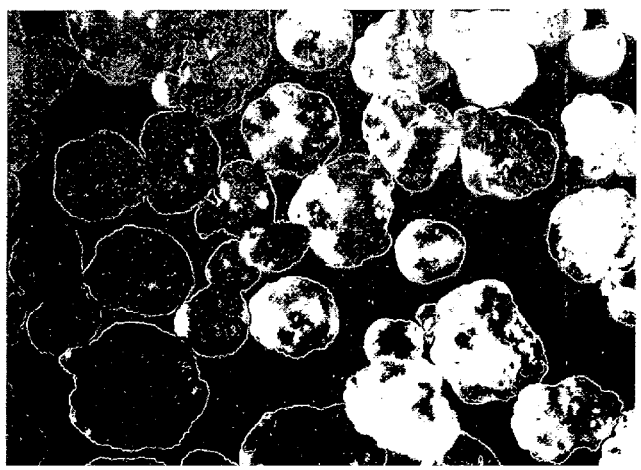
FIG. 4 illustrates an optical microscopy of polymer fluff produced from MAO based catalyst systems.

The prepared fluorinated metallocene catalysts were then exposed to polymerization in 6× parallel reactors with propylene monomer (170 g) at 67° C. over 30 minutes to form the resulting polypropylene. The results of such polymerizations follow in Tables VIA (activity) and VIB (polymer properties) and in FIGS. 3 and 4 (comp. MAO system.)

TABLE VIA

| Run | Prep. Type No. | Met. Type | Co-Catalyst | Pre-contact Time (min) | Activity (g/g/h) | Tacticity (% mmmm) | Tacticity (% rrrr) |
|---|---|---|---|---|---|---|---|
| 1 | 1 | A | TIBAL | 0 | 267 |  |  |
| 2 | 1 | A | TIBAL | 30 | 2900 |  |  |
| 3 | 2 | A | TIBAL | 35 | 4967 | 97.9 | 0.0 |
| 4 | 2 | A | TEAL | 30 | 6143 |  |  |
| 5 | 2 | B | TIBAL | 30 | 2620 | 0.3 | 68.6 |
| 6 | 1 | C | N/A | 30 | 3321 |  |  |

Poly. Cond.: polypropylene 170 g, hydrogen 14 mmol, catalyst 30 mg, catalyst support/TIBAL ½, polym temp. 67° C., polym. time 30 min; Tc is crystallization temperature, Tm is melting point

TABLE VIB

| # | Tc (° C.) | ΔHc (J/g) | Tm (° C.) | ΔHm (J/g) | Mn | Mw | Mz | Mw/Mn | Peak Mw | Mz/Mw |
|---|---|---|---|---|---|---|---|---|---|---|
| 1 | 107.63 | 86.01 | 147.87 | 87.77 | 21571 | 106771 | 255439 | 4.9 | 107380 | 2.4 |
| 2 | 106.47 | 93.3 | 149.37 | 102.55 | 26926 | 121119 | 329054 | 4.7 | — | 2.7 |
| 3 | 105.97 | −90.77 | 149.7 | 90.27 | 44563 | 189440 | 406144 | 4.3 | 158431 | 2.1 |
| 5 | — | — | N/A | — | 59384 | 155947 | 319497 | 2.6 | 2.1 | 2.0 |
| 6 | 87.47 | −69.93 | 128.9 | 75.82 | 3082 | 110039 | 235125 | 3.2 | 106832 | 2.1 |

It was observed that increasing the pre-contact time resulted in increased catalyst activity. In addition, no reactor fouling was experienced.

Example 2

Fluorinated metallocene catalysts were prepared in-situ via the methods used in Example 1. The first type of fluorinated metallocene catalyst (see, example 1) was prepared with a support material to TIBAL weight ratio of 1:0.5 with 2 wt. % of "A" metallocene. The second type of fluorinated metallocene differed from Type 1 in that the support material to TIBAL weight ratio was 1:1 and the metallocene used was 1 wt. %. The third type of fluorinated metallocene differed from Type 2 in that the support material to TIBAL weight ratio was 1:2.

In addition, two samples of standard catalysts were prepared for comparison. The standard catalysts were prepared by mixing the first support with TIBAL in a toluene/heptane slurry. The first metallocene was then added at ambient temperature. The resulting mixture was stirred for 1 hour and then filtered. The solids were washed with hexane and dried under vacuum. The dried solids were then slurried in mineral oil.

The resulting metallocene catalysts were exposed to propylene polymerizations as in Example 1. The results of such polymerizations follow in Table VIC.

TABLE VIC

| Run | Type No. | Precontact Time | Activity (g/g/h) | MFI (g/10 min) |
|---|---|---|---|---|
| 1 | 1 | 30 min | 3896 | — |
| 2 | 1 | 24 hrs | 2884 | 10.4 |
| 3 | 1 | 48 hrs | 5466 | — |
| 4 | 1 | 72 hrs | 4994 | — |
| 5 | 2 | 30 min | 6019 | — |
| 6 | 2 | 24 hrs | 5861 | 1.6 |
| 7 | 2 | 48 hrs | 4672 | — |
| 8 | 2-std | — | 3764 | — |
| 9 | 3 | 30 min | 5734 | — |
| 10 | 3 | 24 hrs | 4688 | — |
| 11 | 3 | 48 hrs | 2341 | — |
| 12 | 3 | 144 hrs | 2658 | — |
| 13 | 3-std | — | 4015 | — |

Poly. Cond.: 170 g polypropylene, 30 mg. catalyst, 83 ppm H2, poly temp. 67° C., poly time 30 min., The standard MAO systems further include 10 mg TIBAL cocatalyst, precontact time is at 20° C.

The above results illustrate that the optimal pre-contact time varied depending on the specific catalyst used. Therefore, embodiments of the invention (in-situ prep) provide the ability to set specific precontact times based on desired transition metal compounds. It was further observed that the in-situ preparation methods provided higher catalyst activity than the standard preparation.

Example 3

Catalysts (using the first catalyst compound and the first support in a ratio of support to TIBAL of 1:1) were prepared in-situ via the methods used in Example 1 and exposed to propylene polymerization. However the amount of catalyst was varied by sample. The polymerization results follow in Table VID.

TABLE VID

| Run | precontact time (@20° C.) | $H_2$ (ppm) | Cat amount (mg) | Activity (g/g/hr) |
|---|---|---|---|---|
| 1 | 30 min | 83 | 30 | 6019 |
| 2 | 30 min | 83 | 20 | 7459 |
| 3 | 30 min | 119 | 20 | 8292 |

Poly cond.: 170 g propylene, poly temp. 67° C., poly time 30 min

It was observed that the catalyst activity increased at higher catalyst and hydrogen concentrations.

Example 4

Catalysts were prepared in-situ via the methods used in Example 1 and exposed to propylene/ethylene copolymerization. In comparative experiments 3 and 4, type "A" metallocene was supported on MAO/SiO$_2$ support. The amount of ethylene was varied in each run. The polymerization results follow in Table VIE.

TABLE VIE

| Run | Supp Type | Cat Type | Cat. (mg) | $H_2$ (mmol) | $C_2$, wt. % in feed | Activity (g/g/h) | Tm (° C.) | MF |
|---|---|---|---|---|---|---|---|---|
| 1 | 1 | A | 20 | 10 | 2 | 11900 | 141.4 | 13.0 |
| 2 | 1 | A | 10 | 10 | 3 | 17000 | — | 17 |
| 3 | 2 | A | 10 | 10 | 2 | 8400 | — | 66.9 |
| 4 | 2 | A | 10 | 10 | 3 | 8200 | — | 61.7 |
| 5 | 1 | A + B | 30 | 10 | 2 | 6600 | 141.4 | 5.4 |
| 6 | 1 | C | 20 | 10 | 2 | 4300 | — | 150 |

Poly cond.: propylene 170 g, poly temp 67° C., poly time 30 min

Unexpectedly, no fouling was observed during the polymerizations while maintaining sufficient activity.

Examples-VII

In the following examples, samples of fluorinated metallocene catalysts were prepared.

The prepared fluorinated metallocene catalysts were then exposed to polymerization in 6× parallel reactors with propylene monomer at 67° C. over 30 minutes to form the resulting polypropylene. The results of such polymerizations follow in Table VIIA.

TABLE VIIA

| Run | Support Type | Activity (g/g/h) | $T_{recryst}$ (° C.) | $\Delta H_{rec}$ (J/g) | $T_m$ (° C.) | $\Delta H_{2nd}$ $T_m$(J/g) | Mw | Mw/Mn | Mz/Mw |
|---|---|---|---|---|---|---|---|---|---|
| 1 | MAO/SiO$_2$ P10 | 10,786 | 107.6 | −90.9 | 149.0 | 72.1 | 200,199 | 5.2 | 3.3 |
| 2 | 1 | 200 | 108.5 | 91.1 | 147.7 | 99.45 | 96,239 | 7.2 | 2.8 |
| 3 | 2 | 1,334 | 107.9 | 94.24 | 148.7 | 104.6 | 105,258 | 5.2 | 2.3 |
| 4 | 3 | 472 | 108.8 | −87.3 | 146.7 | 87.5 | 76,055 | 5.9 | 2.6 |
| 5 | 4 | 108 | 105.3 | −76.1 | 140.4 | 75.4$^a$ | 47,833 | 5.2 | 3.2 |

170 g propylene, 14 mmoles H$_2$, 10 mg TEAL co-catalyst
$^a$A second melt was observed at 146.9° C.

As used in the examples, the first support type "SiAl(5%)" refers to silica alumina that was obtained from Fuji Silysia Chemical LTD (Silica-Alumina 205 20 μm), such silica having a surface area of 260 m$^2$/g, a pore volume of 1.30 mL/g, an aluminum content of 4.8 wt. %, an average particle size of 20.5 μm, a pH of 6.5 and a 0.2% loss on drying.

As used in the examples, the second support type "Silica P-10" refers to silica that was obtained from Fuji Silysia Chemical LTD (grade: Cariact P-10, 20 μm), such silica having a surface area of 296 m$^2$/g, a pore volume of 1.41 mL/g, an average particle size of 20.5 μm and a pH of 6.3.

As used in the examples, the fluorinating agent refers to ammonium hexafluorosilicate (($NH_4$)$_2$$SiF_6$) that was obtained from Aldrich Chemical Company.

As used in the examples, "DEAF" refers to diethylaluminum fluoride (26.9 wt. % in heptane) that was obtained from Akzo Nobel Polymer Chemicals, L.L.C.

As used in the examples, "TIBAL" refers to triisobutyl aluminum (25 wt. % in heptane) that was obtained from Akzo Nobel Polymer Chemicals, L.L.C.

Example 1

The first type of fluorinated metallocene catalyst (Type #1) included rac-dimethylsilanlbis(2-methyl-4-phenyl-1-indenyl)zirconium dichloride supported on a first support material including an alumina-silica (SiAl(5%)) prepared with 3 wt. % fluorinating agent. The second type of fluorinated metallocene catalyst (Type #2) differs from Type #1 in that it was prepared with 6 wt. % fluorinating agent while the third type (Type #3) was prepared with 10 wt. % fluorinating agent. The fourth type of fluorinated metallocene catalyst (Type #4) included a second support material including an alumina-silica (SiAl(1%)) prepared with 6 wt. % fluorinating agent.

While runs 2-5 produced polymers having lower molecular weights than that of the comparison polymer (run 1), it was observed that variations of the fluoride to alumina ratios show an effect on both the melting point and the molecular weight of the polymers produced.

Example 2

The effect of different co-catalysts on the second type of fluorinated metallocene catalyst used in Example 1 above was observed. The catalyst was exposed to polymerization in a 6× parallel reactor with propylene monomer at 67° C. over 30 minutes to form the resulting polypropylene. The results of such polymerizations follow in Table VIIB.

TABLE VIIB

| Run | Co-Catalyst | Activity (g/g/h) | $T_{recryst}$ (° C.) | $\Delta H_{rec}$ (J/g) | $T_m$ (° C.) | $\Delta H_{2nd}$ $T_m$(J/g) | Mw | Mw/Mn | Mz/Mw |
|---|---|---|---|---|---|---|---|---|---|
| 1 | TEAl | 1,334 | 108.0 | 94.2 | 148.7 | 104.6 | 105,258 | 5.2 | 2.3 |
| 2 | TIBAl | 5,272 | 107.1 | 91.5 | 149.4 | 96.1 | 200,708 | 4.8 | 2.6 |
| 3 | TEAl | 255 | 108.8 | 93.0 | 147.9 | 102.9 | 106,002 | 5.7 | 2.5 |
| 4 | TIBAl | 1,972 | 109.3 | 93.9 | 150.2 | 102.9 | 126,714 | 4.6 | 2.2 |
| 5 | IPA | 708 | 110.6 | 93.1 | 149.7 | 103.4 | 148,002 | 5.9 | 2.7 |

170 g propylene, 14 mmoles H$_2$, 10 mg co-catalyst

It was observed that use of TIBAl rather than TEAl resulted in increased activity and Mw. Generally, the melting point ($T_m$) was not affected by the type of co-catalyst.

Example 3

The effect of contacting the support material (Type #2) with different second aluminum containing compounds was observed. The catalyst was then exposed to polymerization in a 6× parallel reactor with propylene monomer at 67° C. over 30 minutes to form the resulting polypropylene. Runs 1 and 2 utilized a 1:1 catalyst to Al$^2$ ratio, while runs 3 and 4 utilized a 1:0.5 catalyst to Al$^2$ ratio. The results of such polymerizations follow in Table VIIC.

TABLE VIIC

| Run | $Al^2$ | Activity (g/g/h) | $T_{recryst}$ (°C.) | $\Delta H_{rec}$ (J/g) | $T_m$ (°C.) | $\Delta H_{2nd}$ $T_m$(J/g) | Mw | Mw/Mn | Mz/Mw |
|---|---|---|---|---|---|---|---|---|---|
| 1 | TIBAl | 5,272 | 107.1 | 91.5 | 149.4 | 96.1  | 200,708 | 4.8 | 2.6 |
| 2 | TIBAl | 3,127 | 108.3 | 92.4 | 150.2 | 105.3 | 210,975 | 5.6 | 2.6 |
| 3 | TIBAl | 1,069 | 109.5 | 91.1 | 150.0 | 100.8 | 134,190 | 5.2 | 2.2 |
| 4 | MAO   | 1,544 | 108.6 | 92.9 | 149.2 | 103.1 | 151,747 | 8.1 | 2.6 |

170 g propylene, 14 mmoles $H_2$, 10 mg TIBAl co-catalyst

Figure 5:
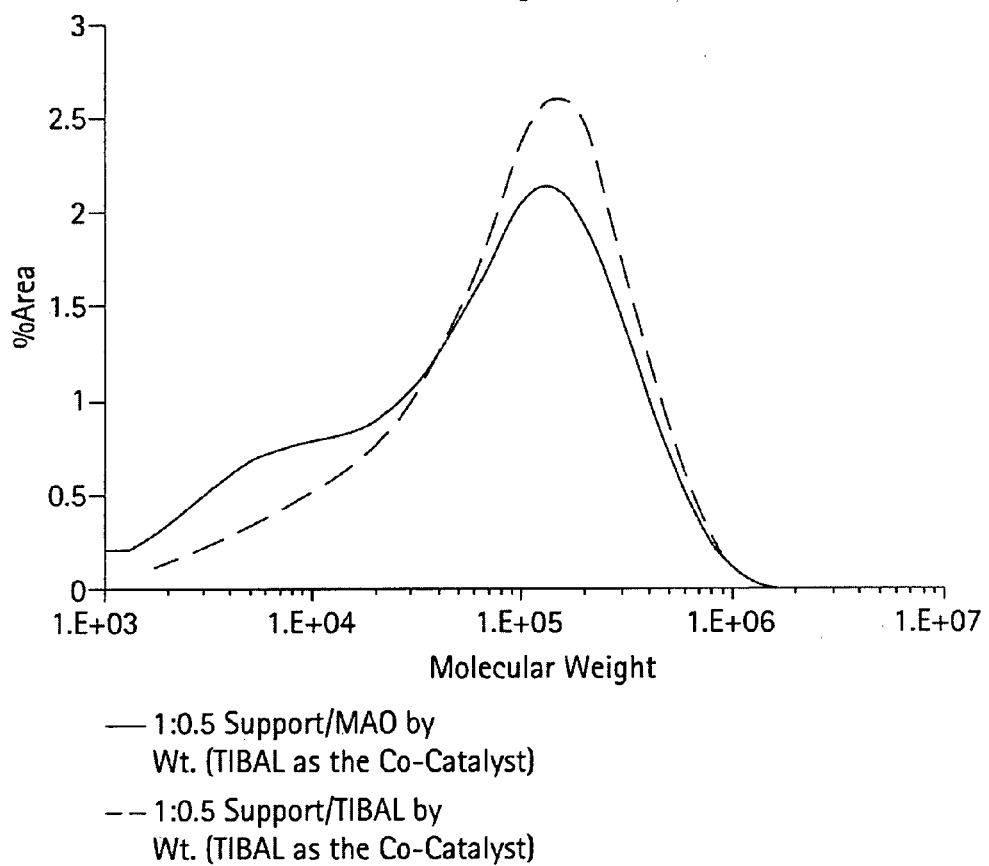
FIG. 5 illustrates a GPC plot of molecular weight distribution for different second aluminum containing compounds.

It was observed that use of MAO rather than TIBAl as the second aluminum containing compound resulted in decreased Mw with an increase in molecular weight distribution (Mw/Mn). Further, bimodal molecular weight distributions were observed. (See, FIG. 5.) Generally, the melting point ($T_m$) was not affected by the type of second aluminum containing compound.

Examples-VIII

In the following examples, samples of copolymers were prepared.

As used in the examples, metallocene type "M1" refers to rac-dimethylsilanylbis(2-methyl-4-phenyl-1-indenyl)zirconium dichloride.

As used in the examples, metallocene type "M2" refers to rac-dimethylsilanylbis(2-methyl-4,5-benzo-1-indenyl)zirconium dichloride.

As used in the examples, metallocene type "M3" refers to diphenylmethylidene(cyclopentadienyl)(9-fluorenyl)zirconium dichloride.

As used in the examples, silica alumina refers to silica alumina that was obtained from Fuji Sylisia Chemical LTD (Silica-Alumina 205 20 μm), such silica having a surface area of 260 $m^2$/g, a pore volume of 1.30 mL/g, an aluminum content of 4.8 wt. %, an average particle size of 20.5 μm and a pH of 6.5.

As used in the examples, Support Type B refers to silica obtained from Fuji Sylisia Chemical LTD (grade: Cariact P-10, 20 μm), such silica having a surface area of 281 $m^2$/g, a pore volume of 1.41 mL/g, an average particle size of 20.5 μm and a pH of 6.3, which was treated with methyl alumoxane (0.7 g per 1 g of silica).

As used in the examples, Support Type A1 was prepared by dry mixing silica alumina with 6 wt. % $(NH_4)_2SiF_6$ and then transferring the mixture into a quartz tube having a glass-fritted disc. The quartz tube was then inserted into a tube furnace and equipped with an inverted glass fritted funnel on the top opening of the tube. The mixture was then fluidized with nitrogen (0.4 SLPM). Upon fluidization, the tube was heated from room temperature to an average reaction temperature of 450° C. over a period of 6 hours.

As used in the examples, Support Type A2 was prepared by mixing silica alumina with 6 wt. % $NH_4F.HF$ in water, drying in a rotavap and then transferring the mixture into a muffle furnace. The muffle furnace was then heated from room temperature to an average reaction temperature of 400° C. over a period of 3 hours.

As used in the examples, Support Type A3 was prepared by mixing silica alumina with 8 wt. % $NH_4F.HF$, drying in a rotavap and then transferring the mixture into a muffle furnace. The muffle furnace was then heated from room temperature to an average reaction temperature of 400° C. over a period of 3 hours.

The preparations of the supported catalyst systems were achieved by mixing a support material (A1, A2, A3 or B) with from 5 to 10 mg of one or more metallocene compounds (M1, M2 and/or M3) and from 2 to 4 g of triisobutyl aluminum (25% solution in hexane) for 30 min at room temperature. The preparation then included adding 4 g. of mineral oil to the mixture to form a catalyst slurry.

Ethylene/Propylene Polymerizations: Each catalyst slurry was then contacted with ethylene and/or propylene monomer to form polymer. The polymerization conditions and results of each polymerization follow in Tables VIIIA and VIIIB.

TABLE VIIIA

| Run # | Support Type | Metallocene Type | Cat. (mg) | Cocat/Cat wt. ratio | Ethylene (wt. % in feed) | $H_2$ (ppm) | Activity (g/g/h) | MFI (g/10 min.) |
|---|---|---|---|---|---|---|---|---|
| 1 | A1 | M1 | 19.7 | NA | 0 | 119 | 8292 | 4.0 |
| 2 | A1 | M1 | 20.1 | NA | 2 | 119 | 11934 | 4.4 |
| 3 | A1 | M1 | 9.9 | NA | 2 | 116 | 8348 | 95.0 |
| 4 | A1 | M1 | 10.0 | NA | 3 | 115 | 16903 | 17.0 |
| 5 | A1 | M1 | 9.9 | NA | 5 | 113 | 34378 | 8.9 |
| 6 (comp) | B | M1 | 10.2 | 0.49 | 2 | 116 | 8392 | 66.9 |
| 7 (comp) | B | M1 | 9.9 | 0.5 | 3 | 115 | 8192 | 61.7 |
| 8 (comp) | B | M1 | 10.0 | 0.5 | 5 | 113 | 8025 | 61.4 |
| 9 | A2 | M1 | 20.1 | NA | 0 | 119 | 7409 | 16.0 |
| 10 | A1 | M1 | 10.2 | NA | 0 | 119 | 6664 | 9.1 |
| 11 | A2 | M1 | 7.0 | NA | 0 | 59 | 5735 | 1.6 |
| 12 | A2 | M1 | 7.1 | NA | 2 | 58 | 10632 | 4.6 |
| 13 | A2 | M1 | 7.0 | NA | 3 | 58 | 12350 | 4.2 |
| 14 | A1 | M2 | 20 | NA | 0 | 10 | 3321 | FAST |
| 15 | A1 | M2 | 20 | NA | 2 | 10 | 4274 | >150 |
| 16 | A2 | M1 + M3 | NR | NA | 0 | 119 | 4751 | 13.0 |
| 17 | A2 | M1 + M3 | NR | NA | 2 | 119 | 6607 | 5.4 |
| 18 | A2 | M1 | 10 | NA | 0 | 42 | 10396 | 16.5 |
| 19 | A2 | M1 | 10 | NA | 1 | 42 | 15173 | 7.3 |
| 20 | A2 | M1 | 10 | NA | 2 | 42 | 17460 | 6.2 |

TABLE VIIIA-continued

| Run # | Support Type | Metallocene Type | Cat. (mg) | Cocat/Cat wt. ratio | Ethylene (wt. % in feed) | H$_2$ (ppm) | Activity (g/g/h) | MFI (g/10 min.) |
|---|---|---|---|---|---|---|---|---|
| 21 | A3 | M1 | 10 | NA | 0 | 10 mmol | 10320 | 17 |
| 22 | A3 | M1 | 7 | NA | 2 | 10 mmol | 18888 | 18 |
| 23 | A3 | M1 | 7 | NA | 5 | 10 mmol | 38028 | 7 |

*MFI refers to melt flow index and is measured via ASTM-D-1238-E, Runs 1-17, 21-23 in 6X parallel reactor. Runs 18-20 in 2L reactor, Runs 1-17, 21-23 170 g. propylene, Runs 18-20 700 g propylene), 67° C., Runs 1-22 over 30 minutes, Run 23 over 20 minutes)

TABLE VIIIB

| Run # | T$_r$ (° C.) | ΔH$_r$ (J/g) | T$_m$ (° C.) | ΔH$_m$ (J/g) | Mw | Mw/Mn | Mz/Mw |
|---|---|---|---|---|---|---|---|
| 1 | 108.5 | 97.0 | 150.1 | 102.2 | 394172 | 8.1 | 3.4 |
| 2 | 99.2 | 83.9 | 141.3 | 94.4 | 488946 | 8.6 | 2.8 |
| 3 | 98.3 | 81.6 | 140.0 | 81.8 | NR | NR | NR |
| 4 | 93.3 | 75.4 | 135.5 | 75.3 | NR | NR | NR |
| 5 | 83.5 | 59.6 | 127.9 | 58.5 | NR | NR | NR |
| 6 | 99.0 | 78.0 | 140.2 | 79.3 | NR | NR | NR |
| 7 | 94.3 | 72.4 | 135.9 | 75.5 | NR | NR | NR |
| 8 | 83.8 | 61.1 | 131.0 | 59.6 | NR | NR | NR |
| 9 | 106.0 | 91.0 | 150.2 | 98.5 | 230521 | 4.8 | 2.3 |
| 10 | NR | NR | NR | NR | NR | NR | NR |
| 11 | NR | NR | NR | NR | NR | NR | NR |
| 12 | NR | NR | NR | NR | NR | NR | NR |
| 13 | NR | NR | NR | NR | NR | NR | NR |
| 14 | NR | NR | NR | NR | NR | NR | NR |
| 15 | NR | NR | NR | NR | NR | NR | NR |
| 16 | 108.3 | 83.2 | 150.3 | 93.0 | 276433 | 5.5 | 2.4 |
| 17 | 99.9 | 77.9 | 141.4 | 88.4 | 420871 | 6.3 | 3.5 |
| 18 | 107.6 | 95.4 | 151.5 | 116.8 | NR | NR | NR |
| 19 | 101.1 | 90.1 | 143.4 | 113.7 | NR | NR | NR |
| 20 | 95.0 | 76.7 | 136.7 | 93.7 | NR | NR | NR |
| 21 | 109.2 | 94.6 | 150.7 | 111.3 | NR | NR | NR |
| 22 | 99.6 | 84.3 | 140.6 | 104.1 | NR | NR | NR |
| 23 | 83.9 | 64.2 | 125.1 | 90.8 | NR | NR | NR |

*Tr refers to recrystallization temperature, ΔHr refers to heat of recrystallization, Tm refers to melting point, ΔHm refers to heat of melt, Mw refers to weight average molecular weight, Mn refers to number average molecular weight and Mz refers to z average molecular weight, NR means not recorded, NA means not applicable Unexpectedly, it was observed that the activity of the Fl-Al—Si supported catalyst systems increased with an increasing ethylene content (in contrast to an essentially unchanged activity with the MAO based systems). In addition, a decrease in the polymer melt flow was observed with the Fl-Al—Si supported catalyst systems. Further, a slight increase in the polymer ethylene incorporation was observed with the Fl-Al—Si supported catalyst systems over the MAO based systems.

Propylene/1-Hexene Polymerizations: Each catalyst slurry was then contacted with propylene and/or 1-hexene monomer to form polymer. The polymerization conditions and results of each polymerization follow in Tables VIIIC and VIIID.

TABLE VIIIC

| Run # | Support Type | Metallocene Type | Cat. (mg) | Cocat/Cat wt. ratio | 1-Hexene (wt. % in feed) | H$_2$ (ppm) | Activity (g/g/h) | MFI (g/10 min.) |
|---|---|---|---|---|---|---|---|---|
| 24 | A3 | M1 | 10(1 wt. %) | | 0 | 10 mmol | 11634 | 6.6 |
| 25 | A3 | M1 | 10(1 wt. %) | | 0 | 10 mmol | 10320 | 17.1 |
| 26 | A3 | M1 | 10(1 wt. %) | | 2 | 10 mmol | 8782 | |
| 27 | A3 | M1 | 10(1 wt. %) | | 3 | 10 mmol | 5595 | 19.9 |
| 28 | A3 | M1 | 10(1 wt. %) | | 4 | 10 mmol | 4704 | 34.9 |

*MFI refers to melt flow index and is measured via ASTM-D-1238-E, 6X parallel reactor, 170 g. propylene, 67° C., 30 minutes, TIBAL:Support = 1:1 by wt.

TABLE VIIID

| Run | T$_r$ (° C.) | ΔH$_r$ (J/g) | T$_m$ (° C.) | ΔH$_m$ (J/g) | Mw | Mw/Mn | Mz/Mw |
|---|---|---|---|---|---|---|---|
| 24 | 107.8 | 94.4 | 150.9 | 114.1 | 313277 | 3.5 | 2.2 |
| 25 | 109.2 | 94.6 | 150.7 | 111.3 | 207249 | 4.6 | 2.1 |
| 26 | 98.6 | 82.5 | 138.4 | 94.9 | 212221 | 3.7 | 2.0 |
| 27 | 94.9 | 82.1 | 135.6 | 107.0 | 181861 | 3.8 | 2.0 |
| 28 | 90.2 | 76.6 | 130.7 | 100.2 | 161261 | 3.3 | 1.9 |

*Tr refers to recrystallization temperature, ΔHr refers to heat of recrystallization, Tm refers to melting point, ΔHm refers to heat of melt, Mw refers to weight average molecular weight, Mn refers to number average molecular weight and Mz refers to z average molecular weight, NR means not recorded, NA means not applicable A decrease in the activity of the Fl-Al—Si supported catalyst systems was observed with an increasing 1-hexene content. In addition, an increase in the polymer melt flow was observed with an increasing 1-hexene content.

Propylene/Ethylene/1-Hexene Polymerizations: Each catalyst slurry was then contacted with propylene, ethylene and/or 1-hexene monomer to form polymer. The polymerization conditions and results of each polymerization follow in Tables VIIIE and VIIIF.

TABLE VIIIE

| Run # | Support Type | Metallocene Type | Cat. (mg) | Ethylene (wt. % in feed) | 1-Hexene (wt. % in feed) | $H_2$ (mmol) | Activity (g/g/h) | MFI (g/10 min.) |
|---|---|---|---|---|---|---|---|---|
| 29 | A3 | M1 | 10(1 wt. %) | 0 | 0 | 10 | 10320 | 17.1 |
| 30 | A3 | M1 | 10(1 wt. %) | 0 | 3 | 10 | 5595 | 19.9 |
| 31 | A3 | M1 | 10(1 wt. %) | 0 | 4 | 10 | 4704 | 34.9 |
| 32 | A3 | M1 | 10(1 wt. %) | 1 | 3 | 10 | 16334 | 31 |
| 33 | A3 | M1 | 10(1 wt. %) | 1 | 5 | 10 | 16888 | 17 |
| 34 | A3 | M1 | 10(1 wt. %) | 2 | 3 | 10 | 5974 | 33.3 |
| 35 | A3 | M1 | 10(1 wt. %) | 2 | 5 | 10 | 20210 | 26 |
| 36 | A3 | M1 | 10(1 wt. %) | 3 | 3 | 10 | 9136 | 17 |
| 37 | A3 | M1 | 10(1 wt. %) | 3 | 5 | 10 | 16183 | 27 |

*MFI refers to melt flow index and is measured via ASTM-D-1238-E, 6X parallel reactor, 170 g. propylene, 67° C., 30 minutes, TIBAL:Support = 1:1 by wt.

TABLE VIIIF

| Run # | $T_r$ (° C.) | $\Delta H_r$ (J/g) | $T_m$ (° C.) | $\Delta H_m$ (J/g) | Mw | Mw/Mn | Mz/Mw |
|---|---|---|---|---|---|---|---|
| 29 | 109.2 | 94.6 | 150.7 | 111.3 | 207249 | 4.6 | 2.1 |
| 30 | 94.9 | 82.1 | 135.6 | 107.0 | 181861 | 3.8 | 2.0 |
| 31 | 90.2 | 76.6 | 130.7 | 100.2 | 161261 | 3.3 | 1.9 |
| 32 | 88.0 | −68.1 | 134.3 | 66.6 | 201567 | 3.7 | 2.0 |
| 33 | 74.8 | −62.9 | 123.7 | 60.4 | 187627 | 3 | 1.9 |
| 34 | 84.5 | 73.5 | 126.7 | 88.0 | 160585 | 3.5 | 2.0 |
| 35 | 73.5 | −55.7 | 120.7 | 62.3 | 176025 | 3.1 | 1.9 |
| 36 | 76.5 | −64.2 | 122.0 | 58.1 | 194615 | 3.2 | 2.0 |
| 37 | 73.8 | −55.0 | 118.0 | 60.6 | 162713 | 2.9 | 1.9 |

*Tr refers to recrystallization temperature, ΔHr refers to heat of recrystallization, Tm refers to melting point, ΔHm refers to heat of melt, Mw refers to weight average molecular weight, Mn refers to number average molecular weight and Mz refers to z average molecular weight, NR means not recorded, NA means not applicable A decrease in the polymer melt flow was observed with and increase in the 1-hexene content and/or the ethylene content.

Propylene/Ethylene/Styrene Polymerizations: Each catalyst slurry was then contacted with propylene, ethylene and/or strene monomer to form polymer. The polymerization conditions and results of each polymerization follow in Tables VIIIG and VIIIH.

TABLE VIIIG

| Run # | Support Type | Metallocene Type | Cat. (mg) | Ethylene (wt. % in feed) | Styrene (wt. % in feed) | $H_2$ (mmol) | Activity (g/g/h) |
|---|---|---|---|---|---|---|---|
| 38 | A3 | M1 | 10 | 0 | 0 | 10 | 4110 |
| 39 | A3 | M1 | 10 | 0 | 1.9 | 10 | 1063 |
| 40 | A3 | M1 | 10 | 1.0 | 2.0 | 10 | 992 |

*MFI refers to melt flow index and is measured via ASTM-D-1238-E, 2L reactor, 360 g. propylene, 67° C., 30 minutes

TABLE VIIIH

| Run # | $T_r$ (° C.) | $\Delta H_r$ (J/g) | $T_m$ (° C.) | $\Delta H_m$ (J/g) | Mw | Mw/Mn |
|---|---|---|---|---|---|---|
| 38 | 108.3 | 97.8 | 149.8 | 115.9 | 482449 | 6.5 |
| 39 | 112.3 | 106.8 | 143.8 | 116.7 | 10663 | 1.9 |
| 40 | 108.3 | 105.5 | 139.8 | 116.5 | 11715 | 1.9 |

*Tr refers to recrystallization temperature, ΔHr refers to heat of recrystallization, Tm refers to melting point, ΔHm refers to heat of melt, Mw refers to weight average molecular weight, Mn refers to number average molecular weight and Mz refers to z average molecular weight, NR means not recorded, NA means not applicable Examples IX As used in the examples, the second support type "Silica P-10" refers to silica that was obtained from Fuji Sylisia Chemical LTD (grade: Cariact P-10, 20 μm), such silica having a surface area of 281 m²/g, a pore volume of 1.41 mL/g, an average particle size of 20.5 μm and a pH of 6.3. Unmodified P-10 silica is referred to herein as Support Type "A".

Support Type "B" as used herein is unmodified $Al_2O_3$.

Support Type "C" refers to alumina-silica that was obtained from Fuji Sylisia Chemical LTD, such silica including 4.8 wt. % $Al_2O_3$ and having a surface area of 260 m²/g, a pore volume of 1.3 mL/g, an average particle size of 20.5 μm and a pH of 6.5.

Support Type "D" refers to alumina-silica that was obtained from Fuji Sylisia Chemical LTD, such silica including 4.7 wt. % $Al_2O_3$ and having a surface area of 261 $m^2$/g, a pore volume of 1.12 mL/g, an average particle size of 20.29 μm and a pH of 5.9.

Support Type "E" refers to alumina-silica that was obtained from Fuji Sylisia Chemical LTD, such silica including 5.3 wt. % $Al_2O_3$ and having a surface area of 213 $m^2$/g, a pore volume of 1.24 mL/g, an average particle size of 21.13 μm and a pH of 7.8.

Support Type "F" refers to alumina-silica that was obtained from Fuji Sylisia Chemical LTD, such silica including 7.5 wt. % $Al_2O_3$ and having a surface area of 253 $m^2$/g, a pore volume of 1.16 mL/g, an average particle size of 20.4 μm and a pH of 8.6.

Support Type "G" refers to alumina-silica that was obtained from Fuji Sylisia Chemical LTD, such silica including 7.7 wt. % $Al_2O_3$ and having a surface area of 396 $m^2$/g, a pore volume of 1.11 mL/g, an average particle size of 31.7 μm and a pH of 8.8.

Support Type "H" refers to alumina-silica that was obtained from Fuji Sylisia Chemical LTD, such silica including 7.5 wt. % $Al_2O_3$ and having a surface area of 418 $m^2$/g, a pore volume of 1.16 mL/g, an average particle size of 31.7 μm and a pH of 8.3.

Support Type "I" refers to alumina-silica that was obtained from Fuji Sylisia Chemical LTD, such silica including 1.3 wt. % $Al_2O_3$ and having a surface area of 264 $m^2$/g, a pore volume of 1.3 mL/g, an average particle size of 21.7 μm and a pH of 6.7.

Support Type "J" refers to alumina-silica that was obtained from Grace Davison, such silica including 13 wt. % $Al_2O_3$ and having a surface area of 400 $m^2$/g, a pore volume of 1.2 mL/g, an average particle size of 76 μm.

Fluorinated alumina-silica supports were prepared by adding 10.0 g of the corresponding alumina-silica to a 250 mL round bottom flask including 31.4 mL of water at ambient temperature. The preparation further included dissolving 1.0 g of $NH_4F.HF$ in 8.6 mL of water and adding the solution to the round bottom flask. The resulting slurry was mixed by shaking the flask for about 2 minutes. The remaining water was then removed under vacuum (30 in. Hg) at 90° C.

The resulting white free flowing solids were placed in a small glass dish and heated in a muffle furnace at 400° C. for 3 hours. The hot solids were poured into a hot 250 mL, 1-neck, shlenk round bottom flask. The flask was then capped with a rubber septum and placed under vacuum for about 15 to 20 minutes. The flask was then stored under nitrogen.

Example 1

First, indication of metallocene activation was tested by slurrying each support material in toluene. The preparation of supported catalyst systems was then achieved by mixing a support material with rac-dimethylsilanylbis(2-methyl-4-phenyl-1-indenyl)zirconium dichloride, shaken and leaving the resulting solid to settle. The resulting solids were then checked for color. The active species (solid) is generally dark red. The results of such tests are illustrated in Table IXA below.

TABLE IXA

| Run # | Support Type | Type of Counter Ion of support | pH of support | Fluorination process | Color of Supported Metallocene* |
|---|---|---|---|---|---|
| 1 | Unsupported | | | | Yellow |
| 2 | A | H | 6.3 | | Yellow |
| 3 | A | H | 6.3 | 6% of F-Agent, F1-method | Yellow |
| 4 | B | | | | Yellow |
| 5 | B | | | 6% of F-Agent, F1-method | Yellow |
| 6 | C | H | 6.5 | No | Yellow |
| 7 | C | H | 6.5 | 6% of F-Agent, F1-method | Red |
| 8 | C | H | 6.5 | 6% of F-Agent, F2 method | Red |
| 9 | D | H | 5.9 | No | Yellow |
| 10 | D | H | 5.9 | 6% of F-Agent, F2 method | Red |
| 11 | E | H | 7.8 | No | Yellow |
| 12 | E | H | 7.8 | 6% of F-Agent, F2 method | Red |
| 13 | F | Na | 8.6 | No | Yellow |
| 14 | F | Na | 8.6 | 6% of F-Agent, F2 method | Red |
| 14 | F | Na | 8.6 | 6% of F-Agent, F2 method | Red |
| 15 | G | Na, H | 8.8 | No | Yellow |
| 16 | G | Na, H | 8.8 | 6% of F-Agent, F1 method | Red |
| 17 | H | Na, $NH_3$ | 8.3 | No | Yellow |
| 18 | H | Na, $NH_3$ | 8.3 | 6% of F-Agent, F1 method | Red |
| 19 | C | H | 6.5 | 10% of F-Agent, F2 method | N/A |
| 20 | I | — | 6.7 | No | N/A |
| 21 | I | — | 6.7 | 6% of F-Agent, F2 method | N/A |
| 22 | H | Na, $NH_3$ | 8.3 | 10% of F-Agent, F1 method | N/A |
| 23 | J | — | — | No | N/A |

TABLE IXA-continued

| Run # | Support Type | Type of Counter Ion of support | pH of support | Fluorination process | Color of Supported Metallocene* |
|---|---|---|---|---|---|
| 24 | J | — | — | 10% of F-Agent, F2 method | N/A |
| 25 | J | — | — | 15% of F-Agent, F2 method | N/A |

*Red Color indicates cation formation with the metallocene.

The un-fluorinated catalyst systems did not show an indication of active species. Further, the catalyst systems including only silica or alumina were absent an indication of active species. However, the fluorinated alumina-silica supports exhibited a red or orange color, an indication of active species.

Example 2

First, about 0.30 g or each support was weighed out in a 20 mL screw cap vial and 5 mL of Methyl red indicator solution (0.5 mg of methyl red in 250 mL of isohexane) was added to from a red acidic solid. The solid was then titrated with a 0.12 N n-butylamine solution in isohexane. Titration was continued until the red color of the solids disappeared. The results of such tests are illustrated in Table IXB below.

TABLE IXB

| Run # | Support Type | Sample (g) | 0.1 N n-Butylamine in isohexane (mL) | equivalent acid/g support[1] |
|---|---|---|---|---|
| 1 | I | 0.315 | 0.95 | 3.62E−04 |
| 2 | C | 0.308 | 1.19 | 4.64E−04 |

TABLE IXB-continued

| Run # | Support Type | Sample (g) | 0.1 N n-Butylamine in isohexane (mL) | equivalent acid/g support[1] |
|---|---|---|---|---|
| 3 | F | 0.309 | 0.85 | 3.30E−04 |
| 4 | G | 0.300 | 0.80 | 3.20E−04 |
| 5 | J | 0.309 | 1.45 | 5.63E−04 |
| 6 | I | 0.308 | 1.40 | 5.45E−04 |
| 7 | C | 0.307 | 1.65 | 6.45E−04 |
| 8 | C | 0.304 | 1.25 | 4.93E−04 |
| 9 | F | 0.307 | 1.50 | 5.86E−04 |
| 10 | F | 0.307 | 1.40 | 5.47E−04 |
| 11 | J | 0.303 | 1.95 | 7.72E−04 |
| 12 | J | 0.300 | 1.75 | 7.00E−04 |

[1]Measurement of surface acidity was performed according to the method described by B. C. Roy, M. S. Rahman and M. A. Tahman, Journal of Applied Sciences 5(7): 1275-1278, 2005 with minor modifications where the aliphatic solvent used was isohexane instead of hexane.

Example 3

The supported catalyst systems from Examples 1 and 2 were contacted with propylene monomer to form polymer (in 6× parallel reactor or 2 L bench reactor, 170 g. propylene, 67° C.). The polymerization conditions and results of each polymerization follow in Table IXC.

TABLE IXC

| Run # | Support Type | Support to TIBAL | Catalyst Mixing | Cat (mg) | non aging Co-Cat | Co-Cat (mg) | Co-cat to Cat wt ratio | Propylene (g) | $H_2$ (ppm) | Activity (g/g/h) | MFI (g/10 min) |
|---|---|---|---|---|---|---|---|---|---|---|---|
| 1 | 2 | | | | | | | | | 0 | |
| 2 | 3 | | | | | | | | | 0 | |
| 3 | 5 | | | | | | | | | 0 | |
| 4 | 6 | | | | | | | | | 0 | |
| 5 | 7 | 1:1 | RT 30 min. | 10 | | | 0.0 | 170 | 119 | 6664 | 9.1 |
| 6 | 10 | 1:1 | RT 30 min. | 10 | | | 0.0 | 170 | 119 | 6519 | 8.3 |
| 7 | 12 | 1:1 | RT 30 min. | 10 | | | 0.0 | 170 | 119 | 6142 | 11.9 |
| 8 | 7 | 1:2 | RT 1 hour | 45 | TiBAl | 90 | 2.0 | 1350 | 36 | 3175 | |
| 9 | 14 | 1:2 | RT 1 hour | 30 | TiBAL | 15 | 0.5 | 170 | 83 | 0 | |
| 10 | 16 | 1:1 | RT 1.5 hours | 30 | TIBAL | 10 | 0.3 | 170 | 166 | 0 | |
| 11 | 18 | | | | | | | | | 0 | |

The catalyst systems absent activated metallocene (yellow color for activation test) did not show any activities in propylene polymerization. Unexpectedly, it has been discovered that only fluorinated alumina-silica supports having a pH of less than about 8.0 are active in propylene polymerization.

Examples-X

In the following examples, samples of fluorinated metallocene catalyst compounds utilizing various Group 12 to 13 metal compounds were prepared.

As used below "alumina-silica support composition" refers to alumina-silica that was obtained from Grace Davison (13 wt. % Al).

Support Preparation Method A. The preparation of support material A was achieved by mixing 15.0 g of the alumina-silica support composition in 60 mL of water with 3.1 g of $NH_4Fl_2$ (dissolved in 25 mL of water) within a 250 mL round bottom flask to form a fluorided support including 20 wt. % fluorinating agent. The water was then removed under vacuum at 90° C. The resulting solids were then heated in a muffle furnace at 400° C. for 3 hours.

Support Preparation Method B: The preparation of support material B was achieved by mixing the alumina-silica support composition with $Et_3B$ in hexane at ambient conditions to form a fluorided support, which was subsequently dried.

The dried support material was then contacted with $(NH_4)_2SiF_6$ to form a fluorided support including 20 wt. % fluorinating agent. The resulting solids were then heated under air in a tube furnace at 400° C. for 2 hours.

Catalyst Preparation Method A: The preparation of support material A was achieved by mixing 15.0 g of the alumina-silica support composition (15 wt. % of alumina) in 60 mL of water with 3.0 g of $NH_4F.HF$ (dissolved in 25 mL of water) within a 250 mL round bottom flask to form a fluorided support including 20 wt. % fluorinating agent. The water was then removed under vacuum at 90° C. The resulting solids were then heated in a muffle furnace at 400° C. for 3 hours.

Support Preparation Method B: 3.0 grams of alumina-silica (13 wt. % of alumina) was placed in a 250, 1-neck, schlenk round bottom flask and placed in a glass-drying oven at 145° C. for 16 hours. The flask was capped with a rubber septum and placed under vacuum. After the flask cooled to ambient temperature, it was stored in a glove box under nitrogen.

15.0 grams of the dry alumina-silica was slurried in 30.0 mL of isohexane followed by adding 7.72 mL $Et_3B$ (Aldrich, 1M in Hexane). After stirring at room temperature for about 1.5 hours, the slurry was filtered though a glass fritted filter funnel and washed 3× each with 30.0 mL of isohexane. The resulting solids were dried under vacuum at ambient temperature. The dry boron-treated $AlSiO_2$ was then dry mixed with 3.0 grams of $(NH_4)_2SiF_6$ and transferred into a glass quartz tube. The solids were then heated at 450° C. for 2 hours under 0.6 SLPM $N_2$ flow. After cooling to room temperature, the solids were collected and stored under nitrogen in a glove box.

The preparation of support material B was achieved by mixing the alumina-silica support composition with $Et_3B$ in hexane at ambient conditions to form a fluorided support, which was subsequently dried.

Catalyst Preparation Method C: The preparation of Catalyst C was achieved by slurrying a support material in hexane. The slurry was then contacted with $Et_3B$ (5 wt. %). The treated slurry was then filtered and washed with hexane.

The preparation further included contacting dimethylsilyl-bis(2-methyl-4-phenyl-1-indenyl)zirconium dichloride with $AlR_3$ ($AlR_3$/support weight ratio is 1) at ambient conditions. The resulting mixture was then added to the slurry to form a supported catalyst system including 1 wt. % metallocene. The supported catalyst system was then stirred for 1.0 hour.

Catalyst Preparation Method D: The preparation of Catalyst D was achieved by slurrying a support material (B) in hexane. The slurry was then contacted with TIBAl (TIBAl/support weight ratio is 0.5).

The preparation further included contacting dimethylsilyl-bis(2-methyl-4-phenyl-1-indenyl)zirconium dichloride with $AlR_3$ ($AlR_3$/support weight ratio is 0.5) at ambient conditions. The resulting mixture was then added to the slurry to form a supported catalyst system including 1 wt. % metallocene. The supported catalyst system was then stirred for 30 minutes.

Catalyst Preparation Method E: The preparation of Catalyst E was achieved by slurrying a support material in hexane. The slurry was then contacted with $AlR_3$. ($AlR_3$/support weight ratio is 0.5).

The preparation further included contacting dimethylsilyl-bis(2-methyl-4-phenyl-1-indenyl)zirconium dichloride with $AlR_3$ at ambient conditions. The resulting mixture was then added to the slurry to form a supported catalyst system including 1 wt. % metallocene. The supported catalyst system was then stirred for 30 minutes.

Polymerizations: The resulting catalysts were then contacted with propylene monomer to form polypropylene. The polymerizations were conducted in a 6-x pack (6×500 ml) parallel bench reactor and in 2 L Zipperclave bench reactor. The results of such polymerizations follow in Tables XA and XB, respectively.

TABLE XA

| Run | Support | Catalyst | R | Cat (mg) | $H_2$ (ppm) | Time (min) | Activity (g/g/h) |
|---|---|---|---|---|---|---|---|
| 1 | A | A1 | N/A | 15 | 78 | 30 | 2317 |
| 2 | A | E1 | i-Bu | 15 | 78 | 30 | 11873 |
| 3 | A | E2 | i-Bu | 30 | 42 | 30 | 10777 |
| 4 | A | E2 | i-Bu | 30 | 42 | 30 | 11248 |
| 5 | A | B1 | i-Bu | 15 | 78 | 30 | 6373 |
| 6 | A | C2 | i-Bu | 30 | 42 | 30 | 11466 |
| 7 | B | D2 | i-Bu | 30 | 42 | 30 | 11344 |
| 8 | A | E1 | n-Oct | 15 | 78 | 30 | 13804 |
| 9 | A | E1 | n-Oct | 15 | 78 | 30 | 15203 |
| 10 | A | E1 | n-Oct | 15 | 78 | 60 | 9178 |
| 11 | A | E1 | n-Oct | 15 | 156 | 30 | 12626 |
| 12 | A | B1 | n-Oct | 15 | 78 | 30 | 12875 |
| 13 | A | B1 | n-Oct | 10 | 78 | 30 | 13890 |
| 14 | A | B1 | n-Oct | 10 | 78 | 60 | 10710 |
| 15 | A | B1 | n-Oct | 10 | 156 | 30 | 18193 |
| 16 | A | E1 | n-Hex | 15 | 78 | 30 | 12457 |
| 17 | A | E1 | i-prenyl | 15 | 78 | 30 | 13 |

1 = 500 mL reactor, 180 g PP, 2 = 2L reactor, 700 g PP, all at 67° C.

Acceptable catalyst activities were observed with tri-n-hexyl aluminum (TNHAl), tri-n-octyl aluminum (TNOAl), and tri-iso-butyl aluminum (TIBAl). However, in contrast to isolation methods (wherein TIBAl generally exhibits higher activities than TNOAl), TNOAl demonstrated the highest catalyst activity with in-situ catalyst preparation methods.

However, it has been discovered that when triethyl borane ($Et_3B$) is present during the catalyst preparation, the activity of the TIBAl system decreased, while the TNOAl system demonstrated about the same or increased catalytic activity.

TABLE XB

| Run | MFI (g/10 min.) | XS (%) | $T_r$(° C.) | $\Delta H_r$ (J/g) | $T_m$(° C.) | $\Delta H_m$(J/g) | Mw | Mw/Mn | Mz/Mw |
|---|---|---|---|---|---|---|---|---|---|
| 1 | 19.4 | 0.28 | 110.1 | 95.7 | 150.8 | 95.5 | 193507 | 4.0 | 2.0 |
| 2 | 1.4 | ND | 107.9 | 92.2 | 150.1 | 90.2 | 627243 | 6.4 | 2.5 |
| 3 | 6.0 | ND | 109.4 | 91.3 | 150.7 | 107.8 | 321580 | 7.9 | 2.8 |
| 4 | 5.6 | ND | 109.4 | 98.6 | 150.5 | 97.2 | 393365 | 7.6 | 3.1 |
| 5 | 19.8 | ND | 106.6 | 92.7 | 1506 | 91.5 | 225149 | 4.2 | 2.1 |
| 6 | 9.7 | NR | 108.4 | 88.1 | 151.0 | 100.4 | 282459 | 5.5 | 2.4 |
| 7 | 3.0 | NR | 107.8 | 94.9 | 150.6 | 104.1 | 370879 | 5.8 | 2.4 |
| 8 | <1 | NR | 105.7 | 89.1 | 149.9 | 102.3 | 567369 | 3.9 | 2.2 |
| 9 | 7.6 | <0.2 | 106.0 | 64.7 | 150.5 | 95.6 | 332279 | 5.1 | 2.3 |
| 10 | 3.4 | <0.2 | 106.7 | 93.6 | 150.1 | 93.4 | 409637 | 6.4 | 2.4 |
| 11 | 62.2 | 0.20 | 110.2 | 97.7 | 150.3 | 100.6 | 137059 | 5.1 | 2.1 |
| 12 | 1.1 | <0.2 | 106.8 | 90.5 | 150.4 | 100.8 | NR | NR | NR |
| 13 | 5.7 | <0.2 | 108.3 | 95.5 | 150.5 | 96.0 | 395923 | 4.6 | 2.3 |
| 14 | <1 | ND | 105.6 | 96.1 | 149.9 | 97.7 | 484894 | 5.9 | 2.3 |
| 15 | 6.8 | ND | 109.2 | 96.5 | 150.9 | 95.8 | 315293 | 6.8 | 2.9 |
| 16 | 1.0 | NR | 106.6 | 95.8 | 149.6 | 108.4 | 536058 | 4.3 | 2.3 |
| 17 | NR | NR | NR | NR | NR | NR | NR | NR | NR |

$T_r$ is recrystallization temperature, $T_M$ is the peak melt temperature

While the polymers produces showed consistent Tm and Hr regardless of the polymerization conditions or type of reactor, the melt flow and Mw varied depending on the type of reactor system. Further, the melt flow of the polymers increased with an increase of hydrogen.

While the foregoing is directed to embodiments of the present invention, other and further embodiments of the invention may be devised without departing from the basic scope thereof and the scope thereof is determined by the claims that follow.

What is claimed is:

1. A method of forming a supported catalyst system comprising:
    providing an inorganic support material;
    contacting the inorganic support material with an aluminum fluoride compound represented by the formula $AlF_pX_{3-p}B_q$ to form an aluminum fluoride impregnated support, wherein X is selected from Cl, Br and OH⁻, B is $H_2O$, p is selected from 1 to 3 and q is selected from 0 to 6; and
    contacting the aluminum fluoride impregnated support with a transition metal compound to form a supported catalyst system, wherein the transition metal compound is represented by the formula $[L]_m M[A]_n$; wherein L is a ligand, A is a leaving group, M is a transition metal and m and n are such that a total ligand valency corresponds to the transition metal valency.

2. A supported metallocene catalyst composition formed by the method of claim 1.

* * * * *